US012625349B2

(12) United States Patent
Jhang et al.

(10) Patent No.: US 12,625,349 B2
(45) Date of Patent: May 12, 2026

(54) OPTICAL IMAGING LENS

(71) Applicant: Genius Electronic Optical (Xiamen) Co., Ltd., Xiamen (CN)

(72) Inventors: Jia-Sin Jhang, Xiamen (CN); Yanbin Chen, Xiamen (CN); Jianpeng Li, Xiamen (CN); Feng Chen, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 806 days.

(21) Appl. No.: 17/811,638

(22) Filed: Jul. 11, 2022

(65) Prior Publication Data

US 2023/0221524 A1      Jul. 13, 2023

(30) Foreign Application Priority Data

Jan. 12, 2022    (CN) .......................... 202210032815.2

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ....... G02B 9/64; G02B 13/16; G02B 13/0045
See application file for complete search history.

(56) References Cited

U.S. PATENT DOCUMENTS

| | | | |
|---|---|---|---|
| 2016/0077314 A1* | 3/2016 | Nishimura | ............. G02B 13/06 |
| | | | 359/708 |
| 2020/0393652 A1 | 12/2020 | Kuo et al. | |
| 2021/0278636 A1 | 9/2021 | Lin et al. | |
| 2022/0066160 A1 | 3/2022 | Meng | |
| 2022/0075143 A1 | 3/2022 | Tian | |
| 2022/0075145 A1 | 3/2022 | Li | |
| 2022/0075149 A1 | 3/2022 | Chen | |
| 2022/0196979 A1 | 6/2022 | Lin et al. | |
| 2022/0244500 A1* | 8/2022 | Tseng | ................. G02B 13/0045 |

FOREIGN PATENT DOCUMENTS

| | | |
|---|---|---|
| CN | 111596442 A | 8/2020 |
| CN | 111812810 A | 10/2020 |
| CN | 111812814 A | 10/2020 |
| CN | 111812815 A | 10/2020 |
| CN | 111812818 A | 10/2020 |

(Continued)

OTHER PUBLICATIONS

Taiwanese Office Action, dated Jul. 21, 2022, in a counterpart Taiwanese patent application, No. TW 111103355.

(Continued)

*Primary Examiner* — Mariam Qureshi
(74) *Attorney, Agent, or Firm* — Chen Yoshimura LLP

(57) ABSTRACT

An optical imaging lens may include a first lens element, a second lens element, a third lens element, a fourth lens element, a fifth lens element, a sixth lens element, a seventh lens element, an eighth lens element and a ninth lens element positioned in an order from an object side to an image side. Through designing concave and/or convex surfaces of the lens elements, the optical imaging lens may increase resolution, enlarge aperture stop and image height, and maintain well image quality.

7 Claims, 48 Drawing Sheets

(56) References Cited

FOREIGN PATENT DOCUMENTS

| | | | |
|---|---|---|---|
| CN | 112099205 | A | 12/2020 |
| CN | 112415722 | A | 2/2021 |
| CN | 113625436 | A | 11/2021 |
| CN | 113759523 | A | 12/2021 |
| CN | 113805310 | A | 12/2021 |
| TW | 202134724 | A | 9/2021 |
| WO | 2021/246545 | A1 | 12/2021 |

OTHER PUBLICATIONS

Chinese Office Action dated Feb. 1, 2024 and Search Report dated Jan. 23, 2024, in a counterpart Chinese patent application, No. CN 202210032815.2.

Taiwanese Office Action, dated Jul. 20, 2023, in a counterpart Taiwanese patent application, No. TW 111103355.

Taiwanese Office Action, dated Feb. 3, 2023, in a counterpart Taiwanese patent application, No. TW 111103355.

* cited by examiner

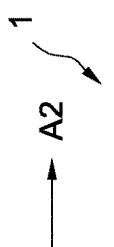
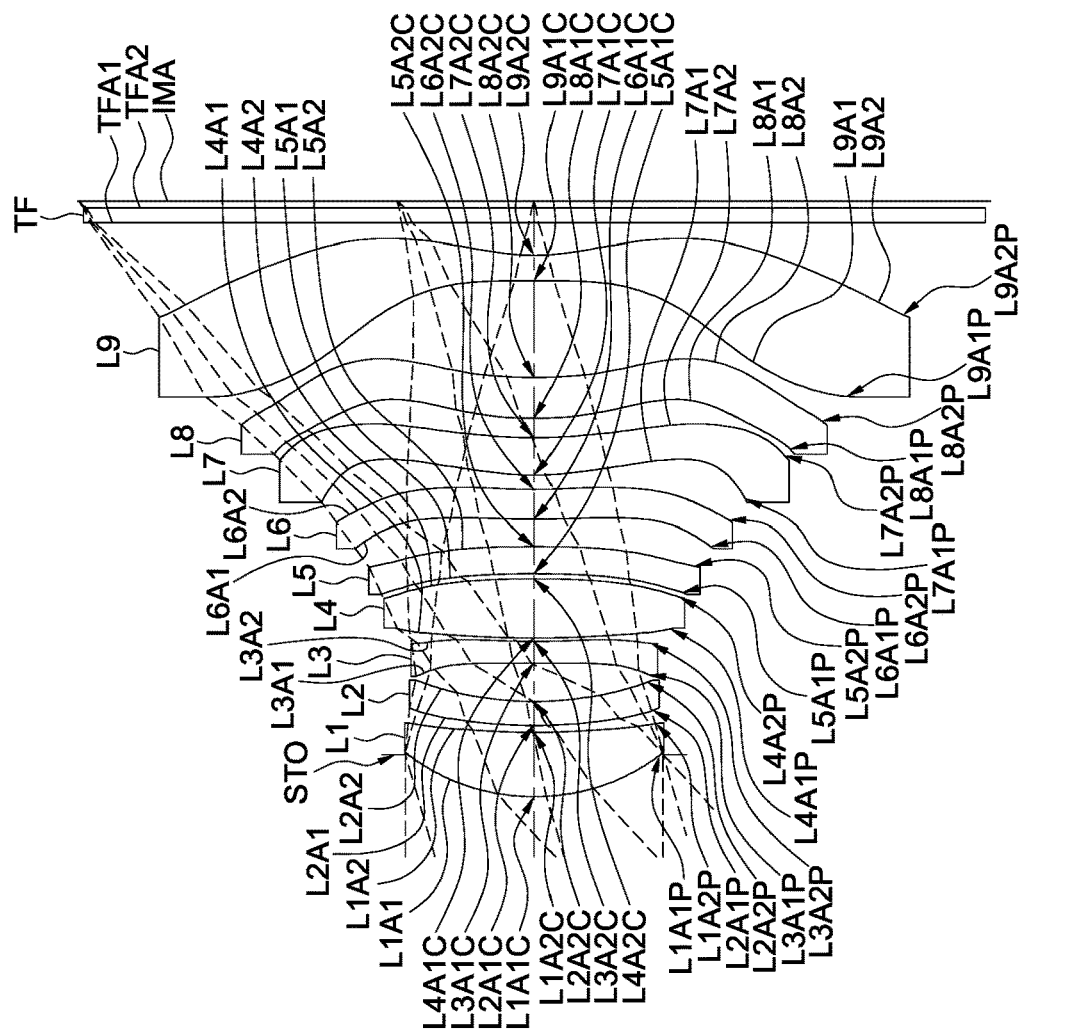
FIG. 6

Longitudinal
spherical aber.
field
1.000

-0.01     0     0.016
(mm)

——— 470 nm
- - - - 555 nm
—·—· 650 nm

Field curvature
(sagittal direction)
image height (mm)
6.700

-0.05   0   0.05
(mm)

Field curvature
(Tangential direction)
image height (mm)
6.700

-0.25     0   0.05
(mm)

Distortion
image height
(mm)
6.700

0                7
(%)

| Embodiment 1 | | | | | | | |
|---|---|---|---|---|---|---|---|
| EFL = 6.820 mm ; HFOV = 42.766 degrees ; TTL = 8.766 mm | | | | | | | |
| Fno = 1.800 ; Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.621 | | | | |
| L1A1 | 1st lens element | 3.134 | 0.948 | 1.545 | 55.987 | 8.013 | Plastic |
| L1A2 | | 9.853 | 0.102 | | | | |
| L2A1 | 2nd lens element | 6.222 | 0.355 | 1.671 | 19.243 | -34.415 | Plastic |
| L2A2 | | 4.798 | 0.565 | | | | |
| L3A1 | 3rd lens element | 30.801 | 0.320 | 1.671 | 19.243 | -23.621 | Plastic |
| L3A2 | | 10.488 | 0.052 | | | | |
| L4A1 | 4th lens element | 15.147 | 0.870 | 1.545 | 55.987 | 12.263 | Plastic |
| L4A2 | | -11.768 | 0.076 | | | | |
| L5A1 | 5th lens element | -11.063 | 0.400 | 1.671 | 19.243 | -71.473 | Plastic |
| L5A2 | | -14.548 | 0.398 | | | | |
| L6A1 | 6th lens element | 16.042 | 0.436 | 1.545 | 55.987 | -31.954 | Plastic |
| L6A2 | | 8.279 | 0.215 | | | | |
| L7A1 | 7th lens element | 4.009 | 0.551 | 1.545 | 55.987 | 15.399 | Plastic |
| L7A2 | | 7.288 | 0.284 | | | | |
| L8A1 | 8th lens element | 5.403 | 0.604 | 1.545 | 55.987 | 25.282 | Plastic |
| L8A2 | | 8.523 | 1.424 | | | | |
| L9A1 | 9th lens element | 49.247 | 0.378 | 1.535 | 55.711 | -6.442 | Plastic |
| L9A2 | | 3.225 | 0.476 | | | | |
| TFA1 | Filtering unit | INFINITY | 0.210 | 1.517 | 64.167 | | |
| TFA2 | | INFINITY | 0.102 | | | | |
| IMA | Image plane | INFINITY | | | | | |

FIG. 8

| Embodiment 1 | | | | |
|---|---|---|---|---|
| Aspherical Parameters | | | | |
| Surface# | K | a4 | a6 | a8 | a10 |
| L1A1 | 4.282736E-01 | -1.896984E-03 | 1.115272E-03 | -1.323880E-03 | 7.376412E-04 |
| L1A2 | 0.000000E+00 | -2.135289E-02 | 1.823849E-02 | -1.107755E-02 | 4.854146E-03 |
| L2A1 | -3.435311E+00 | -2.404609E-02 | 2.056618E-02 | -1.183818E-02 | 5.352596E-03 |
| L2A2 | 1.130595E+00 | -1.072957E-02 | 6.862230E-03 | -3.498774E-03 | 1.452495E-03 |
| L3A1 | 0.000000E+00 | -2.729752E-02 | 4.508669E-03 | -5.430044E-03 | 2.609592E-03 |
| L3A2 | 0.000000E+00 | -2.998406E-02 | 1.430847E-02 | -1.333762E-02 | 6.818948E-03 |
| L4A1 | 0.000000E+00 | -8.841445E-03 | 1.036977E-02 | -8.938378E-03 | 4.813831E-03 |
| L4A2 | 0.000000E+00 | 2.931000E-02 | -4.875393E-02 | 3.853015E-02 | -1.978118E-02 |
| L5A1 | 0.000000E+00 | 3.686510E-02 | -5.462195E-02 | 4.167832E-02 | -2.097693E-02 |
| L5A2 | 0.000000E+00 | 8.885059E-03 | -1.914270E-02 | 1.432810E-02 | -6.646211E-03 |
| L6A1 | 0.000000E+00 | -6.357021E-03 | -1.313043E-02 | 1.083103E-02 | -4.627667E-03 |
| L6A2 | -8.530471E+00 | -3.751933E-02 | 5.990342E-03 | 2.388337E-03 | -1.668298E-03 |
| L7A1 | -9.301126E+00 | -2.992386E-02 | 1.444256E-02 | -3.885748E-03 | 5.397949E-04 |
| L7A2 | 0.000000E+00 | -1.352391E-02 | 5.018528E-03 | -1.059117E-03 | -1.326656E-05 |
| L8A1 | -2.014941E+00 | 1.359428E-02 | -9.479738E-03 | 2.178282E-03 | -3.731917E-04 |
| L8A2 | 1.354826E+00 | 2.424841E-02 | -1.126201E-02 | 2.225281E-03 | -3.168241E-04 |
| L9A1 | 0.000000E+00 | -4.662955E-02 | 1.128218E-02 | -2.280164E-03 | 3.108312E-04 |
| L9A2 | -8.486826E+00 | -2.163495E-02 | 4.595766E-03 | -7.378729E-04 | 7.580063E-05 |
| Surface# | a12 | a14 | a16 | a18 | a20 |
| L1A1 | -2.258207E-04 | 3.532353E-05 | -2.206923E-06 | | |
| L1A2 | -1.366978E-03 | 2.188294E-04 | -1.492427E-05 | | |
| L2A1 | -1.601622E-03 | 2.758542E-04 | -1.984205E-05 | | |
| L2A2 | -4.104714E-04 | 5.930655E-05 | -2.566233E-06 | | |
| L3A1 | -6.612946E-04 | 8.979867E-05 | -4.642499E-06 | | |
| L3A2 | -1.884484E-03 | 2.848258E-04 | -1.798782E-05 | | |
| L4A1 | -1.538391E-03 | 2.963166E-04 | -3.372679E-05 | 2.111872E-06 | -5.648696E-08 |
| L4A2 | 6.880431E-03 | -1.613158E-03 | 2.442634E-04 | -2.160408E-05 | 8.516499E-07 |
| L5A1 | 7.031909E-03 | -1.553119E-03 | 2.185402E-04 | -1.784199E-05 | 6.436509E-07 |
| L5A2 | 1.941504E-03 | -3.578993E-04 | 4.119470E-05 | -2.751757E-06 | 8.231102E-08 |
| L6A1 | 1.195423E-03 | -2.064940E-04 | 2.427975E-05 | -1.755785E-06 | 5.746219E-08 |
| L6A2 | 4.324273E-04 | -6.461183E-05 | 6.057102E-06 | -3.346967E-07 | 8.218818E-09 |
| L7A1 | -3.714160E-05 | 7.152865E-07 | 1.878138E-08 | 1.213097E-09 | -8.448600E-11 |
| L7A2 | 3.989884E-05 | -6.993625E-06 | 5.733209E-07 | -2.362277E-08 | 3.945180E-10 |
| L8A1 | 4.109455E-05 | -2.331042E-06 | 3.486388E-08 | 2.210487E-09 | -7.618900E-11 |
| L8A2 | 3.292409E-05 | -2.357609E-06 | 1.080747E-07 | -2.816077E-09 | 3.140200E-11 |
| L9A1 | -2.607548E-05 | 1.338489E-06 | -4.115315E-08 | 6.976360E-10 | -5.024000E-12 |
| L9A2 | -4.910316E-06 | 2.012068E-07 | -5.075866E-09 | 7.204900E-11 | -4.400000E-13 |

FIG. 9

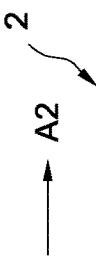
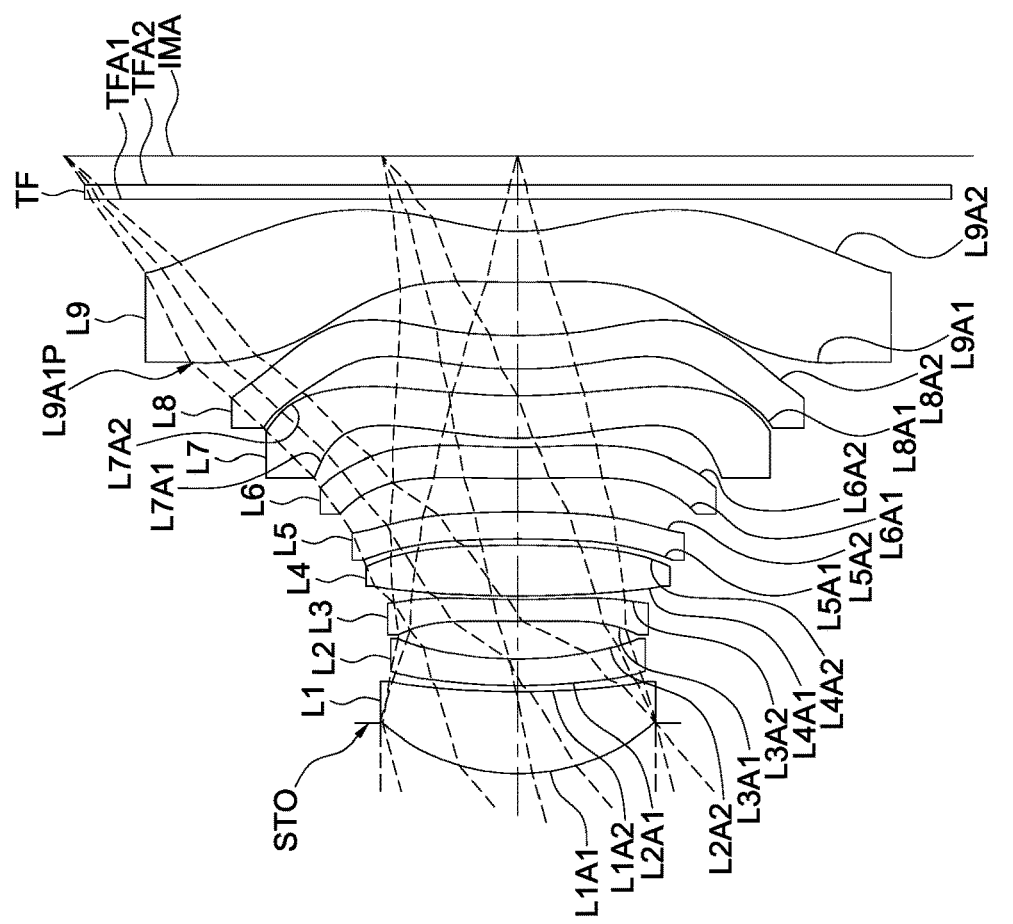
FIG. 10

Longitudinal
spherical aber.
field
1.000

-0.012        0        0.018
(mm)

| | 470 nm |
| --- | --- |
| | 555 nm |
| | 650 nm |

Field curvature
(sagittal direction)
image height (mm)
6.700

-0.04    0    0.02
(mm)

Field curvature
(Tangential direction)
image height (mm)
6.700

-0.18        0    0.04
(mm)

Distortion
image height
(mm)
6.700

0                7
(%)

| | | Radius of curvature (mm) | Thickness /air gap (mm) | Refractive index | Abbe number | Focal length (mm) | Material |
|---|---|---|---|---|---|---|---|
| | | Embodiment 2 | | | | | |
| | | EFL = 7.323 mm ; HFOV = 40.631 degrees ; TTL = 9.127 mm | | | | | |
| | | Fno = 1.800 ; Image Height = 6.700 mm | | | | | |
| Surface # | | | | | | | |
| OBJ | Object | INFINITY | INFINITY | | | | |
| STO | Aperture stop | INFINITY | -0.740 | | | | |
| L1A1 | 1st lens element | 3.150 | 1.203 | 1.545 | 55.987 | 7.914 | Plastic |
| L1A2 | | 10.039 | 0.088 | | | | |
| L2A1 | 2nd lens element | 7.233 | 0.395 | 1.671 | 19.243 | -31.897 | Plastic |
| L2A2 | | 5.300 | 0.565 | | | | |
| L3A1 | 3rd lens element | 30.412 | 0.320 | 1.671 | 19.243 | -22.834 | Plastic |
| L3A2 | | 10.211 | 0.051 | | | | |
| L4A1 | 4th lens element | 14.027 | 0.756 | 1.545 | 55.987 | 12.453 | Plastic |
| L4A2 | | -12.958 | 0.094 | | | | |
| L5A1 | 5th lens element | -11.794 | 0.400 | 1.671 | 19.243 | -118.107 | Plastic |
| L5A2 | | -14.022 | 0.491 | | | | |
| L6A1 | 6th lens element | 18.443 | 0.454 | 1.545 | 55.987 | -27.607 | Plastic |
| L6A2 | | 8.225 | 0.139 | | | | |
| L7A1 | 7th lens element | 4.234 | 0.627 | 1.545 | 55.987 | 14.950 | Plastic |
| L7A2 | | 8.334 | 0.394 | | | | |
| L8A1 | 8th lens element | 6.796 | 0.500 | 1.545 | 55.987 | 39.006 | Plastic |
| L8A2 | | 9.719 | 0.789 | | | | |
| L9A1 | 9th lens element | 9.937 | 0.754 | 1.535 | 55.711 | -6.970 | Plastic |
| L9A2 | | 2.648 | 0.476 | | | | |
| TFA1 | Filtering unit | INFINITY | 0.210 | 1.517 | 64.167 | | |
| TFA2 | | INFINITY | 0.420 | | | | |
| IMA | Image plane | INFINITY | | | | | |

FIG. 12

| Embodiment 2 | | | | |
| --- | --- | --- | --- | --- |
| Aspherical Parameters | | | | |
| Surface# | K | a4 | a6 | a8 | a10 |
| L1A1 | 4.231886E-01 | -1.700755E-03 | 1.111578E-03 | -1.320813E-03 | 7.401923E-04 |
| L1A2 | 0.000000E+00 | -2.116165E-02 | 1.809883E-02 | -1.099784E-02 | 4.863195E-03 |
| L2A1 | -4.586089E+00 | -2.453027E-02 | 2.038747E-02 | -1.179997E-02 | 5.350094E-03 |
| L2A2 | 1.074907E+00 | -1.062019E-02 | 7.315464E-03 | -3.670456E-03 | 1.464507E-03 |
| L3A1 | 0.000000E+00 | -2.700553E-02 | 4.733042E-03 | -5.401714E-03 | 2.620441E-03 |
| L3A2 | 0.000000E+00 | -2.943027E-02 | 1.416942E-02 | -1.339245E-02 | 6.803081E-03 |
| L4A1 | 0.000000E+00 | -8.668059E-03 | 1.001091E-02 | -8.969203E-03 | 4.820067E-03 |
| L4A2 | 0.000000E+00 | 2.914536E-02 | -4.869524E-02 | 3.852043E-02 | -1.978506E-02 |
| L5A1 | 0.000000E+00 | 3.716062E-02 | -5.491273E-02 | 4.171236E-02 | -2.097646E-02 |
| L5A2 | 0.000000E+00 | 8.465901E-03 | -1.913797E-02 | 1.432781E-02 | -6.646049E-03 |
| L6A1 | 0.000000E+00 | -7.298292E-03 | -1.310500E-02 | 1.085119E-02 | -4.630083E-03 |
| L6A2 | -1.213255E+01 | -3.781311E-02 | 6.008244E-03 | 2.391743E-03 | -1.668581E-03 |
| L7A1 | -9.236740E+00 | -3.138927E-02 | 1.433209E-02 | -3.886647E-03 | 5.403882E-04 |
| L7A2 | 0.000000E+00 | -1.423687E-02 | 5.037498E-03 | -1.054695E-03 | -1.303444E-05 |
| L8A1 | -4.574903E+00 | 1.320593E-02 | -9.484293E-03 | 2.180165E-03 | -3.730474E-04 |
| L8A2 | 5.168024E-01 | 2.431977E-02 | -1.127738E-02 | 2.223860E-03 | -3.167924E-04 |
| L9A1 | 0.000000E+00 | -4.722608E-02 | 1.126112E-02 | -2.280142E-03 | 3.108392E-04 |
| L9A2 | -6.901192E+00 | -2.170886E-02 | 4.594157E-03 | -7.378894E-04 | 7.580602E-05 |
| Surface# | a12 | a14 | a16 | a18 | a20 |
| L1A1 | -2.260026E-04 | 3.532979E-05 | -2.229689E-06 | | |
| L1A2 | -1.371596E-03 | 2.177197E-04 | -1.469561E-05 | | |
| L2A1 | -1.601660E-03 | 2.747699E-04 | -1.991423E-05 | | |
| L2A2 | -3.889794E-04 | 5.654688E-05 | -2.526214E-06 | | |
| L3A1 | -6.690327E-04 | 9.087814E-05 | -4.402142E-06 | | |
| L3A2 | -1.884074E-03 | 2.858375E-04 | -1.828160E-05 | | |
| L4A1 | -1.536735E-03 | 2.963049E-04 | -3.381424E-05 | 2.094999E-06 | -5.269564E-08 |
| L4A2 | 6.880009E-03 | -1.613210E-03 | 2.442524E-04 | -2.160555E-05 | 8.511488E-07 |
| L5A1 | 7.031565E-03 | -1.553132E-03 | 2.185258E-04 | -1.783659E-05 | 6.429892E-07 |
| L5A2 | 1.941600E-03 | -3.578868E-04 | 4.119538E-05 | -2.751852E-06 | 8.227911E-08 |
| L6A1 | 1.195439E-03 | -2.064906E-04 | 2.427524E-05 | -1.755859E-06 | 5.741282E-08 |
| L6A2 | 4.323426E-04 | -6.462095E-05 | 6.056829E-06 | -3.346980E-07 | 8.219804E-09 |
| L7A1 | -3.730155E-05 | 7.419255E-07 | 1.707429E-08 | 7.353990E-10 | -7.259900E-11 |
| L7A2 | 3.989077E-05 | -6.995151E-06 | 5.732545E-07 | -2.362346E-08 | 3.946820E-10 |
| L8A1 | 4.110166E-05 | -2.330872E-06 | 3.471769E-08 | 2.208123E-09 | -7.599700E-11 |
| L8A2 | 3.292720E-05 | -2.357472E-06 | 1.080769E-07 | -2.816186E-09 | 3.138700E-11 |
| L9A1 | -2.607535E-05 | 1.338499E-06 | -4.115301E-08 | 6.976400E-10 | -5.024000E-12 |
| L9A2 | -4.910185E-06 | 2.012078E-07 | -5.075864E-09 | 7.204800E-11 | -4.400000E-13 |

FIG. 13

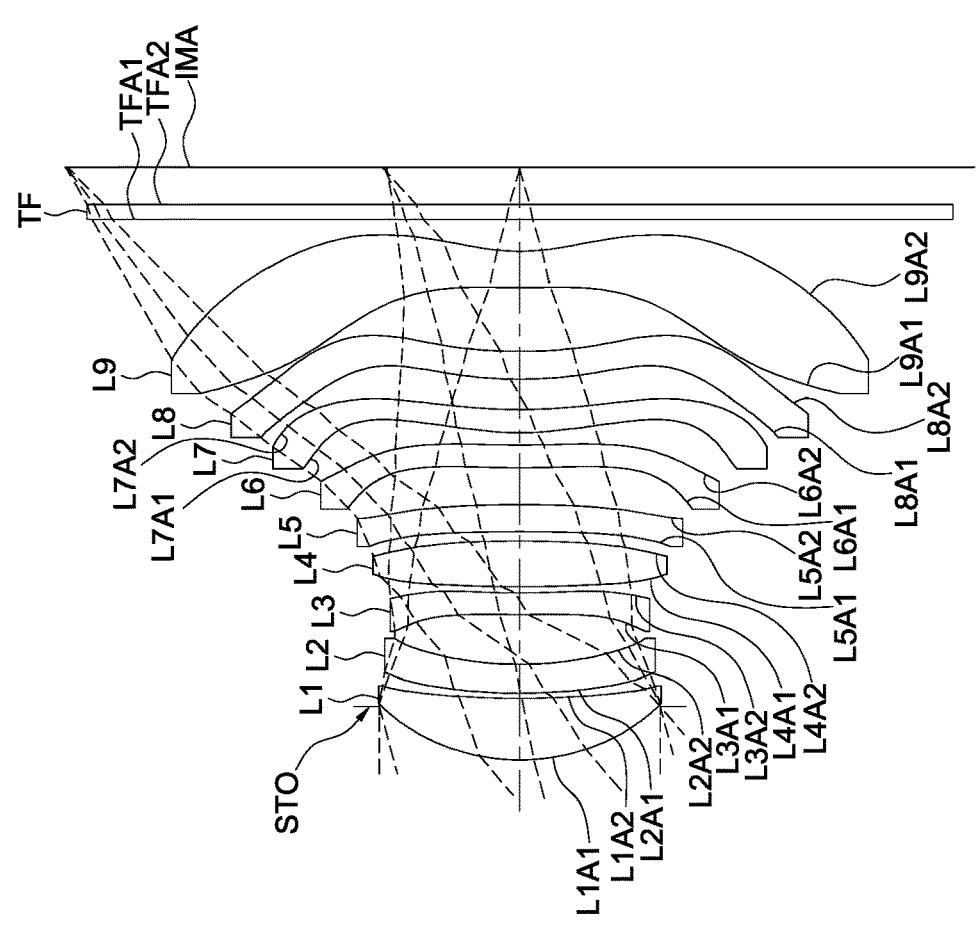
FIG. 14

Longitudinal
spherical aber.
field
1.000

-0.045          0          0.04
(mm)

Field curvature
(sagittal direction)
image height (mm)
6.700

-0.08     0   0.04
(mm)

| | 470 nm |
| | 555 nm |
| | 650 nm |

Field curvature
(Tangential direction)
image height (mm)
6.700

-0.08     0          0.18
(mm)

Distortion
image height
(mm)
6.700

-1  0          6
(%)

| Embodiment 3 | | | | | | | |
|---|---|---|---|---|---|---|---|
| EFL = 7.465 mm ; HFOV = 40.385 degrees ; TTL = 8.757 mm | | | | | | | |
| Fno = 1.800 ; Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.793 | | | | |
| L1A1 | 1st lens element | 3.106 | 0.909 | 1.545 | 55.987 | 7.785 | Plastic |
| L1A2 | | 10.333 | 0.077 | | | | |
| L2A1 | 2nd lens element | 6.495 | 0.423 | 1.671 | 19.243 | -38.970 | Plastic |
| L2A2 | | 5.075 | 0.735 | | | | |
| L3A1 | 3rd lens element | 33.434 | 0.320 | 1.671 | 19.243 | -22.155 | Plastic |
| L3A2 | | 10.320 | 0.092 | | | | |
| L4A1 | 4th lens element | 17.892 | 0.674 | 1.545 | 55.987 | 14.727 | Plastic |
| L4A2 | | -14.423 | 0.143 | | | | |
| L5A1 | 5th lens element | -18.057 | 0.400 | 1.671 | 19.243 | 3200.239 | Plastic |
| L5A2 | | -18.068 | 0.543 | | | | |
| L6A1 | 6th lens element | 16.932 | 0.337 | 1.545 | 55.987 | -46.190 | Plastic |
| L6A2 | | 10.061 | 0.185 | | | | |
| L7A1 | 7th lens element | 4.091 | 0.341 | 1.545 | 55.987 | 17.076 | Plastic |
| L7A2 | | 7.071 | 0.444 | | | | |
| L8A1 | 8th lens element | 6.819 | 0.413 | 1.545 | 55.987 | 43.053 | Plastic |
| L8A2 | | 9.397 | 0.939 | | | | |
| L9A1 | 9th lens element | 16.505 | 0.541 | 1.535 | 55.711 | -6.319 | Plastic |
| L9A2 | | 2.784 | 0.476 | | | | |
| TFA1 | Filtering unit | INFINITY | 0.210 | 1.517 | 64.167 | | |
| TFA2 | | INFINITY | 0.556 | | | | |
| IMA | Image plane | INFINITY | | | | | |

FIG. 16

| Embodiment 3 | | | | |
|---|---|---|---|---|
| Aspherical Parameters | | | | |
| Surface# | K | a4 | a6 | a8 | a10 |
| L1A1 | 4.377949E-01 | -1.824617E-03 | 1.107249E-03 | -1.323544E-03 | 7.371908E-04 |
| L1A2 | 0.000000E+00 | -2.076178E-02 | 1.817328E-02 | -1.101666E-02 | 4.852957E-03 |
| L2A1 | -3.463838E+00 | -2.421819E-02 | 2.048045E-02 | -1.183625E-02 | 5.350854E-03 |
| L2A2 | 1.210069E+00 | -1.051708E-02 | 7.000875E-03 | -3.461241E-03 | 1.468535E-03 |
| L3A1 | 0.000000E+00 | -2.829089E-02 | 4.675561E-03 | -5.366757E-03 | 2.614514E-03 |
| L3A2 | 0.000000E+00 | -3.020037E-02 | 1.417229E-02 | -1.339054E-02 | 6.792521E-03 |
| L4A1 | 0.000000E+00 | -8.000829E-03 | 1.011016E-02 | -8.827759E-03 | 4.814694E-03 |
| L4A2 | 0.000000E+00 | 2.898824E-02 | -4.869318E-02 | 3.855559E-02 | -1.977682E-02 |
| L5A1 | 0.000000E+00 | 3.754581E-02 | -5.452500E-02 | 4.167886E-02 | -2.099465E-02 |
| L5A2 | 0.000000E+00 | 9.374587E-03 | -1.901667E-02 | 1.434629E-02 | -6.644920E-03 |
| L6A1 | 0.000000E+00 | -7.000285E-03 | -1.379122E-02 | 1.089191E-02 | -4.620468E-03 |
| L6A2 | -3.431489E-01 | -3.808284E-02 | 5.908340E-03 | 2.377312E-03 | -1.667471E-03 |
| L7A1 | -7.997068E+00 | -3.280074E-02 | 1.449459E-02 | -3.876987E-03 | 5.395018E-04 |
| L7A2 | 0.000000E+00 | -1.516919E-02 | 4.967712E-03 | -1.060577E-03 | -1.265021E-05 |
| L8A1 | -3.425228E+00 | 1.318906E-02 | -9.450427E-03 | 2.177770E-03 | -3.733558E-04 |
| L8A2 | 9.541410E-01 | 2.387798E-02 | -1.128247E-02 | 2.227719E-03 | -3.168529E-04 |
| L9A1 | 0.000000E+00 | -4.674644E-02 | 1.126736E-02 | -2.280464E-03 | 3.108271E-04 |
| L9A2 | -9.321600E+00 | -2.242277E-02 | 4.593386E-03 | -7.376674E-04 | 7.578383E-05 |
| Surface# | a12 | a14 | a16 | a18 | a20 |
| L1A1 | -2.261919E-04 | 3.525054E-05 | -2.191452E-06 | | |
| L1A2 | -1.373675E-03 | 2.190786E-04 | -1.471216E-05 | | |
| L2A1 | -1.602630E-03 | 2.756603E-04 | -1.991389E-05 | | |
| L2A2 | -4.080569E-04 | 6.058462E-05 | -1.771828E-06 | | |
| L3A1 | -6.616884E-04 | 9.064408E-05 | -4.272357E-06 | | |
| L3A2 | -1.883009E-03 | 2.842521E-04 | -1.821462E-05 | | |
| L4A1 | -1.540864E-03 | 2.961805E-04 | -3.362781E-05 | 2.134433E-06 | -6.202426E-08 |
| L4A2 | 6.880710E-03 | -1.613192E-03 | 2.442480E-04 | -2.160509E-05 | 8.524720E-07 |
| L5A1 | 7.031276E-03 | -1.552883E-03 | 2.185978E-04 | -1.783842E-05 | 6.401335E-07 |
| L5A2 | 1.941106E-03 | -3.580146E-04 | 4.118696E-05 | -2.750498E-06 | 8.276987E-08 |
| L6A1 | 1.191044E-03 | -2.064983E-04 | 2.432113E-05 | -1.754799E-06 | 5.717307E-08 |
| L6A2 | 4.325387E-04 | -6.460265E-05 | 6.057532E-06 | -3.346867E-07 | 8.218103E-09 |
| L7A1 | -3.714810E-05 | 7.180571E-07 | 1.925538E-08 | 1.247849E-09 | -8.282400E-11 |
| L7A2 | 3.993937E-05 | -6.996511E-06 | 5.737053E-07 | -2.370191E-08 | 3.973250E-10 |
| L8A1 | 4.109017E-05 | -2.330825E-06 | 3.487349E-08 | 2.211657E-09 | -7.612700E-11 |
| L8A2 | 3.292200E-05 | -2.357631E-06 | 1.080809E-07 | -2.815940E-09 | 3.139500E-11 |
| L9A1 | -2.607552E-05 | 1.338489E-06 | -4.115315E-08 | 6.976390E-10 | -5.023000E-12 |
| L9A2 | -4.910630E-06 | 2.012031E-07 | -5.075871E-09 | 7.204900E-11 | -4.400000E-13 |

FIG. 17

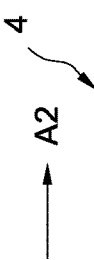
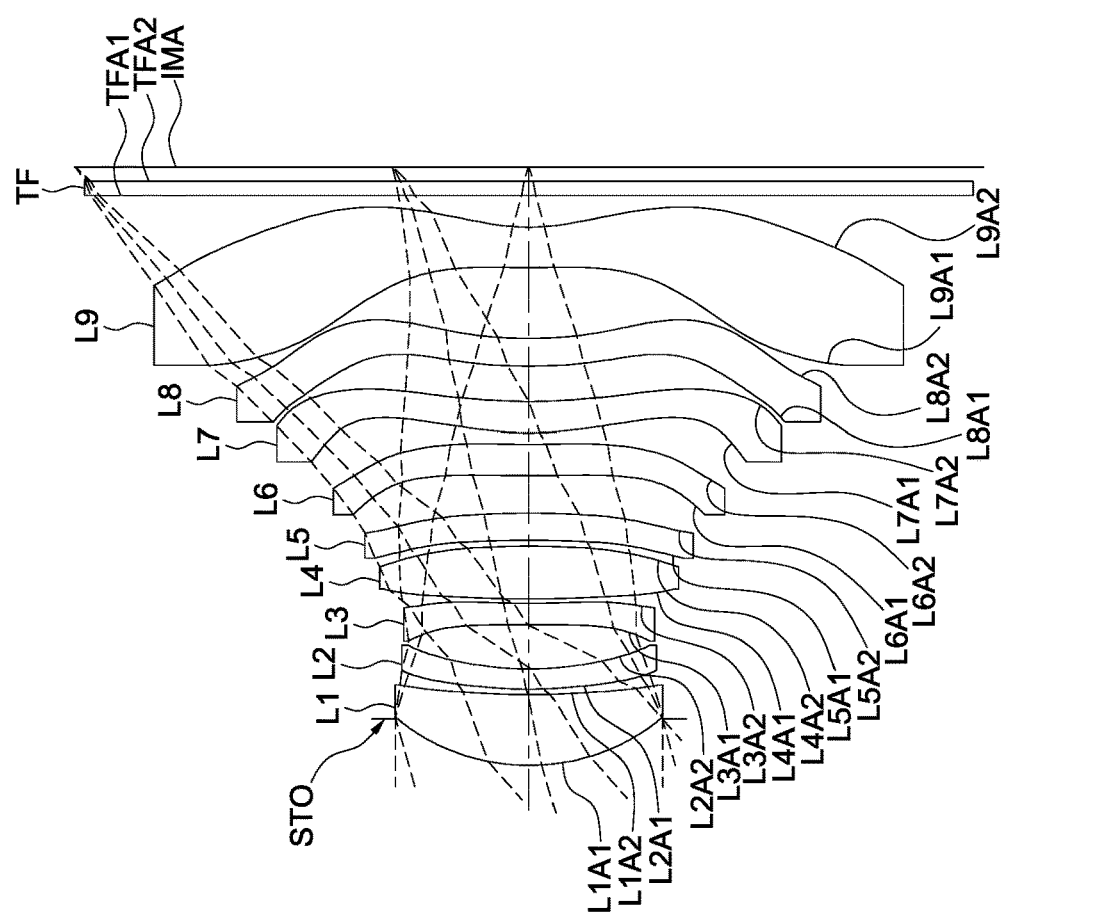
FIG. 18

Longitudinal
spherical aber.
field
1.000

-0.012    0    0.02
(mm)

Field curvature
(sagittal direction)
image height (mm)
6.700

-0.02    0    0.04
(mm)

470 nm
555 nm
650 nm

Field curvature
(Tangential direction)
image height (mm)
6.700

-0.07    0    0.06
(mm)

Distortion
image height
(mm)
6.700

0    7
(%)

| Embodiment 4 | | | | | | |
|---|---|---|---|---|---|---|
| EFL = 7.089 mm ; HFOV = 41.527 degrees ; TTL = 8.845 mm | | | | | | |
| Fno = 1.800 ; Image Height = 6.700 mm | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.682 | | | | |
| L1A1 | 1st lens element | 3.153 | 1.036 | 1.545 | 55.987 | 7.910 | Plastic |
| L1A2 | | 10.309 | 0.081 | | | | |
| L2A1 | 2nd lens element | 6.131 | 0.300 | 1.671 | 19.243 | -34.830 | Plastic |
| L2A2 | | 4.770 | 0.655 | | | | |
| L3A1 | 3rd lens element | 69.210 | 0.320 | 1.671 | 19.243 | -21.120 | Plastic |
| L3A2 | | 11.836 | 0.065 | | | | |
| L4A1 | 4th lens element | 17.695 | 0.782 | 1.545 | 55.987 | 12.440 | Plastic |
| L4A2 | | -10.860 | 0.085 | | | | |
| L5A1 | 5th lens element | -12.786 | 0.400 | 1.671 | 19.243 | -239.267 | Plastic |
| L5A2 | | -14.057 | 0.559 | | | | |
| L6A1 | 6th lens element | 25.193 | 0.461 | 1.545 | 55.987 | -60.119 | Plastic |
| L6A2 | | 14.164 | 0.162 | | | | |
| L7A1 | 7th lens element | 3.957 | 0.468 | 1.545 | 55.987 | 13.623 | Plastic |
| L7A2 | | 8.096 | 0.520 | | | | |
| L8A1 | 8th lens element | 8.176 | 0.413 | 1.545 | 55.987 | -63580073.240 | Plastic |
| L8A2 | | 8.030 | 1.050 | | | | |
| L9A1 | 9th lens element | 17.078 | 0.591 | 1.535 | 55.711 | -6.031 | Plastic |
| L9A2 | | 2.691 | 0.476 | | | | |
| TFA1 | Filtering unit | INFINITY | 0.210 | 1.517 | 64.167 | | |
| TFA2 | | INFINITY | 0.211 | | | | |
| IMA | Image plane | INFINITY | | | | | |

FIG. 20

| Embodiment 4 | | | | |
|---|---|---|---|---|
| Aspherical Parameters | | | | |
| Surface# | K | a4 | a6 | a8 | a10 |
| L1A1 | 4.359046E-01 | -1.651120E-03 | 1.084309E-03 | -1.318032E-03 | 7.380900E-04 |
| L1A2 | 0.000000E+00 | -2.124007E-02 | 1.827724E-02 | -1.108166E-02 | 4.850311E-03 |
| L2A1 | -3.543467E+00 | -2.415488E-02 | 2.049947E-02 | -1.183571E-02 | 5.353061E-03 |
| L2A2 | 1.172434E+00 | -1.070195E-02 | 6.947891E-03 | -3.462750E-03 | 1.456959E-03 |
| L3A1 | 0.000000E+00 | -2.732288E-02 | 4.627796E-03 | -5.399577E-03 | 2.613832E-03 |
| L3A2 | 0.000000E+00 | -2.999835E-02 | 1.430205E-02 | -1.334463E-02 | 6.816170E-03 |
| L4A1 | 0.000000E+00 | -9.110494E-03 | 1.036193E-02 | -8.939870E-03 | 4.814285E-03 |
| L4A2 | 0.000000E+00 | 2.894905E-02 | -4.872913E-02 | 3.853614E-02 | -1.978265E-02 |
| L5A1 | 0.000000E+00 | 3.709212E-02 | -5.467238E-02 | 4.167661E-02 | -2.097630E-02 |
| L5A2 | 0.000000E+00 | 8.673549E-03 | -1.908528E-02 | 1.433319E-02 | -6.646288E-03 |
| L6A1 | 0.000000E+00 | -7.440471E-03 | -1.317298E-02 | 1.083098E-02 | -4.630674E-03 |
| L6A2 | -8.677798E+00 | -3.820005E-02 | 5.912547E-03 | 2.389101E-03 | -1.667908E-03 |
| L7A1 | -8.093184E+00 | -3.117720E-02 | 1.444675E-02 | -3.874781E-03 | 5.397421E-04 |
| L7A2 | 0.000000E+00 | -1.229300E-02 | 4.902423E-03 | -1.051623E-03 | -1.356677E-05 |
| L8A1 | -9.475785E-01 | 1.419808E-02 | -9.522982E-03 | 2.177157E-03 | -3.731770E-04 |
| L8A2 | 5.822951E-01 | 2.378309E-02 | -1.126630E-02 | 2.225233E-03 | -3.167965E-04 |
| L9A1 | 0.000000E+00 | -4.683399E-02 | 1.127904E-02 | -2.280199E-03 | 3.108298E-04 |
| L9A2 | -7.455281E+00 | -2.174690E-02 | 4.601440E-03 | -7.378210E-04 | 7.575825E-05 |
| Surface# | a12 | a14 | a16 | a18 | a20 |
| L1A1 | -2.257146E-04 | 3.533396E-05 | -2.225823E-06 | | |
| L1A2 | -1.367459E-03 | 2.188203E-04 | -1.487468E-05 | | |
| L2A1 | -1.601193E-03 | 2.759225E-04 | -1.988321E-05 | | |
| L2A2 | -4.100848E-04 | 5.971932E-05 | -2.012139E-06 | | |
| L3A1 | -6.621121E-04 | 8.987225E-05 | -4.565974E-06 | | |
| L3A2 | -1.886070E-03 | 2.844455E-04 | -1.807894E-05 | | |
| L4A1 | -1.538320E-03 | 2.963207E-04 | -3.372505E-05 | 2.111602E-06 | -5.629477E-08 |
| L4A2 | 6.880311E-03 | -1.613161E-03 | 2.442679E-04 | -2.160229E-05 | 8.521266E-07 |
| L5A1 | 7.032164E-03 | -1.553060E-03 | 2.185466E-04 | -1.784130E-05 | 6.437032E-07 |
| L5A2 | 1.941377E-03 | -3.578752E-04 | 4.119092E-05 | -2.751540E-06 | 8.240280E-08 |
| L6A1 | 1.195204E-03 | -2.064965E-04 | 2.428181E-05 | -1.755441E-06 | 5.747760E-08 |
| L6A2 | 4.324406E-04 | -6.461061E-05 | 6.057307E-06 | -3.346089E-07 | 8.227084E-09 |
| L7A1 | -3.715113E-05 | 7.184832E-07 | 1.898056E-08 | 1.229302E-09 | -8.260000E-11 |
| L7A2 | 3.990645E-05 | -6.993703E-06 | 5.733133E-07 | -2.362249E-08 | 3.944490E-10 |
| L8A1 | 4.109643E-05 | -2.331036E-06 | 3.484892E-08 | 2.210651E-09 | -7.618700E-11 |
| L8A2 | 3.292510E-05 | -2.357552E-06 | 1.080769E-07 | -2.816005E-09 | 3.140100E-11 |
| L9A1 | -2.607550E-05 | 1.338488E-06 | -4.115322E-08 | 6.976320E-10 | -5.024000E-12 |
| L9A2 | -4.905042E-06 | 2.009697E-07 | -5.073435E-09 | 7.212400E-11 | -4.420000E-13 |

FIG. 21

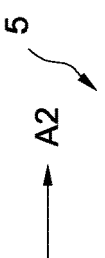
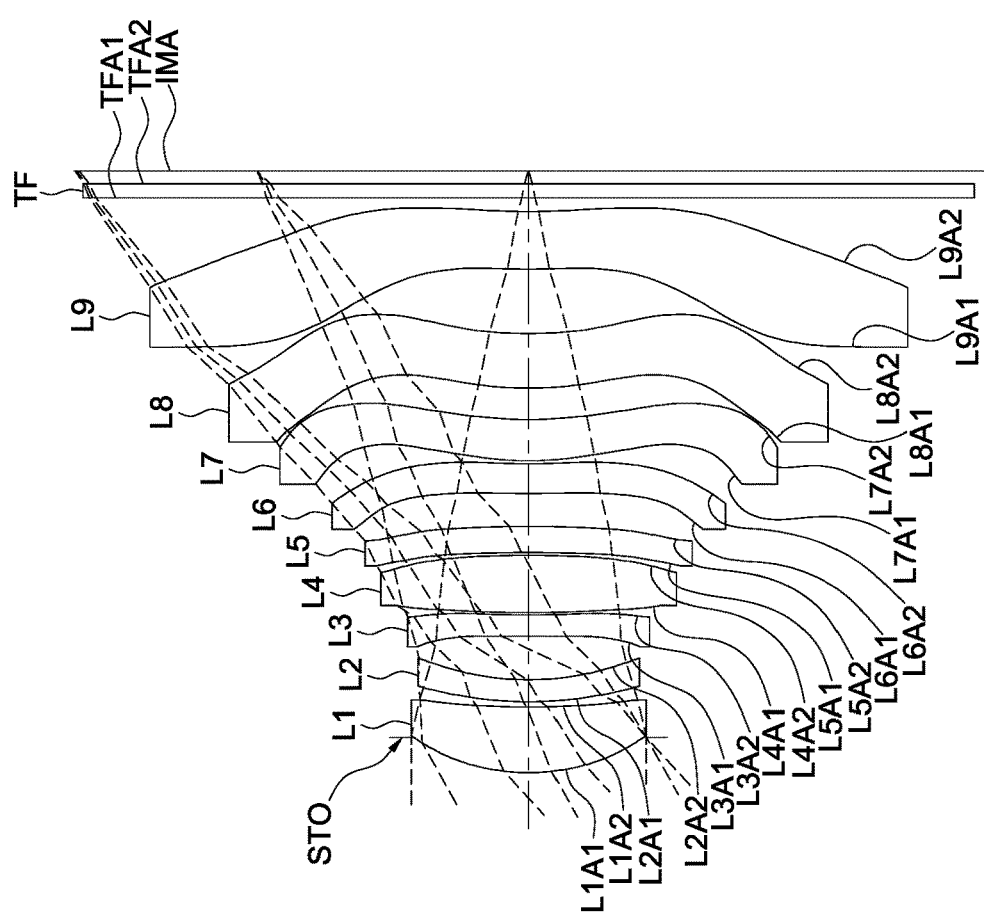
FIG. 22

Longitudinal
spherical aber.
field
1.000
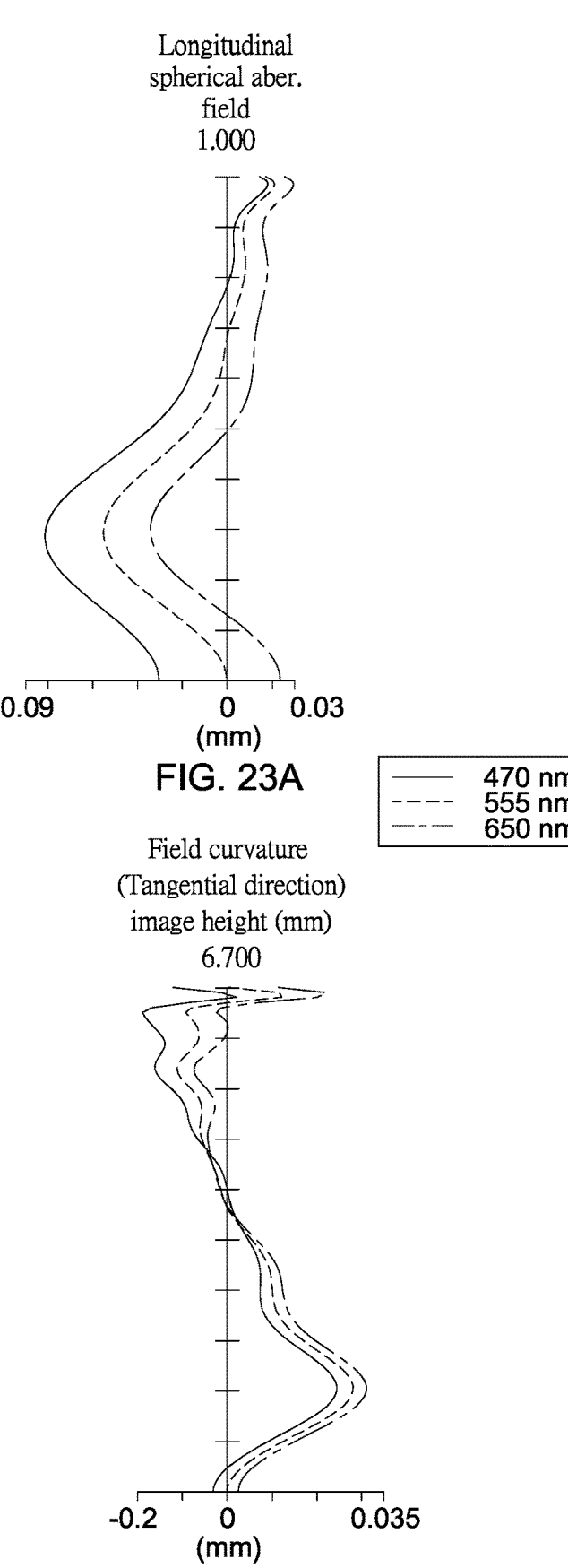
-0.09      0   0.03
(mm)
FIG. 23A
Field curvature
(sagittal direction)
image height (mm)
6.700
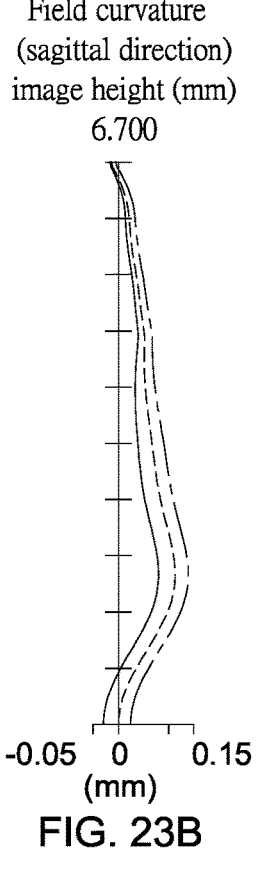
-0.05   0    0.15
(mm)
FIG. 23B
| | 470 nm |
| --- | --- |
| | 555 nm |
| | 650 nm |
Field curvature
(Tangential direction)
image height (mm)
6.700
-0.2    0     0.035
(mm)
FIG. 23C
Distortion
image height
(mm)
6.700
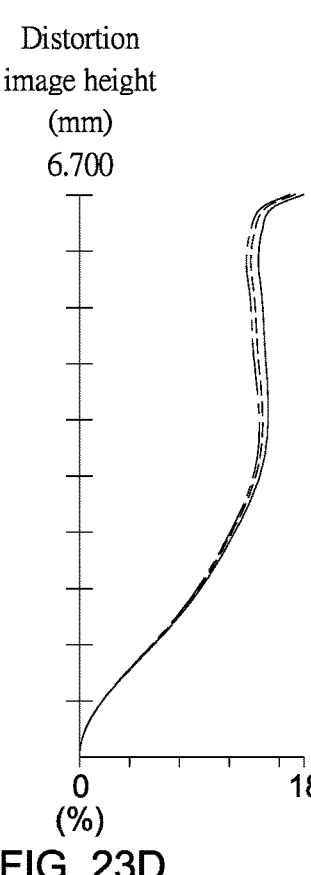
0          18
(%)
FIG. 23D

| | | Embodiment 5 | | | | | |
|---|---|---|---|---|---|---|---|
| | | EFL = 6.267 mm ; HFOV = 42.353 degrees ; TTL = 8.923 mm | | | | | |
| | | Fno = 1.800 ; Image Height = 6.700 mm | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.527 | | | | |
| L1A1 | 1st lens element | 3.096 | 0.969 | 1.545 | 55.987 | 8.009 | Plastic |
| L1A2 | | 9.414 | 0.078 | | | | |
| L2A1 | 2nd lens element | 4.953 | 0.330 | 1.671 | 19.243 | -41.013 | Plastic |
| L2A2 | | 4.091 | 0.643 | | | | |
| L3A1 | 3rd lens element | 37.093 | 0.314 | 1.671 | 19.243 | -20.686 | Plastic |
| L3A2 | | 10.137 | 0.039 | | | | |
| L4A1 | 4th lens element | 17.397 | 0.857 | 1.545 | 55.987 | 13.310 | Plastic |
| L4A2 | | -12.274 | 0.038 | | | | |
| L5A1 | 5th lens element | -17.265 | 0.388 | 1.671 | 19.243 | -118.928 | Plastic |
| L5A2 | | -22.172 | 0.487 | | | | |
| L6A1 | 6th lens element | 23.452 | 0.441 | 1.545 | 55.987 | -32.574 | Plastic |
| L6A2 | | 10.050 | 0.042 | | | | |
| L7A1 | 7th lens element | 3.824 | 0.607 | 1.661 | 20.373 | 14.753 | Plastic |
| L7A2 | | 5.856 | 0.468 | | | | |
| L8A1 | 8th lens element | 7.034 | 0.809 | 1.545 | 55.987 | 79.009 | Plastic |
| L8A2 | | 8.062 | 0.960 | | | | |
| L9A1 | 9th lens element | 10.162 | 0.855 | 1.535 | 55.711 | 676.337 | Plastic |
| L9A2 | | 10.148 | 0.200 | | | | |
| TFA1 | Filtering unit | INFINITY | 0.210 | 1.517 | 64.167 | | |
| TFA2 | | INFINITY | 0.187 | | | | |
| IMA | Image plane | INFINITY | | | | | |

FIG. 24

| Embodiment 5 | | | | |
|---|---|---|---|---|
| Aspherical Parameters | | | | |
| Surface# | K | a4 | a6 | a8 | a10 |
| L1A1 | 4.877000E-01 | 4.395624E-03 | -1.045471E-02 | 9.896525E-03 | -5.478477E-03 |
| L1A2 | 0.000000E+00 | -3.130089E-02 | 4.221904E-02 | -4.038586E-02 | 2.600337E-02 |
| L2A1 | -2.549033E+00 | -3.030560E-02 | 3.597516E-02 | -3.053744E-02 | 1.942500E-02 |
| L2A2 | 7.167954E-01 | -1.323864E-02 | 1.218125E-02 | -9.150446E-03 | 5.668504E-03 |
| L3A1 | 0.000000E+00 | -2.241892E-02 | -4.545120E-03 | -3.005655E-04 | 1.552502E-03 |
| L3A2 | 0.000000E+00 | -3.646275E-02 | 4.015386E-02 | -4.957029E-02 | 2.993401E-02 |
| L4A1 | 0.000000E+00 | -2.595493E-02 | 5.943790E-02 | -6.413478E-02 | 3.824796E-02 |
| L4A2 | 0.000000E+00 | 3.157351E-02 | -6.922708E-02 | 7.207062E-02 | -4.732373E-02 |
| L5A1 | 0.000000E+00 | 3.087409E-02 | -4.535266E-02 | 4.445817E-02 | -3.303100E-02 |
| L5A2 | 0.000000E+00 | -7.214418E-03 | 7.156945E-03 | 7.393227E-04 | -5.285439E-03 |
| L6A1 | 0.000000E+00 | -2.391771E-03 | -3.818093E-02 | 3.596373E-02 | -1.627182E-02 |
| L6A2 | -8.871022E+00 | -1.109911E-02 | -3.950985E-02 | 3.693613E-02 | -1.657404E-02 |
| L7A1 | -8.104759E+00 | -3.737958E-02 | 2.294390E-02 | -7.473623E-03 | 1.389116E-03 |
| L7A2 | 0.000000E+00 | -1.802340E-02 | 4.144468E-03 | 4.906262E-04 | -5.848208E-04 |
| L8A1 | -2.346372E+00 | 3.152151E-02 | -2.055506E-02 | 4.139347E-03 | -3.146889E-04 |
| L8A2 | 7.703511E-01 | 3.552884E-02 | -1.854723E-02 | 4.185136E-03 | -6.057051E-04 |
| L9A1 | 0.000000E+00 | -5.415240E-02 | 1.296944E-02 | -2.325589E-03 | 2.812589E-04 |
| L9A2 | -3.088491E+00 | -1.649524E-02 | 3.209610E-03 | -5.601897E-04 | 6.096271E-05 |
| Surface# | a12 | a14 | a16 | a18 | a20 |
| L1A1 | 1.748192E-03 | -2.987723E-04 | 2.124518E-05 | | |
| L1A2 | -1.024425E-02 | 2.207319E-03 | -1.981646E-04 | | |
| L2A1 | -7.986160E-03 | 1.813003E-03 | -1.702956E-04 | | |
| L2A2 | -2.378788E-03 | 5.132526E-04 | -4.224639E-05 | | |
| L3A1 | 1.629320E-04 | -4.188473E-04 | 8.263873E-05 | | |
| L3A2 | -9.330222E-03 | 1.464362E-03 | -9.020078E-05 | | |
| L4A1 | -1.373739E-02 | 3.042124E-03 | -4.026476E-04 | 2.892129E-05 | -8.620120E-07 |
| L4A2 | 2.060183E-02 | -5.882813E-03 | 1.045246E-03 | -1.037848E-04 | 4.376424E-06 |
| L5A1 | 1.597601E-02 | -4.771071E-03 | 8.498539E-04 | -8.281133E-05 | 3.395714E-06 |
| L5A2 | 3.147003E-03 | -8.792845E-04 | 1.339976E-04 | -1.081768E-05 | 3.644271E-07 |
| L6A1 | 4.087018E-03 | -5.767455E-04 | 4.016665E-05 | -6.270997E-07 | -4.423619E-08 |
| L6A2 | 4.334152E-03 | -6.916243E-04 | 6.628931E-05 | -3.501870E-06 | 7.823911E-08 |
| L7A1 | -1.949322E-04 | 2.487658E-05 | -2.451569E-06 | 1.382626E-07 | -3.142658E-09 |
| L7A2 | 1.410186E-04 | -1.687089E-05 | 1.113904E-06 | -3.897233E-08 | 5.667860E-10 |
| L8A1 | -2.197905E-05 | 6.498351E-06 | -5.403861E-07 | 2.058509E-08 | -3.062480E-10 |
| L8A2 | 5.837809E-05 | -3.725359E-06 | 1.515007E-07 | -3.550074E-09 | 3.633100E-11 |
| L9A1 | -2.146889E-05 | 1.019657E-06 | -2.928482E-08 | 4.662500E-10 | -3.163000E-12 |
| L9A2 | -3.977240E-06 | 1.581878E-07 | -3.781885E-09 | 5.018600E-11 | -2.850000E-13 |

FIG. 25

Longitudinal
spherical aber.
field
1.000

-0.04 0 0.07
(mm)

Field curvature
(sagittal direction)
image height (mm)
6.700

-0.15 0 0.05
(mm)

470 nm
555 nm
650 nm

Field curvature
(Tangential direction)
image height (mm)
6.700

-0.15 0 0.35
(mm)

Distortion
image height
(mm)
6.700

0 8
(%)

| | | Radius of curvature (mm) | Thickness /air gap (mm) | Refractive index | Abbe number | Focal length (mm) | Material |
|---|---|---|---|---|---|---|---|
| | | Embodiment 6 | | | | | |
| | | EFL = 6.566 mm ; HFOV = 43.548 degrees ; TTL = 8.443 mm | | | | | |
| | | Fno = 1.800 ; Image Height = 6.700 mm | | | | | |
| Surface # | | | | | | | |
| OBJ | Object | INFINITY | INFINITY | | | | |
| STO | Aperture stop | INFINITY | -0.558 | | | | |
| L1A1 | 1st lens element | 3.158 | 0.918 | 1.545 | 55.987 | 8.293 | Plastic |
| L1A2 | | 9.355 | 0.081 | | | | |
| L2A1 | 2nd lens element | 6.163 | 0.284 | 1.671 | 19.243 | -30.187 | Plastic |
| L2A2 | | 4.648 | 0.635 | | | | |
| L3A1 | 3rd lens element | 20.729 | 0.320 | 1.671 | 19.243 | 3694.751 | Plastic |
| L3A2 | | 20.772 | 0.130 | | | | |
| L4A1 | 4th lens element | 20.609 | 0.767 | 1.545 | 55.987 | 13.972 | Plastic |
| L4A2 | | -11.962 | 0.168 | | | | |
| L5A1 | 5th lens element | -12.213 | 0.400 | 1.671 | 19.243 | -66.444 | Plastic |
| L5A2 | | -16.982 | 0.498 | | | | |
| L6A1 | 6th lens element | 21.566 | 0.379 | 1.545 | 55.987 | -34.461 | Plastic |
| L6A2 | | 9.989 | 0.110 | | | | |
| L7A1 | 7th lens element | 4.064 | 0.486 | 1.545 | 55.987 | 15.734 | Plastic |
| L7A2 | | 7.383 | 0.438 | | | | |
| L8A1 | 8th lens element | 6.637 | 0.504 | 1.545 | 55.987 | 50.888 | Plastic |
| L8A2 | | 8.484 | 1.029 | | | | |
| L9A1 | 9th lens element | 16.920 | 0.500 | 1.535 | 55.711 | -6.385 | Plastic |
| L9A2 | | 2.823 | 0.476 | | | | |
| TFA1 | Filtering unit | INFINITY | 0.210 | 1.517 | 64.167 | | |
| TFA2 | | INFINITY | 0.111 | | | | |
| IMA | Image plane | INFINITY | | | | | |

FIG. 28

| Embodiment 6 | | | | |
|---|---|---|---|---|
| Aspherical Parameters | | | | |
| Surface# | K | a4 | a6 | a8 | a10 |
| L1A1 | 4.219140E-01 | -1.842009E-03 | 1.122704E-03 | -1.327738E-03 | 7.356524E-04 |
| L1A2 | 0.000000E+00 | -2.104469E-02 | 1.828775E-02 | -1.108527E-02 | 4.851852E-03 |
| L2A1 | -3.776015E+00 | -2.417633E-02 | 2.053403E-02 | -1.183416E-02 | 5.353284E-03 |
| L2A2 | 1.195839E+00 | -1.073573E-02 | 6.959095E-03 | -3.462064E-03 | 1.456616E-03 |
| L3A1 | 0.000000E+00 | -2.718187E-02 | 4.736365E-03 | -5.391983E-03 | 2.614480E-03 |
| L3A2 | 0.000000E+00 | -3.027224E-02 | 1.422416E-02 | -1.334094E-02 | 6.816047E-03 |
| L4A1 | 0.000000E+00 | -8.826295E-03 | 1.040392E-02 | -8.934282E-03 | 4.814313E-03 |
| L4A2 | 0.000000E+00 | 2.897222E-02 | -4.883121E-02 | 3.852669E-02 | -1.978299E-02 |
| L5A1 | 0.000000E+00 | 3.715887E-02 | -5.463746E-02 | 4.167768E-02 | -2.097597E-02 |
| L5A2 | 0.000000E+00 | 8.862773E-03 | -1.912757E-02 | 1.432920E-02 | -6.646351E-03 |
| L6A1 | 0.000000E+00 | -7.277531E-03 | -1.317388E-02 | 1.082593E-02 | -4.629649E-03 |
| L6A2 | -4.483383E+00 | -3.776491E-02 | 5.920345E-03 | 2.387980E-03 | -1.668096E-03 |
| L7A1 | -8.482356E+00 | -3.064971E-02 | 1.440363E-02 | -3.884457E-03 | 5.390295E-04 |
| L7A2 | 0.000000E+00 | -1.354251E-02 | 4.986685E-03 | -1.059072E-03 | -1.317807E-05 |
| L8A1 | -2.909759E+00 | 1.333590E-02 | -9.483494E-03 | 2.177675E-03 | -3.732321E-04 |
| L8A2 | 8.975252E-01 | 2.436655E-02 | -1.129982E-02 | 2.226680E-03 | -3.168423E-04 |
| L9A1 | 0.000000E+00 | -4.674944E-02 | 1.127490E-02 | -2.280296E-03 | 3.108288E-04 |
| L9A2 | -6.382433E+00 | -2.205747E-02 | 4.635034E-03 | -7.385628E-04 | 7.578854E-05 |
| Surface# | a12 | a14 | a16 | a18 | a20 |
| L1A1 | -2.261143E-04 | 3.530721E-05 | -2.205433E-06 | | |
| L1A2 | -1.367014E-03 | 2.190289E-04 | -1.490616E-05 | | |
| L2A1 | -1.601522E-03 | 2.758578E-04 | -1.983864E-05 | | |
| L2A2 | -4.106687E-04 | 5.969225E-05 | -1.941316E-06 | | |
| L3A1 | -6.614990E-04 | 9.017854E-05 | -4.507966E-06 | | |
| L3A2 | -1.885695E-03 | 2.845528E-04 | -1.797663E-05 | | |
| L4A1 | -1.538318E-03 | 2.963168E-04 | -3.372580E-05 | 2.111820E-06 | -5.654682E-08 |
| L4A2 | 6.880267E-03 | -1.613134E-03 | 2.442753E-04 | -2.160090E-05 | 8.522940E-07 |
| L5A1 | 7.032090E-03 | -1.553085E-03 | 2.185444E-04 | -1.784132E-05 | 6.438614E-07 |
| L5A2 | 1.941489E-03 | -3.578957E-04 | 4.119625E-05 | -2.751440E-06 | 8.235506E-08 |
| L6A1 | 1.195299E-03 | -2.064860E-04 | 2.428279E-05 | -1.755353E-06 | 5.749892E-08 |
| L6A2 | 4.324402E-04 | -6.461182E-05 | 6.057156E-06 | -3.346298E-07 | 8.225561E-09 |
| L7A1 | -3.720446E-05 | 7.138283E-07 | 1.872772E-08 | 1.211108E-09 | -8.508300E-11 |
| L7A2 | 3.990186E-05 | -6.993546E-06 | 5.733223E-07 | -2.362289E-08 | 3.943560E-10 |
| L8A1 | 4.109284E-05 | -2.331118E-06 | 3.486007E-08 | 2.211121E-09 | -7.608300E-11 |
| L8A2 | 3.292052E-05 | -2.357609E-06 | 1.080878E-07 | -2.815490E-09 | 3.137700E-11 |
| L9A1 | -2.607554E-05 | 1.338488E-06 | -4.115321E-08 | 6.976340E-10 | -5.024000E-12 |
| L9A2 | -4.910305E-06 | 2.012100E-07 | -5.075834E-09 | 7.204800E-11 | -4.400000E-13 |

FIG. 29

Longitudinal
spherical aber.
field
1.000

-0.015    0    0.025
(mm)

Field curvature
(sagittal direction)
image height (mm)
6.700

-0.06    0    0.02
(mm)

470 nm
555 nm
650 nm

Field curvature
(Tangential direction)
image height (mm)
6.700

-0.14    0    0.08
(mm)

Distortion
image height
(mm)
6.700

0    7
(%)

| Surface # | | Radius of curvature (mm) | Thickness /air gap (mm) | Refractive index | Abbe number | Focal length (mm) | Material |
|---|---|---|---|---|---|---|---|
| | | Embodiment 7 | | | | | |
| | | EFL = 7.098 mm；HFOV = 41.520 degrees；TTL = 8.812 mm | | | | | |
| | | Fno = 1.800；Image Height = 6.700 mm | | | | | |
| OBJ | Object | INFINITY | INFINITY | | | | |
| STO | Aperture stop | INFINITY | -0.684 | | | | |
| L1A1 | 1st lens element | 3.138 | 0.965 | 1.545 | 55.987 | 8.057 | Plastic |
| L1A2 | | 9.743 | 0.093 | | | | |
| L2A1 | 2nd lens element | 5.923 | 0.299 | 1.671 | 19.243 | -37.375 | Plastic |
| L2A2 | | 4.702 | 0.676 | | | | |
| L3A1 | 3rd lens element | 65.568 | 0.320 | 1.671 | 19.243 | -21.562 | Plastic |
| L3A2 | | 11.924 | 0.064 | | | | |
| L4A1 | 4th lens element | 14.957 | 0.772 | 1.545 | 55.987 | 11.476 | Plastic |
| L4A2 | | -10.596 | 0.079 | | | | |
| L5A1 | 5th lens element | -11.434 | 0.400 | 1.671 | 19.243 | -403.019 | Plastic |
| L5A2 | | -12.102 | 0.643 | | | | |
| L6A1 | 6th lens element | 14.290 | 0.494 | 1.545 | 55.987 | 86.312 | Plastic |
| L6A2 | | 20.253 | 0.227 | | | | |
| L7A1 | 7th lens element | 6.262 | 0.411 | 1.545 | 55.987 | -962308591.024 | Plastic |
| L7A2 | | 6.116 | 0.347 | | | | |
| L8A1 | 8th lens element | 5.620 | 0.566 | 1.545 | 55.987 | 27.145 | Plastic |
| L8A2 | | 8.727 | 1.075 | | | | |
| L9A1 | 9th lens element | 15.328 | 0.434 | 1.535 | 55.711 | -6.664 | Plastic |
| L9A2 | | 2.874 | 0.476 | | | | |
| TFA1 | Filtering unit | INFINITY | 0.210 | 1.517 | 64.167 | | |
| TFA2 | | INFINITY | 0.260 | | | | |
| IMA | Image plane | INFINITY | | | | | |

FIG. 32

| Embodiment 7 | | | | |
|---|---|---|---|---|
| Aspherical Parameters | | | | |
| Surface# | K | a4 | a6 | a8 | a10 |
| L1A1 | 4.260723E-01 | -1.988987E-03 | 1.133392E-03 | -1.321949E-03 | 7.376663E-04 |
| L1A2 | 0.000000E+00 | -2.122646E-02 | 1.823932E-02 | -1.108548E-02 | 4.852551E-03 |
| L2A1 | -3.765431E+00 | -2.416852E-02 | 2.049490E-02 | -1.179838E-02 | 5.352135E-03 |
| L2A2 | 1.104821E+00 | -1.084130E-02 | 6.929586E-03 | -3.464838E-03 | 1.456114E-03 |
| L3A1 | 0.000000E+00 | -2.741126E-02 | 4.661441E-03 | -5.354749E-03 | 2.554508E-03 |
| L3A2 | 0.000000E+00 | -3.008009E-02 | 1.427640E-02 | -1.334144E-02 | 6.815012E-03 |
| L4A1 | 0.000000E+00 | -8.793533E-03 | 1.039948E-02 | -8.932354E-03 | 4.815027E-03 |
| L4A2 | 0.000000E+00 | 2.910110E-02 | -4.869651E-02 | 3.854243E-02 | -1.978260E-02 |
| L5A1 | 0.000000E+00 | 3.716831E-02 | -5.467322E-02 | 4.167290E-02 | -2.097633E-02 |
| L5A2 | 0.000000E+00 | 9.114247E-03 | -1.912987E-02 | 1.433363E-02 | -6.645514E-03 |
| L6A1 | 0.000000E+00 | -1.102585E-02 | -1.283412E-02 | 1.083244E-02 | -4.630733E-03 |
| L6A2 | 2.204005E+01 | -3.556916E-02 | 5.778904E-03 | 2.386176E-03 | -1.667905E-03 |
| L7A1 | -2.117000E+01 | -2.952829E-02 | 1.442408E-02 | -3.916955E-03 | 5.397546E-04 |
| L7A2 | 0.000000E+00 | -1.565620E-02 | 4.992076E-03 | -1.055961E-03 | -1.310782E-05 |
| L8A1 | -3.476817E+00 | 1.377280E-02 | -9.462496E-03 | 2.177338E-03 | -3.732803E-04 |
| L8A2 | 1.094887E+00 | 2.411690E-02 | -1.127042E-02 | 2.225266E-03 | -3.168070E-04 |
| L9A1 | 0.000000E+00 | -4.695163E-02 | 1.127265E-02 | -2.280288E-03 | 3.108305E-04 |
| L9A2 | -7.870560E+00 | -2.223464E-02 | 4.626357E-03 | -7.381855E-04 | 7.581108E-05 |
| Surface# | a12 | a14 | a16 | a18 | a20 |
| L1A1 | -2.258719E-04 | 3.529593E-05 | -2.209592E-06 | | |
| L1A2 | -1.367068E-03 | 2.188941E-04 | -1.492058E-05 | | |
| L2A1 | -1.605582E-03 | 2.764416E-04 | -1.986271E-05 | | |
| L2A2 | -4.108756E-04 | 6.143155E-05 | -2.536345E-06 | | |
| L3A1 | -6.354855E-04 | 8.537321E-05 | -4.509745E-06 | | |
| L3A2 | -1.886431E-03 | 2.842731E-04 | -1.809043E-05 | | |
| L4A1 | -1.538206E-03 | 2.963379E-04 | -3.372515E-05 | 2.111851E-06 | -5.652573E-08 |
| L4A2 | 6.880422E-03 | -1.613131E-03 | 2.442759E-04 | -2.160036E-05 | 8.525427E-07 |
| L5A1 | 7.032179E-03 | -1.553049E-03 | 2.185506E-04 | -1.784102E-05 | 6.437051E-07 |
| L5A2 | 1.941576E-03 | -3.578895E-04 | 4.119716E-05 | -2.751361E-06 | 8.239247E-08 |
| L6A1 | 1.195146E-03 | -2.064997E-04 | 2.428225E-05 | -1.755289E-06 | 5.749787E-08 |
| L6A2 | 4.324547E-04 | -6.461149E-05 | 6.057123E-06 | -3.346373E-07 | 8.222286E-09 |
| L7A1 | -3.689906E-05 | 7.203369E-07 | 1.705805E-08 | 1.024731E-09 | -9.781900E-11 |
| L7A2 | 3.990012E-05 | -6.993921E-06 | 5.732767E-07 | -2.362584E-08 | 3.940320E-10 |
| L8A1 | 4.109040E-05 | -2.331255E-06 | 3.486539E-08 | 2.212067E-09 | -7.602100E-11 |
| L8A2 | 3.292542E-05 | -2.357555E-06 | 1.080758E-07 | -2.816071E-09 | 3.140000E-11 |
| L9A1 | -2.607545E-05 | 1.338491E-06 | -4.115308E-08 | 6.976380E-10 | -5.024000E-12 |
| L9A2 | -4.910380E-06 | 2.011936E-07 | -5.076183E-09 | 7.206300E-11 | -4.400000E-13 |

FIG. 33

Longitudinal
spherical aber.
field
1.000

-0.045    0    0.035
(mm)

Field curvature
(sagittal direction)
image height (mm)
6.700

-0.08    0   0.04
(mm)

470 nm
555 nm
650 nm

Field curvature
(Tangential direction)
image height (mm)
6.700

-0.16    0    0.06
(mm)

Distortion
image height
(mm)
6.700

0        8
(%)

| Embodiment 8 | | | | | | | |
| --- | --- | --- | --- | --- | --- | --- | --- |
| EFL = 7.125 mm；HFOV = 41.347 degrees；TTL = 8.885 mm | | | | | | | |
| Fno = 1.800；Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.726 | | | | |
| L1A1 | 1st lens element | 3.062 | 1.019 | 1.545 | 55.987 | 7.640 | Plastic |
| L1A2 | | 10.148 | 0.090 | | | | |
| L2A1 | 2nd lens element | 6.216 | 0.304 | 1.671 | 19.243 | -38.816 | Plastic |
| L2A2 | | 4.928 | 0.750 | | | | |
| L3A1 | 3rd lens element | 41.704 | 0.320 | 1.671 | 19.243 | -32.514 | Plastic |
| L3A2 | | 14.370 | 0.059 | | | | |
| L4A1 | 4th lens element | 132.117 | 0.702 | 1.545 | 55.987 | -139206059.693 | Plastic |
| L4A2 | | 131.868 | 0.042 | | | | |
| L5A1 | 5th lens element | 62.256 | 0.400 | 1.671 | 19.243 | 41.465 | Plastic |
| L5A2 | | -51.067 | 0.383 | | | | |
| L6A1 | 6th lens element | 12.439 | 0.431 | 1.545 | 55.987 | -96.958 | Plastic |
| L6A2 | | 9.950 | 0.239 | | | | |
| L7A1 | 7th lens element | 3.792 | 0.518 | 1.545 | 55.987 | 14.252 | Plastic |
| L7A2 | | 7.035 | 0.393 | | | | |
| L8A1 | 8th lens element | 5.768 | 0.538 | 1.545 | 55.987 | 30.369 | Plastic |
| L8A2 | | 8.551 | 0.997 | | | | |
| L9A1 | 9th lens element | 16.619 | 0.649 | 1.535 | 55.711 | -6.532 | Plastic |
| L9A2 | | 2.858 | 0.476 | | | | |
| TFA1 | Filtering unit | INFINITY | 0.210 | 1.517 | 64.167 | | |
| TFA2 | | INFINITY | 0.365 | | | | |
| IMA | Image plane | INFINITY | | | | | |

FIG. 36

| Embodiment 8 | | | | |
|---|---|---|---|---|
| Aspherical Parameters | | | | |
| Surface# | K | a4 | a6 | a8 | a10 |
| L1A1 | 4.409367E-01 | -1.680479E-03 | 1.169884E-03 | -1.326500E-03 | 7.364549E-04 |
| L1A2 | 0.000000E+00 | -2.117504E-02 | 1.822889E-02 | -1.109616E-02 | 4.850511E-03 |
| L2A1 | -4.316401E+00 | -2.447748E-02 | 2.050731E-02 | -1.184274E-02 | 5.351603E-03 |
| L2A2 | 1.264068E+00 | -1.068540E-02 | 7.049727E-03 | -3.424927E-03 | 1.462885E-03 |
| L3A1 | 0.000000E+00 | -2.751942E-02 | 4.780282E-03 | -5.397691E-03 | 2.617795E-03 |
| L3A2 | 0.000000E+00 | -2.926776E-02 | 1.423696E-02 | -1.333833E-02 | 6.819818E-03 |
| L4A1 | 0.000000E+00 | -8.066922E-03 | 1.044597E-02 | -8.946956E-03 | 4.811623E-03 |
| L4A2 | 0.000000E+00 | 2.778221E-02 | -4.883199E-02 | 3.853131E-02 | -1.978152E-02 |
| L5A1 | 0.000000E+00 | 3.607610E-02 | -5.470040E-02 | 4.166782E-02 | -2.097779E-02 |
| L5A2 | 0.000000E+00 | 9.273266E-03 | -1.911167E-02 | 1.433129E-02 | -6.646163E-03 |
| L6A1 | 0.000000E+00 | -7.075758E-03 | -1.303470E-02 | 1.083384E-02 | -4.631028E-03 |
| L6A2 | -4.719822E+00 | -3.871316E-02 | 5.830681E-03 | 2.378446E-03 | -1.668566E-03 |
| L7A1 | -6.566288E+00 | -3.045990E-02 | 1.444572E-02 | -3.893491E-03 | 5.420459E-04 |
| L7A2 | 0.000000E+00 | -1.342040E-02 | 5.014778E-03 | -1.059122E-03 | -1.335745E-05 |
| L8A1 | -2.973490E+00 | 1.342066E-02 | -9.469566E-03 | 2.177929E-03 | -3.732326E-04 |
| L8A2 | 4.550885E-01 | 2.420939E-02 | -1.128779E-02 | 2.225196E-03 | -3.168016E-04 |
| L9A1 | 0.000000E+00 | -4.660736E-02 | 1.126682E-02 | -2.280334E-03 | 3.108319E-04 |
| L9A2 | -8.078661E+00 | -2.239092E-02 | 4.609623E-03 | -7.377248E-04 | 7.579970E-05 |
| Surface# | a12 | a14 | a16 | a18 | a20 |
| L1A1 | -2.259917E-04 | 3.530917E-05 | -2.213411E-06 | | |
| L1A2 | -1.367429E-03 | 2.188384E-04 | -1.486878E-05 | | |
| L2A1 | -1.601829E-03 | 2.757263E-04 | -1.991065E-05 | | |
| L2A2 | -4.086977E-04 | 6.013032E-05 | -1.687113E-06 | | |
| L3A1 | -6.590117E-04 | 9.188843E-05 | -4.285619E-06 | | |
| L3A2 | -1.884956E-03 | 2.847237E-04 | -1.793778E-05 | | |
| L4A1 | -1.538519E-03 | 2.963742E-04 | -3.371275E-05 | 2.114389E-06 | -5.663949E-08 |
| L4A2 | 6.880466E-03 | -1.613150E-03 | 2.442617E-04 | -2.160594E-05 | 8.508490E-07 |
| L5A1 | 7.031823E-03 | -1.553115E-03 | 2.185427E-04 | -1.784099E-05 | 6.439963E-07 |
| L5A2 | 1.941476E-03 | -3.579064E-04 | 4.119316E-05 | -2.752048E-06 | 8.224814E-08 |
| L6A1 | 1.194910E-03 | -2.065167E-04 | 2.428022E-05 | -1.755642E-06 | 5.748359E-08 |
| L6A2 | 4.324208E-04 | -6.461462E-05 | 6.057346E-06 | -3.346992E-07 | 8.207538E-09 |
| L7A1 | -3.701233E-05 | 7.105011E-07 | 1.724377E-08 | 1.332442E-09 | -8.636400E-11 |
| L7A2 | 3.989293E-05 | -6.993774E-06 | 5.733282E-07 | -2.362133E-08 | 3.945130E-10 |
| L8A1 | 4.108847E-05 | -2.331461E-06 | 3.485332E-08 | 2.211674E-09 | -7.596800E-11 |
| L8A2 | 3.292584E-05 | -2.357524E-06 | 1.080774E-07 | -2.816028E-09 | 3.139800E-11 |
| L9A1 | -2.607543E-05 | 1.338491E-06 | -4.115307E-08 | 6.976380E-10 | -5.023000E-12 |
| L9A2 | -4.910373E-06 | 2.012056E-07 | -5.075885E-09 | 7.204900E-11 | -4.400000E-13 |

FIG. 37

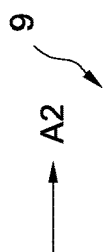
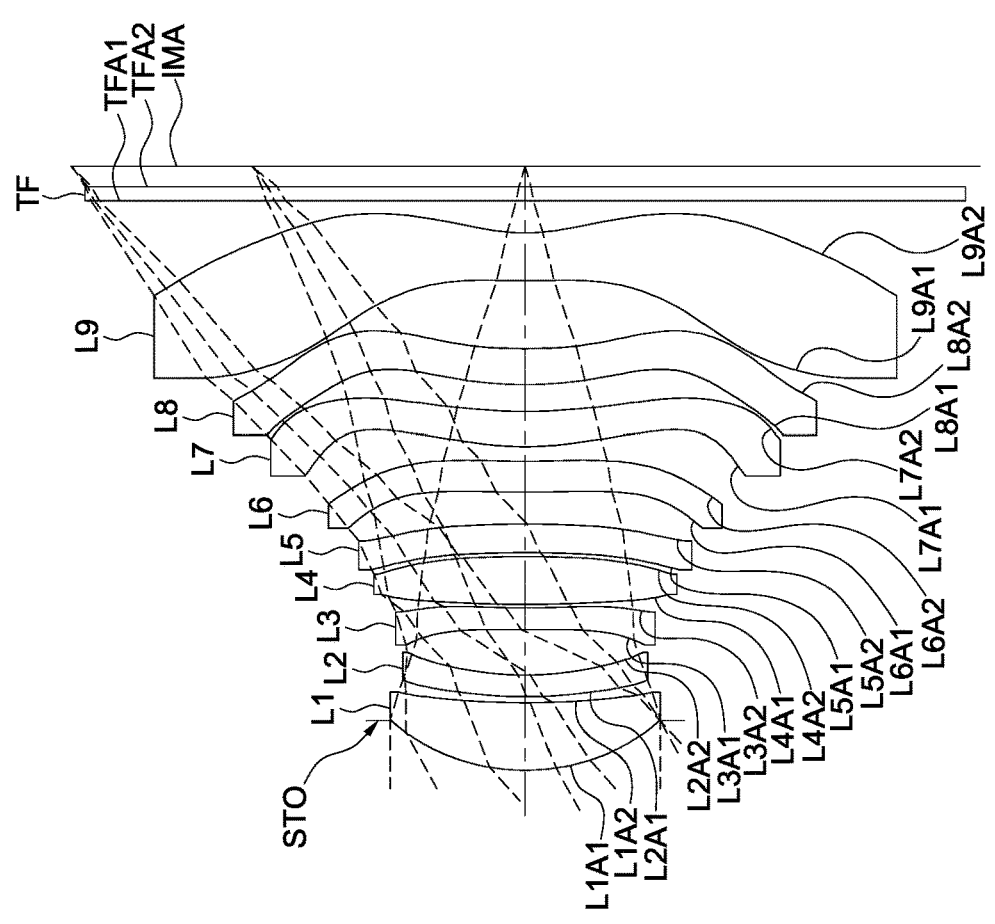
FIG. 38

Longitudinal
spherical aber.
field
1.000

-0.06 0 0.05
(mm)

Field curvature
(sagittal direction)
image height (mm)
6.700

-0.06 0 0.08
(mm)

470 nm
555 nm
650 nm

Field curvature
(Tangential direction)
image height (mm)
6.700

-0.16 0 0.18
(mm)

Distortion
image height
(mm)
6.700

-0.5 0 3.5
(%)

| Embodiment 9 | | | | | | | |
|---|---|---|---|---|---|---|---|
| EFL = 7.167 mm ; HFOV = 42.148 degrees ; TTL = 8.918 mm | | | | | | | |
| Fno = 1.800 ; Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.731 | | | | |
| L1A1 | 1st lens element | 3.128 | 0.987 | 1.545 | 55.987 | 8.093 | Plastic |
| L1A2 | | 9.505 | 0.090 | | | | |
| L2A1 | 2nd lens element | 5.975 | 0.322 | 1.671 | 19.243 | -37.168 | Plastic |
| L2A2 | | 4.724 | 0.674 | | | | |
| L3A1 | 3rd lens element | 66.136 | 0.320 | 1.573 | 37.666 | -24.279 | Plastic |
| L3A2 | | 11.422 | 0.054 | | | | |
| L4A1 | 4th lens element | 17.612 | 0.709 | 1.545 | 55.987 | 13.199 | Plastic |
| L4A2 | | -12.034 | 0.054 | | | | |
| L5A1 | 5th lens element | -13.601 | 0.424 | 1.651 | 21.514 | -126.724 | Plastic |
| L5A2 | | -16.460 | 0.469 | | | | |
| L6A1 | 6th lens element | 20.590 | 0.456 | 1.545 | 55.987 | -40.182 | Plastic |
| L6A2 | | 10.541 | 0.215 | | | | |
| L7A1 | 7th lens element | 4.022 | 0.513 | 1.545 | 55.987 | 15.900 | Plastic |
| L7A2 | | 7.153 | 0.398 | | | | |
| L8A1 | 8th lens element | 6.194 | 0.534 | 1.545 | 55.987 | 36.843 | Plastic |
| L8A2 | | 8.674 | 1.000 | | | | |
| L9A1 | 9th lens element | 16.757 | 0.709 | 1.535 | 55.711 | -5.955 | Plastic |
| L9A2 | | 2.647 | 0.476 | | | | |
| TFA1 | Filtering unit | INFINITY | 0.210 | 1.517 | 64.167 | | |
| TFA2 | | INFINITY | 0.304 | | | | |
| IMA | Image plane | INFINITY | | | | | |

FIG. 40

| Embodiment 9 | | | | |
|---|---|---|---|---|
| Aspherical Parameters | | | | |
| Surface# | K | a4 | a6 | a8 | a10 |
| L1A1 | 4.433212E-01 | -1.551690E-03 | 7.531180E-04 | -6.728471E-04 | 2.423733E-04 |
| L1A2 | 0.000000E+00 | -2.236177E-02 | 2.066664E-02 | -1.334011E-02 | 6.011204E-03 |
| L2A1 | -3.759998E+00 | -2.285515E-02 | 1.745950E-02 | -8.393568E-03 | 3.295466E-03 |
| L2A2 | 1.147483E+00 | -1.092840E-02 | 6.339023E-03 | -1.840492E-03 | 2.002041E-04 |
| L3A1 | 0.000000E+00 | -2.632347E-02 | -3.939015E-03 | 7.995867E-03 | -7.355854E-03 |
| L3A2 | 0.000000E+00 | -2.884683E-02 | 1.265575E-02 | -1.157215E-02 | 5.553506E-03 |
| L4A1 | 0.000000E+00 | -1.385329E-02 | 1.973721E-02 | -1.758802E-02 | 9.566756E-03 |
| L4A2 | 0.000000E+00 | 2.899220E-02 | -4.891331E-02 | 4.039050E-02 | -2.227386E-02 |
| L5A1 | 0.000000E+00 | 3.432691E-02 | -5.058002E-02 | 3.986565E-02 | -2.170556E-02 |
| L5A2 | 0.000000E+00 | 7.187763E-03 | -1.579077E-02 | 1.202261E-02 | -5.997331E-03 |
| L6A1 | 0.000000E+00 | -1.081203E-03 | -2.518279E-02 | 2.184953E-02 | -1.038961E-02 |
| L6A2 | -1.073167E+01 | -4.170100E-02 | 8.560325E-03 | 1.370953E-03 | -1.391427E-03 |
| L7A1 | -7.838362E+00 | -3.092310E-02 | 1.441418E-02 | -3.907400E-03 | 6.545334E-04 |
| L7A2 | 0.000000E+00 | -1.298557E-02 | 3.872680E-03 | -5.498938E-04 | -1.112846E-04 |
| L8A1 | -2.456984E+00 | 1.191036E-02 | -7.130571E-03 | 8.252776E-04 | 3.325270E-05 |
| L8A2 | 9.021950E-01 | 2.377426E-02 | -1.068423E-02 | 1.935905E-03 | -2.486239E-04 |
| L9A1 | 0.000000E+00 | -4.725392E-02 | 1.152046E-02 | -2.329639E-03 | 3.169448E-04 |
| L9A2 | -8.129320E+00 | -2.185957E-02 | 4.682209E-03 | -7.632062E-04 | 7.908714E-05 |
| Surface# | a12 | a14 | a16 | a18 | a20 |
| L1A1 | -3.361987E-05 | -1.170674E-06 | 5.156317E-07 | | |
| L1A2 | -1.697461E-03 | 2.668708E-04 | -1.759296E-05 | | |
| L2A1 | -9.304770E-04 | 1.598506E-04 | -1.163595E-05 | | |
| L2A2 | 9.291613E-05 | -4.532093E-05 | 6.928293E-06 | | |
| L3A1 | 3.364361E-03 | -7.567602E-04 | 6.779842E-05 | | |
| L3A2 | -1.372854E-03 | 1.785562E-04 | -9.478416E-06 | | |
| L4A1 | -3.264235E-03 | 7.241584E-04 | -1.033218E-04 | 8.726172E-06 | -3.309034E-07 |
| L4A2 | 8.460086E-03 | -2.167425E-03 | 3.545226E-04 | -3.324942E-05 | 1.360554E-06 |
| L5A1 | 8.080168E-03 | -1.993802E-03 | 3.104971E-04 | -2.752299E-05 | 1.054538E-06 |
| L5A2 | 1.940449E-03 | -4.030962E-04 | 5.268186E-05 | -3.965661E-06 | 1.310080E-07 |
| L6A1 | 3.021634E-03 | -5.658893E-04 | 6.734099E-05 | -4.639775E-06 | 1.405179E-07 |
| L6A2 | 3.649265E-04 | -5.081698E-05 | 4.210106E-06 | -2.011882E-07 | 4.318501E-09 |
| L7A1 | -8.925707E-05 | 1.135738E-05 | -1.123410E-06 | 6.405286E-08 | -1.479757E-09 |
| L7A2 | 4.768738E-05 | -6.910664E-06 | 5.161961E-07 | -2.000219E-08 | 3.192210E-10 |
| L8A1 | -3.019771E-05 | 5.220024E-06 | -4.404321E-07 | 1.855962E-08 | -3.125090E-10 |
| L8A2 | 2.379498E-05 | -1.626554E-06 | 7.336393E-08 | -1.912385E-09 | 2.145400E-11 |
| L9A1 | -2.662109E-05 | 1.373319E-06 | -4.259189E-08 | 7.309590E-10 | -5.348000E-12 |
| L9A2 | -5.138141E-06 | 2.103794E-07 | -5.290989E-09 | 7.475100E-11 | -4.540000E-13 |

FIG. 41

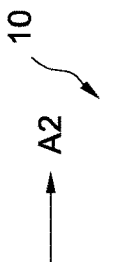
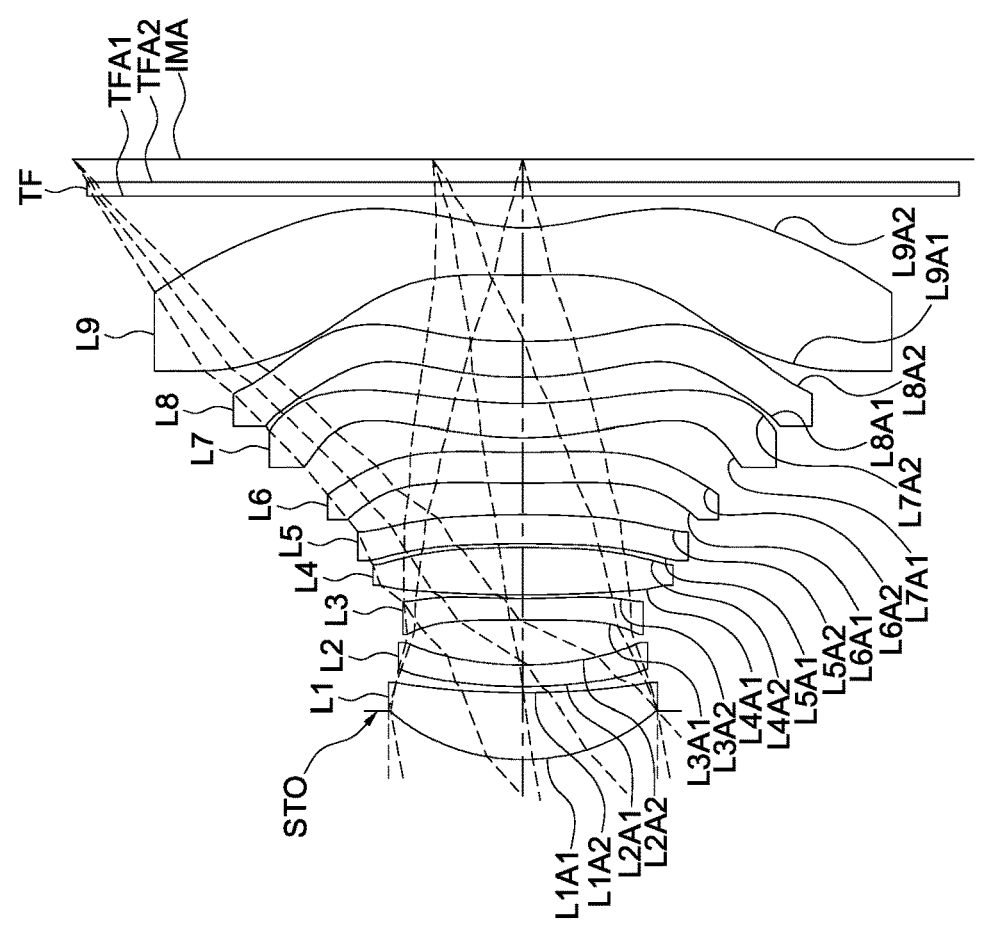
FIG. 42

Longitudinal
spherical aber.
field
1.000

-0.07     0     0.06
(mm)

Field curvature
(sagittal direction)
image height (mm)
6.700

-0.08     0     0.06
(mm)

470 nm
555 nm
650 nm

Field curvature
(Tangential direction)
image height (mm)
6.700

-0.1     0     0.14
(mm)

Distortion
image height
(mm)
6.700

-0.5  0          3
(%)

| Embodiment 10 | | | | | | | |
|---|---|---|---|---|---|---|---|
| EFL = 7.200 mm ; HFOV = 42.178 degrees ; TTL = 8.944 mm | | | | | | | |
| Fno = 1.800 ; Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.726 | | | | |
| L1A1 | 1st lens element | 3.149 | 0.989 | 1.545 | 55.987 | 8.098 | Plastic |
| L1A2 | | 9.714 | 0.088 | | | | |
| L2A1 | 2nd lens element | 5.963 | 0.326 | 1.661 | 20.373 | -37.867 | Plastic |
| L2A2 | | 4.719 | 0.673 | | | | |
| L3A1 | 3rd lens element | 70.620 | 0.321 | 1.567 | 37.533 | -24.173 | Plastic |
| L3A2 | | 11.507 | 0.054 | | | | |
| L4A1 | 4th lens element | 17.681 | 0.709 | 1.544 | 49.922 | 13.210 | Plastic |
| L4A2 | | -12.027 | 0.056 | | | | |
| L5A1 | 5th lens element | -13.570 | 0.431 | 1.671 | 19.243 | -120.595 | Plastic |
| L5A2 | | -16.481 | 0.473 | | | | |
| L6A1 | 6th lens element | 22.387 | 0.458 | 1.544 | 49.922 | -39.770 | Plastic |
| L6A2 | | 10.948 | 0.212 | | | | |
| L7A1 | 7th lens element | 4.016 | 0.509 | 1.545 | 55.987 | 15.896 | Plastic |
| L7A2 | | 7.137 | 0.392 | | | | |
| L8A1 | 8th lens element | 6.210 | 0.531 | 1.545 | 55.987 | 37.241 | Plastic |
| L8A2 | | 8.669 | 0.996 | | | | |
| L9A1 | 9th lens element | 16.760 | 0.703 | 1.535 | 55.711 | -6.107 | Plastic |
| L9A2 | | 2.704 | 0.476 | | | | |
| TFA1 | Filtering unit | INFINITY | 0.210 | 1.517 | 64.167 | | |
| TFA2 | | INFINITY | 0.337 | | | | |
| IMA | Image plane | INFINITY | | | | | |

FIG. 44

| Embodiment 10 | | | | |
|---|---|---|---|---|
| Aspherical Parameters | | | | |
| Surface# | K | a4 | a6 | a8 | a10 |
| L1A1 | 4.402951E-01 | -1.498237E-03 | 1.630150E-04 | -2.855609E-04 | 1.847765E-04 |
| L1A2 | 0.000000E+00 | -2.223449E-02 | 2.033526E-02 | -1.308112E-02 | 5.932041E-03 |
| L2A1 | -3.640524E+00 | -2.283215E-02 | 1.761859E-02 | -8.484986E-03 | 3.289895E-03 |
| L2A2 | 1.143847E+00 | -1.130070E-02 | 8.537090E-03 | -5.172853E-03 | 2.557265E-03 |
| L3A1 | 0.000000E+00 | -2.784549E-02 | 1.561475E-03 | -6.415056E-05 | -1.389508E-03 |
| L3A2 | 0.000000E+00 | -2.885692E-02 | 1.222961E-02 | -1.069472E-02 | 4.846875E-03 |
| L4A1 | 0.000000E+00 | -1.519381E-02 | 2.366163E-02 | -2.283569E-02 | 1.354979E-02 |
| L4A2 | 0.000000E+00 | 2.854133E-02 | -4.986128E-02 | 4.368477E-02 | -2.611484E-02 |
| L5A1 | 0.000000E+00 | 3.433437E-02 | -5.080594E-02 | 4.121187E-02 | -2.371628E-02 |
| L5A2 | 0.000000E+00 | 7.506494E-03 | -1.635858E-02 | 1.279801E-02 | -6.664240E-03 |
| L6A1 | 0.000000E+00 | -4.491643E-03 | -1.981308E-02 | 1.792984E-02 | -8.837389E-03 |
| L6A2 | -9.890041E+00 | -4.239499E-02 | 1.103658E-02 | -7.359253E-04 | -5.828299E-04 |
| L7A1 | -7.399801E+00 | -3.249407E-02 | 1.741888E-02 | -5.804872E-03 | 1.222635E-03 |
| L7A2 | 0.000000E+00 | -1.526468E-02 | 7.013763E-03 | -2.235792E-03 | 3.671877E-04 |
| L8A1 | -1.933056E+00 | 1.498180E-02 | -1.055847E-02 | 2.445939E-03 | -3.859015E-04 |
| L8A2 | 8.970667E-01 | 2.485298E-02 | -1.198549E-02 | 2.475388E-03 | -3.625722E-04 |
| L9A1 | 0.000000E+00 | -4.680031E-02 | 1.128476E-02 | -2.276565E-03 | 3.095907E-04 |
| L9A2 | -8.139848E+00 | -2.129301E-02 | 4.354580E-03 | -6.840479E-04 | 6.892701E-05 |
| Surface# | a12 | a14 | a16 | a18 | a20 |
| L1A1 | -6.322403E-05 | 1.017918E-05 | -5.969287E-07 | | |
| L1A2 | -1.697922E-03 | 2.722887E-04 | -1.844131E-05 | | |
| L2A1 | -9.102178E-04 | 1.560324E-04 | -1.162704E-05 | | |
| L2A2 | -8.229035E-04 | 1.455999E-04 | -9.894232E-06 | | |
| L3A1 | 9.646093E-04 | -2.548567E-04 | 2.501412E-05 | | |
| L3A2 | -1.099639E-03 | 1.279253E-04 | -5.875860E-06 | | |
| L4A1 | -5.104830E-03 | 1.250231E-03 | -1.940625E-04 | 1.738097E-05 | -6.815063E-07 |
| L4A2 | 1.075929E-02 | -2.946130E-03 | 5.053453E-04 | -4.883066E-05 | 2.026724E-06 |
| L5A1 | 9.420779E-03 | -2.467230E-03 | 4.029550E-04 | -3.698316E-05 | 1.451241E-06 |
| L5A2 | 2.264145E-03 | -4.923092E-04 | 6.653372E-05 | -5.093090E-06 | 1.683100E-07 |
| L6A1 | 2.679048E-03 | -5.268033E-04 | 6.588379E-05 | -4.741472E-06 | 1.485344E-07 |
| L6A2 | 2.085159E-04 | -3.716213E-05 | 4.177674E-06 | -2.755406E-07 | 7.863547E-09 |
| L7A1 | -1.785390E-04 | 1.837005E-05 | -1.292626E-06 | 5.465607E-08 | -1.001089E-09 |
| L7A2 | -3.197454E-05 | 1.143211E-06 | 2.933471E-08 | -3.806633E-09 | 9.102700E-11 |
| L8A1 | 3.500909E-05 | -1.056186E-06 | -7.398222E-08 | 6.649829E-09 | -1.470260E-10 |
| L8A2 | 3.775680E-05 | -2.662174E-06 | 1.192939E-07 | -3.034858E-09 | 3.309900E-11 |
| L9A1 | -2.591999E-05 | 1.328130E-06 | -4.076536E-08 | 6.899140E-10 | -4.960000E-12 |
| L9A2 | -4.374930E-06 | 1.756595E-07 | -4.349689E-09 | 6.076800E-11 | -3.670000E-13 |

FIG. 45

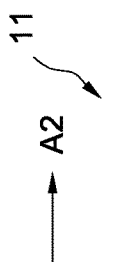
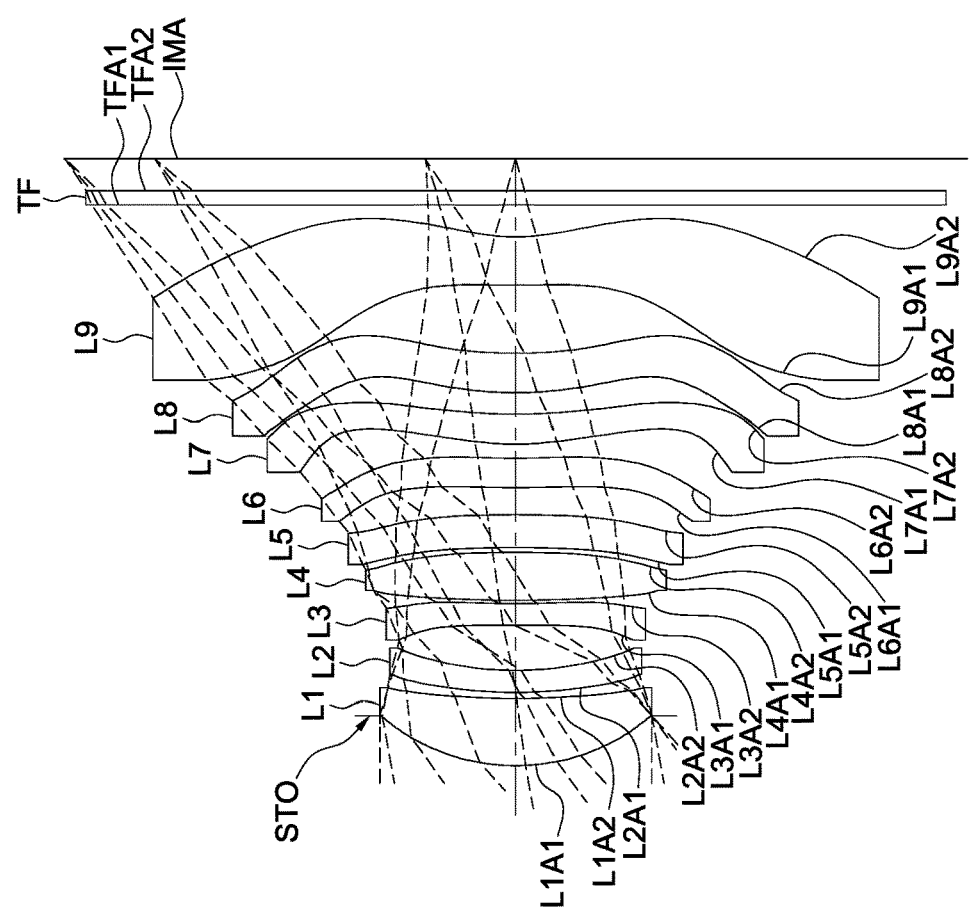
FIG. 46

Longitudinal
spherical aber.
field
1.000

-0.015    0    0.025
(mm)

Field curvature
(sagittal direction)
image height (mm)
6.700

-0.04   0   0.02
(mm)

| | 470 nm |
| --- | --- |
| | 555 nm |
| | 650 nm |

Field curvature
(Tangential direction)
image height (mm)
6.700

-0.12    0    0.08
(mm)

Distortion
image height
(mm)
6.700

0    2.5
(%)

| Embodiment 11 | | | | | | | |
| --- | --- | --- | --- | --- | --- | --- | --- |
| EFL = 7.257 mm ; HFOV = 42.091 degrees ; TTL = 9.015 mm | | | | | | | |
| Fno = 1.800 ; Image Height = 6.700 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.739 | | | | |
| L1A1 | 1st lens element | 3.146 | 0.989 | 1.545 | 55.987 | 8.065 | Plastic |
| L1A2 | | 9.779 | 0.088 | | | | |
| L2A1 | 2nd lens element | 5.949 | 0.328 | 1.671 | 19.243 | -38.048 | Plastic |
| L2A2 | | 4.726 | 0.671 | | | | |
| L3A1 | 3rd lens element | 64.627 | 0.322 | 1.671 | 19.243 | -20.504 | Plastic |
| L3A2 | | 11.412 | 0.053 | | | | |
| L4A1 | 4th lens element | 17.542 | 0.717 | 1.545 | 55.987 | 13.148 | Plastic |
| L4A2 | | -11.987 | 0.066 | | | | |
| L5A1 | 5th lens element | -13.368 | 0.490 | 1.671 | 19.243 | -132.477 | Plastic |
| L5A2 | | -15.941 | 0.405 | | | | |
| L6A1 | 6th lens element | 19.580 | 0.432 | 1.545 | 55.987 | -40.917 | Plastic |
| L6A2 | | 10.356 | 0.212 | | | | |
| L7A1 | 7th lens element | 3.999 | 0.439 | 1.545 | 55.987 | 14.572 | Plastic |
| L7A2 | | 7.723 | 0.321 | | | | |
| L8A1 | 8th lens element | 6.186 | 0.585 | 1.545 | 55.987 | 36.476 | Plastic |
| L8A2 | | 8.671 | 1.016 | | | | |
| L9A1 | 9th lens element | 16.683 | 0.715 | 1.535 | 55.711 | -6.407 | Plastic |
| L9A2 | | 2.811 | 0.476 | | | | |
| TFA1 | Filtering unit | INFINITY | 0.210 | 1.517 | 64.167 | | |
| TFA2 | | INFINITY | 0.481 | | | | |
| IMA | Image plane | INFINITY | | | | | |

FIG. 48

| Embodiment 11 | | | | |
| --- | --- | --- | --- | --- |
| Aspherical Parameters | | | | |
| Surface# | K | a4 | a6 | a8 | a10 |
| L1A1 | 4.314892E-01 | -1.739510E-03 | 1.041871E-03 | -1.037779E-03 | 4.941639E-04 |
| L1A2 | 0.000000E+00 | -2.158921E-02 | 1.904467E-02 | -1.186515E-02 | 5.306342E-03 |
| L2A1 | -3.393916E+00 | -2.402617E-02 | 2.027972E-02 | -1.156529E-02 | 5.261297E-03 |
| L2A2 | 1.123123E+00 | -9.170195E-03 | 3.810151E-03 | -8.030261E-04 | 3.038845E-04 |
| L3A1 | 0.000000E+00 | -2.653148E-02 | 1.654143E-03 | -1.871525E-03 | 3.670515E-04 |
| L3A2 | 0.000000E+00 | -2.921127E-02 | 1.310746E-02 | -1.210196E-02 | 5.936919E-03 |
| L4A1 | 0.000000E+00 | -1.112514E-02 | 1.426538E-02 | -1.224948E-02 | 6.439404E-03 |
| L4A2 | 0.000000E+00 | 2.868426E-02 | -4.681511E-02 | 3.591222E-02 | -1.797204E-02 |
| L5A1 | 0.000000E+00 | 3.607457E-02 | -5.247128E-02 | 4.019765E-02 | -2.071675E-02 |
| L5A2 | 0.000000E+00 | 8.598296E-03 | -1.932303E-02 | 1.513446E-02 | -7.420270E-03 |
| L6A1 | 0.000000E+00 | -3.737836E-03 | -1.963105E-02 | 1.656106E-02 | -7.527473E-03 |
| L6A2 | -1.132184E+01 | -4.166814E-02 | 1.030443E-02 | -5.142875E-04 | -5.287345E-04 |
| L7A1 | -9.033093E+00 | -3.089335E-02 | 1.543280E-02 | -4.518622E-03 | 7.350916E-04 |
| L7A2 | 0.000000E+00 | -1.450462E-02 | 6.320185E-03 | -1.818712E-03 | 2.229609E-04 |
| L8A1 | -2.310138E+00 | 1.311636E-02 | -8.919188E-03 | 1.858987E-03 | -2.793717E-04 |
| L8A2 | 9.076069E-01 | 2.434773E-02 | -1.156945E-02 | 2.343524E-03 | -3.409534E-04 |
| L9A1 | 0.000000E+00 | -4.553253E-02 | 1.069819E-02 | -2.169198E-03 | 2.995321E-04 |
| L9A2 | -8.270192E+00 | -1.930246E-02 | 3.385563E-03 | -4.965417E-04 | 4.919621E-05 |
| Surface# | a12 | a14 | a16 | a18 | a20 |
| L1A1 | -1.315505E-04 | 1.769786E-05 | -9.177572E-07 | | |
| L1A2 | -1.514707E-03 | 2.430195E-04 | -1.639941E-05 | | |
| L2A1 | -1.596767E-03 | 2.780312E-04 | -2.012423E-05 | | |
| L2A2 | -1.640284E-04 | 4.026870E-05 | -2.584638E-06 | | |
| L3A1 | 1.623978E-04 | -7.242053E-05 | 8.708568E-06 | | |
| L3A2 | -1.531749E-03 | 2.119528E-04 | -1.218136E-05 | | |
| L4A1 | -2.058261E-03 | 4.138074E-04 | -5.223793E-05 | 3.886147E-06 | -1.307140E-07 |
| L4A2 | 6.178363E-03 | -1.455008E-03 | 2.242273E-04 | -2.033611E-05 | 8.251148E-07 |
| L5A1 | 7.208921E-03 | -1.665772E-03 | 2.458548E-04 | -2.100074E-05 | 7.882563E-07 |
| L5A2 | 2.303300E-03 | -4.532025E-04 | 5.572686E-05 | -3.952017E-06 | 1.240079E-07 |
| L6A1 | 2.081587E-03 | -3.740828E-04 | 4.354227E-05 | -2.994677E-06 | 9.196547E-08 |
| L6A2 | 1.515773E-04 | -2.037414E-05 | 1.725561E-06 | -9.480129E-08 | 2.507613E-09 |
| L7A1 | -6.690455E-05 | 2.644203E-06 | 4.345818E-08 | -8.074447E-09 | 2.452340E-10 |
| L7A2 | -3.062025E-06 | -2.281663E-06 | 2.664555E-07 | -1.269804E-08 | 2.307680E-10 |
| L8A1 | 2.498960E-05 | -6.623230E-07 | -6.815882E-08 | 5.699519E-09 | -1.259740E-10 |
| L8A2 | 3.578428E-05 | -2.563731E-06 | 1.170116E-07 | -3.029721E-09 | 3.357200E-11 |
| L9A1 | -2.540357E-05 | 1.313854E-06 | -4.056774E-08 | 6.883310E-10 | -4.943000E-12 |
| L9A2 | -3.100614E-06 | 1.231459E-07 | -2.998248E-09 | 4.101400E-11 | -2.420000E-13 |

FIG. 49

| Embodiment | 1st | 2nd | 3rd | 4th | 5th | 6th |
|---|---|---|---|---|---|---|
| T4/(Tmin+Tmin2) | 1.289 | 1.057 | 1.027 | 1.262 | 1.330 | 1.270 |
| T4/T9 | 2.299 | 1.003 | 1.247 | 1.323 | 1.002 | 1.536 |
| V2+V3+V4+V5 | 113.716 | 113.716 | 113.716 | 113.716 | 113.716 | 113.716 |
| ALT/(T7+G78) | 5.823 | 5.297 | 5.549 | 4.829 | 5.178 | 4.932 |
| (T8+G89+T9)/(G23+G56) | 2.497 | 1.934 | 1.482 | 1.692 | 2.321 | 1.796 |
| TL/BFL | 10.120 | 7.245 | 6.047 | 8.860 | 13.935 | 9.592 |
| TTL/AAG | 2.813 | 3.495 | 2.774 | 2.783 | 3.237 | 2.735 |
| (T1+T3)/D32t51 | 1.272 | 1.690 | 1.352 | 1.454 | 1.374 | 1.163 |
| (V4+V5+V6)/(V2+V3) | 3.409 | 3.409 | 3.409 | 3.409 | 3.409 | 3.409 |
| ALT/(G56+T6) | 5.831 | 5.723 | 4.955 | 4.676 | 5.999 | 5.202 |
| AAG/(G23+G56+G78) | 2.498 | 1.801 | 1.834 | 1.832 | 1.724 | 1.966 |
| BFL/(G12+G23) | 1.181 | 1.696 | 1.531 | 1.219 | 0.829 | 1.114 |
| EFL/(G56+G78) | 10.000 | 8.269 | 7.564 | 6.567 | 6.560 | 7.017 |
| (T7+G78)/T8 | 1.382 | 2.042 | 1.900 | 2.390 | 1.330 | 1.833 |
| V3+V5+V7 | 94.473 | 94.473 | 94.473 | 94.473 | 58.859 | 94.473 |
| ALT/(G23+G89) | 2.444 | 3.996 | 2.603 | 2.799 | 3.473 | 2.740 |
| AAG/(T6+G67) | 4.791 | 4.405 | 6.055 | 5.102 | 5.705 | 6.321 |
| EFL/BFL | 8.651 | 6.615 | 6.007 | 7.902 | 10.490 | 8.237 |
| (T1+T4)/(T2+T5) | 2.409 | 2.465 | 1.923 | 2.599 | 2.544 | 2.463 |
| Tmax/Tmin | 2.963 | 3.761 | 2.839 | 3.458 | 3.082 | 3.229 |
| (AAG+Tavg)/(Tmin+Tmin2) | 5.420 | 4.492 | 5.546 | 5.985 | 5.240 | 5.947 |
| TL/Tmax | 8.412 | 6.665 | 8.271 | 7.673 | 8.595 | 8.329 |

FIG. 50A

| Embodiment | 7th | 8th | 9th | 10th | 11th |
|---|---|---|---|---|---|
| T4/(Tmin+Tmin2) | 1.248 | 1.126 | 1.104 | 1.096 | 1.103 |
| T4/T9 | 1.781 | 1.082 | 1.000 | 1.008 | 1.002 |
| V2+V3+V4+V5 | 113.716 | 113.716 | 134.409 | 127.071 | 113.716 |
| ALT/(T7+G78) | 6.147 | 5.355 | 5.463 | 5.522 | 6.600 |
| (T8+G89+T9)/(G23+G56) | 1.573 | 1.928 | 1.962 | 1.946 | 2.153 |
| TL/BFL | 8.310 | 7.448 | 8.006 | 7.737 | 6.724 |
| TTL/AAG | 2.749 | 3.009 | 3.020 | 3.037 | 3.184 |
| (T1+T3)/D32t51 | 1.404 | 1.666 | 1.601 | 1.599 | 1.569 |
| (V4+V5+V6)/(V2+V3) | 3.409 | 3.409 | 2.346 | 2.057 | 3.409 |
| ALT/(G56+T6) | 4.098 | 6.000 | 5.375 | 5.345 | 6.000 |
| AAG/(G23+G56+G78) | 1.924 | 1.936 | 1.916 | 1.914 | 2.027 |
| BFL/(G12+G23) | 1.230 | 1.252 | 1.297 | 1.345 | 1.538 |
| EFL/(G56+G78) | 7.166 | 9.188 | 8.263 | 8.318 | 9.999 |
| (T7+G78)/T8 | 1.339 | 1.695 | 1.705 | 1.698 | 1.300 |
| V3+V5+V7 | 94.473 | 94.473 | 115.166 | 112.763 | 94.473 |
| ALT/(G23+G89) | 2.661 | 2.794 | 2.972 | 2.981 | 2.973 |
| AAG/(T6+G67) | 4.447 | 4.407 | 4.400 | 4.400 | 4.401 |
| EFL/BFL | 7.499 | 6.775 | 7.238 | 7.033 | 6.218 |
| (T1+T4)/(T2+T5) | 2.486 | 2.447 | 2.273 | 2.244 | 2.085 |
| Tmax/Tmin | 3.230 | 3.357 | 3.083 | 3.081 | 3.071 |
| (AAG+Tavg)/(Tmin+Tmin2) | 6.019 | 5.605 | 5.457 | 5.410 | 5.215 |
| TL/Tmax | 8.152 | 7.688 | 8.030 | 8.010 | 7.933 |

FIG. 50B

OPTICAL IMAGING LENS

CROSS-REFERENCE TO RELATED APPLICATIONS

This application claims priority to P.R.C. Patent Application No. 202210032815.2 titled "Optical Imaging Lens," filed on Jan. 12, 2022, with the China National Intellectual Property Administration (CNIPA) of the People's Republic of China.

TECHNICAL FIELD

The present disclosure relates to optical imaging lenses, and particularly, optical imaging lenses having, in some embodiments, nine lens elements.

BACKGROUND

As the specifications of mobile electronic devices rapidly evolve, various types of key components, such as optical imaging lenses, are developed. Desirable objectives for designing an optical imaging lens may not be limited to great aperture stop and compact sizes, but may also include high pixel number along with high resolution. High pixel number implies that an image height must be increased by using a greater image sensor accepting imaging rays. Traditional designs providing high pixel number may force the resolution to be raised, and enlarging aperture stop in such designs will raise difficulty of design. Accordingly, adding lens elements in a limit system length, promoting resolution and enlarging aperture stop, along with increasing image height in an optical imaging lens may be a challenge in the industry.

SUMMARY

In light of aforesaid problems, the present disclosure provides for optical imaging lenses showing a slim and compact appearance, small Fno, great image height and good imaging quality.

In an example embodiment, an optical imaging lens may be used for shooting a video or picture in a mobile electronical device, such as cell phone, digital camera, tablet computer, personal digital assistant (PDA), etc. The optical imaging lens may comprise nine lens elements, hereinafter referred to as first, second, third, fourth, fifth, sixth, seventh, eighth and ninth lens elements and positioned sequentially from an object side to an image side along an optical axis. Each of the first, second, third, fourth, fifth, sixth, seventh, eighth and ninth lens elements may also have an object-side surface facing toward the object side and allowing imaging rays to pass through. Each of the first, second, third, fourth, fifth, sixth, seventh, eighth and ninth lens elements may also have an image-side surface facing toward the image side and allowing the imaging rays to pass through. Through configuration of convex/concave surface shape of the nine lens elements, the optical imaging lens may increase resolution and enlarge aperture stop and image height at the same time.

In the specification, parameters used here are defined as follows: a thickness of the first lens element along the optical axis is represented by T1, a distance from the image-side surface of the first lens element to the object-side surface of the second lens element along the optical axis, i.e. an air gap between the first lens element and the second lens element along the optical axis, is represented by G12, a thickness of the second lens element along the optical axis is represented by T2, a distance from the image-side surface of the second lens element to the object-side surface of the third lens element along the optical axis, i.e. an air gap between the second lens element and the third lens element along the optical axis, is represented by G23, a thickness of the third lens element along the optical axis is represented by T3, a distance from the image-side surface of the third lens element to the object-side surface of the fourth lens element along the optical axis, i.e. an air gap between the third lens element and the fourth lens element along the optical axis, is represented by G34, a thickness of the fourth lens element along the optical axis is represented by T4, a distance from the image-side surface of the fourth lens element to the object-side surface of the fifth lens element along the optical axis, i.e. an air gap between the fourth lens element and the fifth lens element along the optical axis, is represented by G45, a thickness of the fifth lens element along the optical axis is represented by T5, a distance from the image-side surface of the fifth lens element to the object-side surface of the sixth lens element along the optical axis, i.e. an air gap between the fifth lens element and the sixth lens element along the optical axis, is represented by G56, a thickness of the sixth lens element along the optical axis is represented by T6, a distance from the image-side surface of the sixth lens element to the object-side surface of the seventh lens element along the optical axis, i.e. an air gap between the sixth lens element and the seventh lens element along the optical axis, is represented by G67, a thickness of the seventh lens element along the optical axis is represented by T7, a distance from the image-side surface of the seventh lens element to the object-side surface of the eighth lens element along the optical axis, i.e. an air gap between the seventh lens element and the eighth lens element along the optical axis, is represented by G78, a thickness of the eighth lens element along the optical axis is represented by T8, distance from the image-side surface of the eighth lens element to the object-side surface of the ninth lens element along the optical axis, i.e. an air gap between the eighth lens element and the ninth lens element along the optical axis, is represented by G89, a thickness of the ninth lens element along the optical axis is represented by T9, an air gap between the ninth lens element and a filtering unit along the optical axis is represented by G9F, a thickness of the filtering unit along the optical axis is represented by TTF, an air gap between the filtering unit and an image plane along the optical axis is represented by GFP, a focal length of the first lens element is represented by f1, a focal length of the second lens element is represented by f2, a focal length of the third lens element is represented by f3, a focal length of the fourth lens element is represented by f4, a focal length of the fifth lens element is represented by f5, a focal length of the sixth lens element is represented by f6, a focal length of the seventh lens element is represented by f7, a focal length of the eighth lens element is represented by f8, a focal length of the ninth lens element is represented by f9, a refractive index of the first lens element is represented by n1, a refractive index of the second lens element is represented by n2, a refractive index of the third lens element is represented by n3, a refractive index of the fourth lens element is represented by n4, a refractive index of the fifth lens element is represented by n5, a refractive index of the sixth lens element is represented by n6, a refractive index of the seventh lens element is represented by n7, a refractive index of the eighth lens element is represented by n8, a refractive index of the ninth lens element is represented by n9, an Abbe number of the first lens element is represented by V1, an Abbe number of the second lens element is represented by V2, an Abbe number of the third lens element is represented by V3, an Abbe number of the fourth lens element is represented by V4, an Abbe number of the fifth lens element is represented by V5, an Abbe number of the sixth lens element is represented by V6, an Abbe number of the seventh lens element is represented by V7, an Abbe number of the eighth lens element is represented by V8, an Abbe number of the ninth lens element is represented by V9, a half field of view of the optical imaging lens is represented by HFOV, a f-number of the optical imaging lens is represented by Fno, an effective focal length of the optical imaging lens is represented by EFL, a distance from the object-side surface of the first lens element to the image plane along the optical axis, i.e. a system length is represented by TTL, a sum of the thicknesses of all nine lens elements along the optical axis, i.e. a sum of T1, T2, T3, T4, T5, T6, T7, T8 and T9 is represented by ALT, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, a distance from the image-side surface of the fifth lens element to the object-side surface of the sixth lens element along the optical axis, a distance from the image-side surface of the sixth lens element to the object-side surface of the seventh lens element along the optical axis, a distance from the image-side surface of the seventh lens element to the object-side surface of the eighth lens element along the optical axis and a distance from the image-side surface of the eighth lens element to the object-side surface of the ninth lens element along the optical axis, i.e. a sum of G12, G23, G34, G45, G56, G67, G78 and G89 is represented by AAG, a back focal length of the optical imaging lens, which is defined as the distance from the image-side surface of the ninth lens element to the image plane along the optical axis, i.e. a sum of G9F, TTF and GFP is represented by BFL, a distance from the object-side surface of the first lens element to the image-side surface of the ninth lens element along the optical axis is represented by TL, an image height of the optical imaging lens is represented by ImgH, a maximum value of the nine thicknesses of lens elements from the first lens element to the ninth lens element along the optical axis, i.e. the maximum among T1, T2, T3, T4, T5, T6, T7, T8, T9, is represented by Tmax, a minimum value of the nine thicknesses of lens elements from the first lens element to the ninth lens element along the optical axis, i.e. the minimum among T1, T2, T3, T4, T5, T6, T7, T8, T9, is represented by Tmin, a second minimum value of the nine thicknesses of lens elements from the first lens element to the ninth lens element along the optical axis, i.e. the second minimum among T1, T2, T3, T4, T5, T6, T7, T8, T9, is represented by Tmin2, an average value of the nine thicknesses of lens elements from the first lens element to the ninth lens element along the optical axis, i.e. the average value of T1, T2, T3, T4, T5, T6, T7, T8, T9, is represented by Tavg, and a distance from the image-side surface of the third lens element to the object-side surface of the fifth lens element along the optical axis, i.e. a sum of G34, T4 and G45 is represented by D32t51.

In an aspect of the present disclosure, in the optical imaging lens, an optical axis region of the image-side surface of the first lens element is concave, the second lens element has negative refracting power, a periphery region of the object-side surface of the third lens element is concave, a periphery region of the object-side surface of the fourth lens element is convex, and a periphery region of the image-side surface of the fourth lens element is convex, an optical axis region of the image-side surface of the ninth lens element is concave, and lens elements of the optical imaging lens are only the nine lens elements described above.

In another aspect of the present disclosure, in the optical imaging lens, the second lens element has negative refracting power, a periphery region of the object-side surface of the third lens element is concave, a periphery region of the object-side surface of the fourth lens element is convex, and a periphery region of the image-side surface of the fourth lens element is convex, a periphery region of the image-side surface of the seventh lens element is convex, an optical axis region of the object-side surface of the ninth lens element is concave, lens elements of the optical imaging lens are only the nine lens elements described above.

In yet another aspect of the present disclosure, in the optical imaging lens, the second lens element has negative refracting power, a periphery region of the object-side surface of the third lens element is concave, a periphery region of the image-side surface of the fourth lens element is convex, an optical axis region of the image-side surface of the eighth lens element is concave, an optical axis region of the image-side surface of the ninth lens element is concave, lens elements of the optical imaging lens are only the nine lens elements described above, and the optical imaging lens satisfies:

$$T4/(Tmin+Tmin2) \geq 1.000 \qquad \text{Inequality (1).}$$

In another example embodiment, other inequality(s), such as those relating to the ratio among parameters could be taken into consideration. For example:

| | |
|---|---|
| V2 + V3 + V4 + V5 ≤ 135.000 | Inequality (2); |
| ALT/(T7 + G78) ≤ 6.600 | Inequality (3); |
| (T8 + G89 + T9)/(G23 + G56) ≤ 2.500 | Inequality (4); |
| TL/BFL ≥ 6.000 | Inequality (5); |
| TTL/AAG ≤ 3.500 | Inequality (6); |
| (T1 + T3)/D32t51 ≤ 1.900 | Inequality (7); |
| (V4 + V5 + V6)/(V2 + V3) ≥ 2.000 | Inequality (8); |
| ALT/(G56 + T6) ≤ 6.000 | Inequality (9); |
| AAG/(G23 + G56 + G78) ≤ 2.500 | Inequality (10); |
| BFL/(G12 + G23) ≤ 1.700 | Inequality (11); |
| EFL/(G56 + G78) ≤ 10.000 | Inequality (12); |
| (T7 + G78)/T8 ≥ 1.300 | Inequality (13); |
| V3 + V5 + V7 ≤ 120.000 | Inequality (14); |
| ALT/(G23 + G89) ≤ 4.000 | Inequality (15); |
| AAG/(T6 + G67) ≥ 4.400 | Inequality (16); |
| EFL/BFL ≥ 6.000 | Inequality (17); |
| T4/T9 ≥ 1.000 | Inequality (18); |
| (T1 + T4)/(T2 + T5) ≥ 1.900 | Inequality (19); |
| Tmax/Tmin ≤ 3.800 | Inequality (20); |
| (AAG + Tavg)/(Tmin + Tmin2) ≥ 4.400 | Inequality (21); |
| TL/Tmax ≥ 6.600 | Inequality (22). |

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

It is readily understood that through controlling the convex or concave shape of the surfaces, the optical imaging lens of the present invention may provide for increased resolution, enlarged aperture stop and image height and good imaging quality.

BRIEF DESCRIPTION OF THE DRAWINGS

Example embodiments will be more readily understood from the following detailed description when read in conjunction with the appended drawing, in which:

FIG. 6 depicts a cross-sectional view of a first embodiment of an optical imaging lens according to the present disclosure;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 10 depicts a cross-sectional view of a second embodiment of an optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 14 depicts a cross-sectional view of a third embodiment of an optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 18 depicts a cross-sectional view of a fourth embodiment of an optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 22 depicts a cross-sectional view of a fifth embodiment of an optical imaging lens according to the present disclosure;

FIGS. 23A-23D depict charts of a longitudinal spherical aberration and other kinds of optical aberrations of a fifth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 38 depicts a cross-sectional view of a ninth embodiment of an optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 42 depicts a cross-sectional view of a tenth embodiment of an optical imaging lens according to the present disclosure;

FIG. 44 depicts a table of optical data for each lens element of a tenth embodiment of an optical imaging lens according to the present disclosure;

FIG. 45 depicts a table of aspherical data of a tenth embodiment of the optical imaging lens according to the present disclosure;

FIG. 46 depicts a cross-sectional view of an eleventh embodiment of an optical imaging lens according to the present disclosure;

FIG. 48 depicts a table of optical data for each lens element of an eleventh embodiment of an optical imaging lens according to the present disclosure;

FIG. 49 depicts a table of aspherical data of an eleventh embodiment of the optical imaging lens according to the present disclosure;

FIGS. 50A and 50B depict tables for the values of T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of all eleven example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

Figure 1:
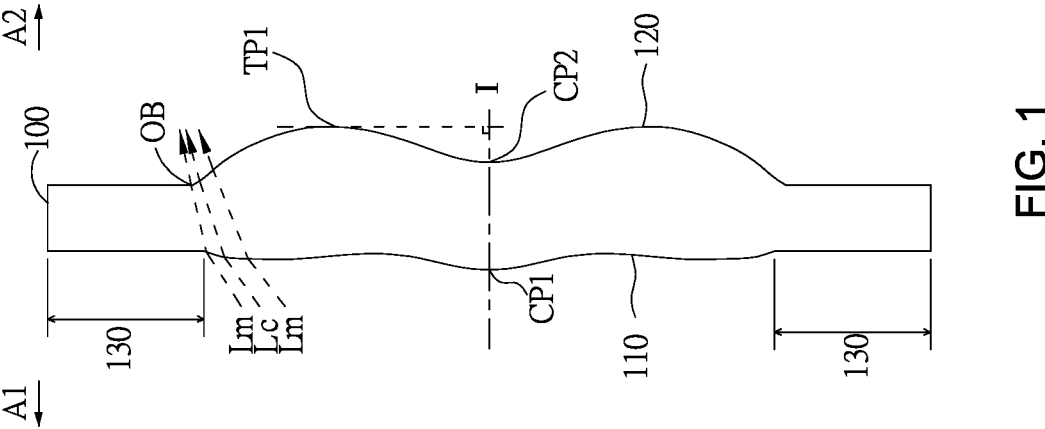
FIG. 1 depicts a cross-sectional view of one single lens element according to the present disclosure.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
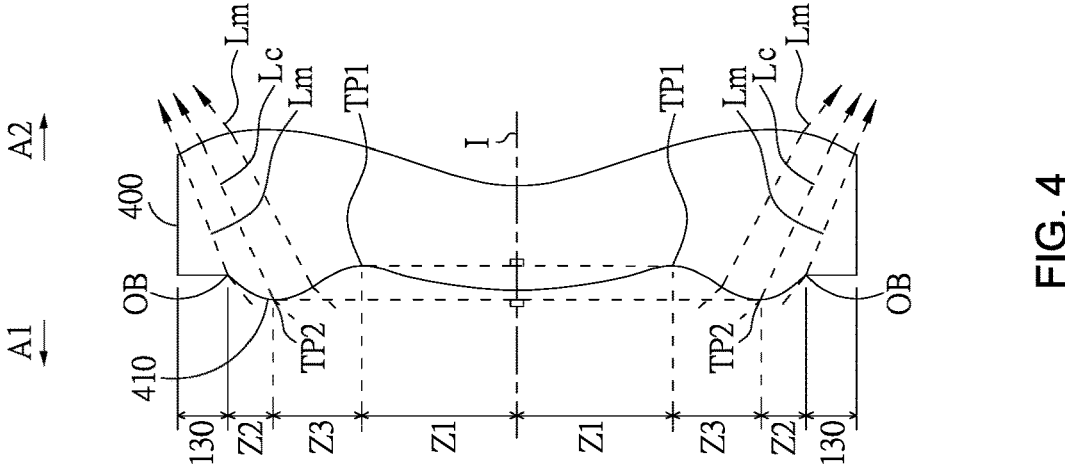
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
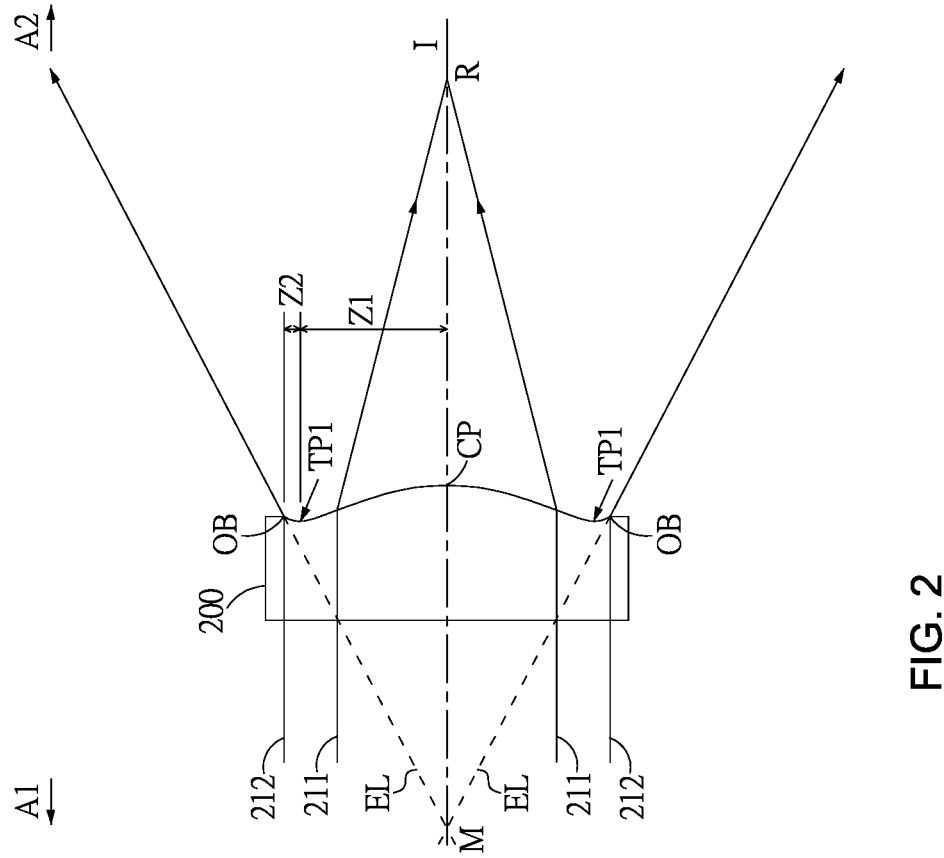
FIG. 2 depicts a cross-sectional view showing the relation between the shape of a portion and the position where a collimated ray meets the optical axis.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
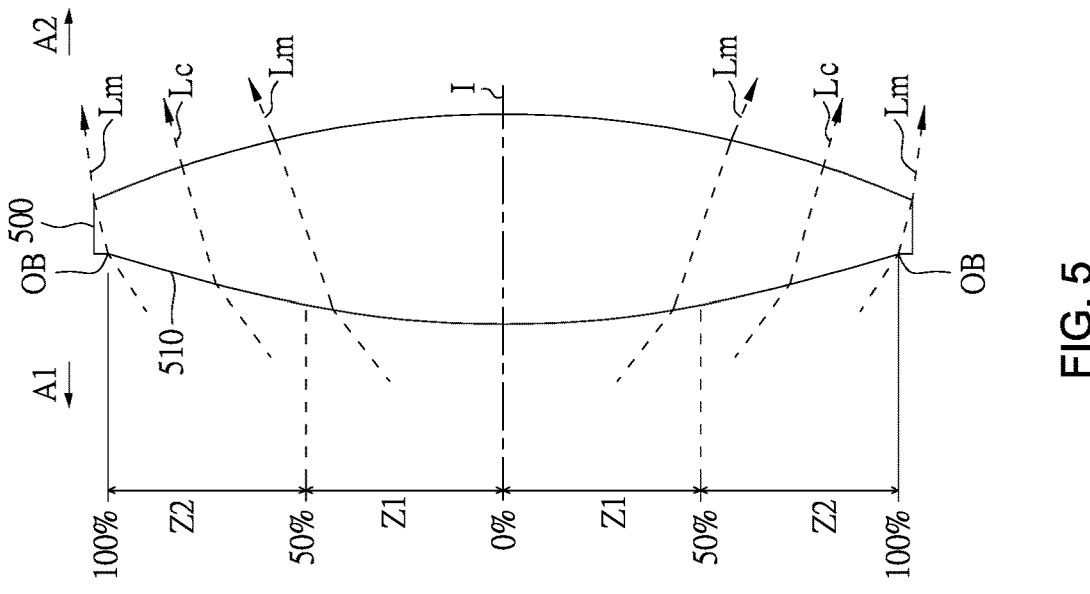
FIG. 5 depicts a cross-sectional view showing a third example of determining the shape of lens element regions and the boundaries of regions.
Figure 3:
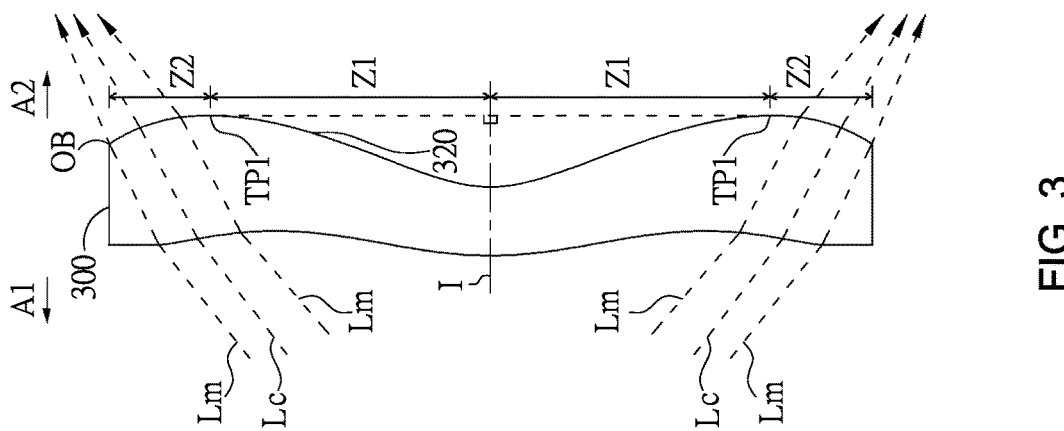
FIG. 3 depicts a cross-sectional view showing a first example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, example embodiments of an optical imaging lens may comprise a first lens element, a second lens element, a third lens element, a fourth lens element, a fifth lens element, a sixth lens element, a seventh lens element, an eighth lens element and a ninth lens element. Each of the lens elements may comprise an object-side surface facing toward an object side allowing imaging rays to pass through and an image-side surface facing toward an image side allowing the imaging rays to pass through. These lens elements may be arranged sequentially from the object side to the image side along an optical axis, and lens elements of example embodiments are only the nine lens elements. Through controlling the convex or concave shape of the surfaces, the optical imaging lens in example embodiments may provide for higher resolution along with enlarged aperture stop and image height.

Example embodiments of an optical imaging lens may be designed with configuration of refracting power and surface shapes, for example: combining a concave optical axis region of the image-side surface of the first lens element, negative refracting power of the second lens element, a concave periphery region of the object-side surface of the third lens element, a convex periphery region of the object-side surface of the fourth lens element and a convex periphery region of the image-side surface of the fourth lens element that effectively adjust edge aberration and reduce the distortion aberration. When the optical imaging lens is further designed with a concave optical axis region of the image-side surface of the ninth lens element, image height may be effectively increased, and volume of the whole system may be effectively controlled for application in a mobile electrical device.

Example embodiments of an optical imaging lens may be designed with configuration of refracting power and surface shapes, for example: combining negative refracting power of the second lens element, a concave periphery region of the object-side surface of the third lens element, a convex periphery region of the image-side surface of the fourth lens element and a convex periphery region of the image-side surface of the fourth lens element that may effectively adjust edge aberration and reduce the distortion aberration. When the optical imaging lens is further designed with a convex periphery region of the image-side surface of the seventh lens element and a concave optical axis region of the image-side surface of the ninth lens element, longitudinal spherical aberration may be improved, image height may be increased and the volume of the whole system may be effectively shortened for application in a mobile electrical device.

Example embodiments of an optical imaging lens may be designed with configuration of refracting power and surface shapes, for example: combining negative refracting power of the second lens element, a concave periphery region of the object-side surface of the third lens element, a convex periphery region of the image-side surface of the fourth lens element that may effectively adjust edge aberration and reduce the distortion aberration. When the optical imaging lens is further designed with a concave optical axis region of the image-side surface of the eighth lens element and a concave optical axis region of the image-side surface of the ninth lens element, longitudinal spherical aberration may be improved, image height may be increased and the volume of the whole system may be effectively shortened for application in a mobile electrical device. When the optical imaging lens further satisfies that the thickness of the fourth lens element along the optical axis is greater than or equal to a sum of a minimum value of the nine thicknesses of lens elements from the first lens element to the ninth lens element along the optical axis and a second minimum value of the nine thicknesses of lens elements from the first lens element to the ninth lens element along the optical axis, i.e. T4/(Tmin+Tmin2)≥1.000, assembly yield may be effectively increased; preferably it may satisfy 1.000≤T4/(Tmin+Tmin2)≤1.450.

When example embodiments of an optical imaging lens are designed with positive refracting power of the first lens element, good image quality may be kept, and f-number may be reduced to increase amount of ray entering the optical imaging lens.

When example embodiments of an optical imaging lens satisfy at least one of the inequalities listed below with proper materials, passing and deflection of imaging rays may be facilitated, chromatic aberration may be declined to keep good image quality:

$V2+V3+V4+V5≤135.000$; preferably, the optical imaging lens may satisfy $100.000≤V2+V3+V4+V5≤135.000$;

$(V4+V5+V6)/(V2+V3)≥2.000$; preferably, the optical imaging lens may satisfy $2.000≤(V4+V5+V6)/(V2+V3)≤3.750$;

$V3+V5+V7≤120.000$; preferably, the optical imaging lens may satisfy $52.000≤V3+V5+V7≤120.000$.

When the optical imaging lens satisfies at least one of the inequalities listed below, the thickness of the lens elements and/or the air gaps between the lens elements may be shortened properly to avoid any excessive value of the parameters which may be unfavorable and may thicken the system length of the whole system of the optical imaging lens, and to avoid any insufficient value of the parameters which may increase the production difficulty of the optical imaging lens:

T4/T9≥1.000 (i.e. the thickness of the fourth lens element along the optical axis is greater than or equal to the thickness of the ninth lens element along the optical axis), and preferably, the optical imaging lens may satisfy $1.000≤T4/T9≤2.500$;

$ALT/(T7+G78)≤6.600$, and preferably, the optical imaging lens may satisfy $4.400≤ALT/(T7+G78)≤6.600$;

$(T8+G89+T9)/(G23+G56)≤2.500$, and preferably, the optical imaging lens may satisfy $1.300≤(T8+G89+T9)/(G23+G56)≤2.500$;

$TL/BFL≥6.000$, and preferably, the optical imaging lens may satisfy $6.000≤TL/BFL≤15.300$;

$TTL/AAG≤3.500$, and preferably, the optical imaging lens may satisfy $2.500≤TTL/AAG≤3.500$;

$(T1+T3)/D32t51\le1.900$, and preferably, the optical imaging lens may satisfy $1.000\le(T1+T3)/D32t51\le1.900$;

$ALT/(G56+T6)\le6.000$, and preferably, the optical imaging lens may satisfy $3.600\le ALT/(G56+T6)\le6.000$;

$AAG/(G23+G56+G78)\le2.500$, and preferably, the optical imaging lens may satisfy $1.500\le AAG/(G23+G56+G78)\le2.500$;

$BFL/(G12+G23)\le1.700$, and preferably, the optical imaging lens may satisfy $0.750\le BFL/(G12+G23)\le1.700$;

$EFL/(G56+G78)\le10.000$, and preferably, the optical imaging lens may satisfy $6.000\le EFL/(G56+G78)\le10.000$;

$(T7+G78)/T8\ge1.300$, and preferably, the optical imaging lens may satisfy $1.300\le(T7+G78)/T8\le2.600$;

$ALT/(G23+G89)\ge4.000$, and preferably, the optical imaging lens may satisfy $2.200\le ALT/(G23+G89)\le4.000$;

$AAG/(T6+G67)\ge4.400$, and preferably, the optical imaging lens may satisfy $4.400\le AAG/(T6+G67)\le6.900$;

$EFL/BFL\ge6.000$, and preferably, the optical imaging lens may satisfy $6.000\le EFL/BFL\le11.500$;

$(T1+T4)/(T2+T5)\ge1.900$, and preferably, the optical imaging lens may satisfy $1.900\le(T1+T4)/(T2+T5)\le2.850$;

$T\max/T\min\le3.800$, and preferably, the optical imaging lens may satisfy $2.700\le T\max/T\min\le3.800$;

$(AAG+Tavg)/(T\min+T\min2)\ge4.400$, and preferably, the optical imaging lens may satisfy $4.400\le(AAG+Tavg)/(T\min+T\min2)\le6.500$;

$TL/T\max\ge6.600$, and preferably, the optical imaging lens may satisfy $6.600\le TL/T\max\le8.800$.

In light of the unpredictability in an optical system, satisfying these inequalities listed above may result in shortening the system length of the optical imaging lens, enlarging the image height, promoting the imaging quality and/or increasing the yield in the assembly process in the present disclosure.

When implementing example embodiments, more details about the convex or concave surface or refracting power could be incorporated for one specific lens element or broadly for a plurality of lens elements to improve the control for the system performance and/or resolution, or promote the yield. For example, in an example embodiment, each lens element may be made from all kinds of transparent material, such as glass, resin, etc. It is noted that the details listed here could be incorporated in example embodiments if no inconsistency occurs.

Several example embodiments and associated optical data will now be provided for illustrating example embodiments of an optical imaging lens with higher resolution, and enlarged aperture stop and field of view. Reference is now made to FIGS. 6-9. FIG. 6 illustrates an example cross-sectional view of an optical imaging lens 1 according to a first example embodiment. FIGS. 7A, 7B, 7C and 7D shows example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9. A filtering unit TF and an image plane IMA of an image sensor may be positioned at the image side A2 of the optical lens 1. Each of the first, second, third, fourth, fifth, sixth, seventh, eighth and ninth lens elements L1, L2, L3, L4, L5, L6, L7, L8, L9 and the filtering unit TF may comprise an object-side surface L1A1/L2A1/L3A1/L4A1/L5A1/L6A1/L7A1/L8A1/L9A1/TFA1 facing toward the object side A1 and an image-side surface L1A2/L2A2/L3A2/L4A2/L5A2/L6A2/L7A2/L8A2/L9A2/TFA2 facing toward the image side A2. The filtering unit TF, positioned between the ninth lens element L9 and the image plane IMA, may selectively absorb light with specific wavelength(s) from the light passing through optical imaging lens 1. The example embodiment of the filtering unit TF which may selectively absorb light with specific wavelength(s) from the light passing through optical imaging lens 1 may be an IR cut filter (infrared cut filter). Then, IR light may be absorbed, and this may prohibit the IR light, which might not be seen by human eyes, from producing an image on the image plane IMA.

Please refer to the drawings for the details of each lens element of the optical imaging lens 1, which may be constructed by plastic material or other material for light weight.

In the first example embodiment, the first lens element L1 may have positive refracting power. On the object-side surface UAL both an optical axis region L1A1C and a periphery region L1A1P may be convex. On the image-side surface L1A2, both an optical axis region L1A2C and a periphery region L1A2P may be concave.

The second lens element L2 may have negative refracting power. On the object-side surface L2A1, both an optical axis region L2A1C and a periphery region L2A1P may be convex. On the image-side surface L2A2, both an optical axis region L2A2C and a periphery region L2A2P may be concave.

The third lens element L3 may have negative refracting power. On the object-side surface L3A1, an optical axis region L3A1C may be convex, and a periphery region L3A1P may be concave. On the image-side surface L3A2, an optical axis region L3A2C may be concave, and a periphery region L3A2P may be convex.

The fourth lens element L4 may have positive refracting power. On the object-side surface L4A1, both an optical axis region L4A1C and a periphery region L4A1P may be convex. On the image-side surface L4A2, both an optical axis region L4A2C and a periphery region L4A2P may be convex.

The fifth lens element L5 may have negative refracting power. On the object-side surface L5A1, both an optical axis region L5A1C and a periphery region L5A1P may be concave. On the image-side surface L5A2, both an optical axis region L5A2C and a periphery region L5A2P may be convex.

The sixth lens element L6 may have negative refracting power. On the object-side surface L6A1, an optical axis region L6A1C may be convex and a periphery region L6A1P may be concave. On the image-side surface L6A2, an optical axis region L6A2C may be concave and a periphery region L6A2P may be convex.

The seventh lens element L7 may have positive refracting power. On the object-side surface L7A1, an optical axis region L7A1C may be convex and a periphery region L7A1P may be concave. On the image-side surface L7A2, an optical axis region L7A2C may be concave, and a periphery region L7A2P may be convex.

The eighth lens element L8 may have positive refracting power. On the object-side surface L8A1, an optical axis region L8A1C may be convex, and a periphery region L8A1P may be concave. On the image-side surface L8A2, an optical axis region L8A2C may be concave and a periphery region L8A2P may be convex.

The ninth lens element L9 may have negative refracting power. On the object-side surface L9A1, an optical axis region L9A1C may be convex, and a periphery region L9A1P may be concave. On the image-side surface L9A2, an optical axis region L9A2C may be concave and a periphery region L9A2P may be convex.

A total of 18 aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, the object-side surface L6A1 and the image-side surface L6A2 of the sixth lens element L6, the object-side surface L7A1 and the image-side surface L7A2 of the seventh lens element L7, and the object-side surface L8A1 and the image-side surface L8A2 of the eighth lens element L8 and the object-side surface L9A1 and the image-side surface L9A2 of the ninth lens element L9 may all be defined by the following aspherical formula (1):

$$Z(Y) = \frac{Y^2}{R} \Bigg/ \left(1 + \sqrt{1 - (1+K)\frac{Y^2}{R^2}}\right) \sum_{\substack{i=1}}^{n} a_i \times Y^i \qquad \text{Formula (1)}$$

wherein Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; Y represents the perpendicular distance between the point of the aspherical surface and the optical axis; K represents a conic constant; $a_i$ represents an aspherical coefficient of $i^{th}$ level.

The values of each aspherical parameter are shown in FIG. 9, and in the present embodiment and hereinafter, the aspherical coefficient of $2^{nd}$ level $a_2$ is always 0.

Figures 7A, 7B, 7C, 7D:
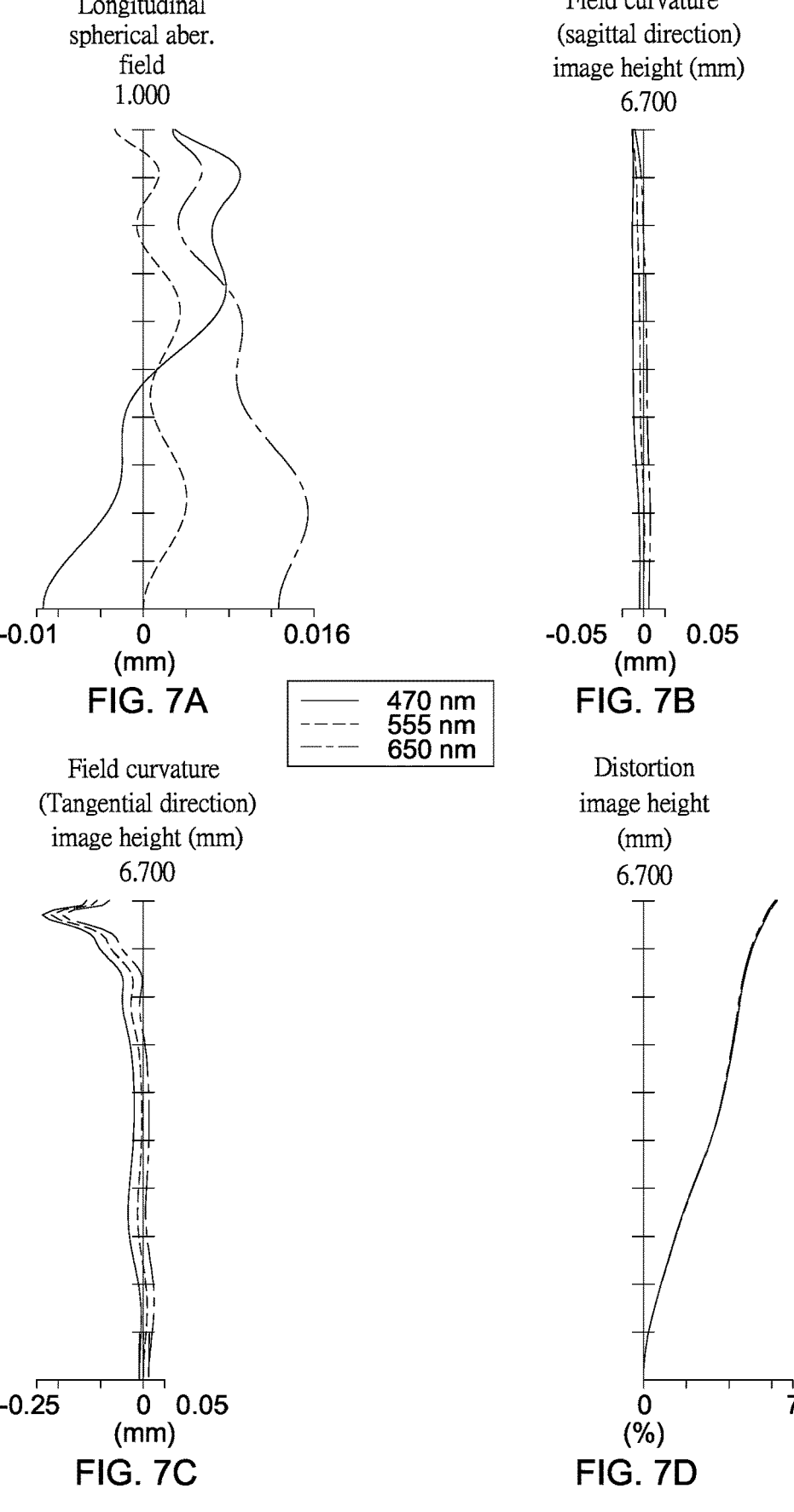
FIGS. 7A-7D depict charts of a longitudinal spherical aberration and other kinds of optical aberrations of a first embodiment of the optical imaging lens according to the present disclosure.

Referring to FIG. 7A, a longitudinal spherical aberration of three representative wavelengths (470 nm, 555 nm, 650 nm) of the optical imaging lens 1 in the present embodiment is shown in coordinates in which a vertical axis represents field of view, and FIG. 7B, curvature of field of three representative wavelengths (470 nm, 555 nm, 650 nm) of the optical imaging lens 1 in the present embodiment in the sagittal direction is shown in coordinates in which a vertical axis represents image height, and FIG. 7C, curvature of field in the tangential direction of three representative wavelengths (470 nm, 555 nm, 650 nm) of the optical imaging lens 1 in the present embodiment is shown in coordinates in which a vertical axis represents image height, and FIG. 7D, distortion aberration of the optical imaging lens 1 in the present embodiment is shown in coordinates in which a vertical axis represents image height. The curve of each of these wavelengths may be close to each other, and this represents that off-axis light with respect to the three representative wavelengths (470 nm, 555 nm, 650 nm) may be focused around an image point. From the vertical deviation of each curve shown in FIG. 7A, the offset of the off-axis light relative to the image point may be within −0.01~0.016 mm. Therefore, the present embodiment improves the longitudinal spherical aberration with respect to different wavelengths certainly. Further, for curvature of field in the sagittal direction shown in FIG. 7B, the focus variation with respect to the three wavelengths in the whole field may fall within −0.05~0.05 mm. For curvature of field in the tangential direction shown in FIG. 7C, the focus variation with respect to the three wavelengths in the whole field may fall within −0.25~0.05 mm. The variation of the distortion aberration shown in FIG. 7D may be within 0~7%.

As shown in FIG. 8, the Fno the optical imaging lens 1 is 1.800, and the image height is 6.700 mm. Referring to the aberration shown in FIGS. 7A-7D, it may be readily understood that the optical imaging lens 1 is capable to provide with enlarged aperture stop and image height, as well as good optical characteristics.

Please also refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 10-13. FIG. 10 illustrates an example cross-sectional view of an optical imaging lens 2 according to a second example embodiment. FIGS. 11A, 11B, 11C and 11D show example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces UAL L2A1, L3A1, L4A1, L5A1, L6A1, L7A1 and L8A1 and the image-side surfaces L1A2, L2A2, L3A2, L4A2, L5A2, L6A2, L7A2, L8A2 and L9A2, and positive or negative configuration of the refracting power of each lens element may be similar to those in the first embodiment; however the concave/convex shape of the object-side surface L9A1 may be different from those in the first embodiment. Further, the radius of curvature and thickness of each lens element, aspherical data and related optical parameters, such as effective focal length, may be different from those in the first embodiment. Specifically, a periphery region L9A1P on the object-side surface L9A1 of the ninth lens element L9 may be convex.

Here, for clearly showing the drawings of the present embodiment, only the surface shapes which are different from that in the first embodiment may be labeled. Please refer to FIG. 12 for the optical characteristics of each lens elements in the optical imaging lens 2 of the present embodiment.

Figures 11A, 11B, 11C, 11D:
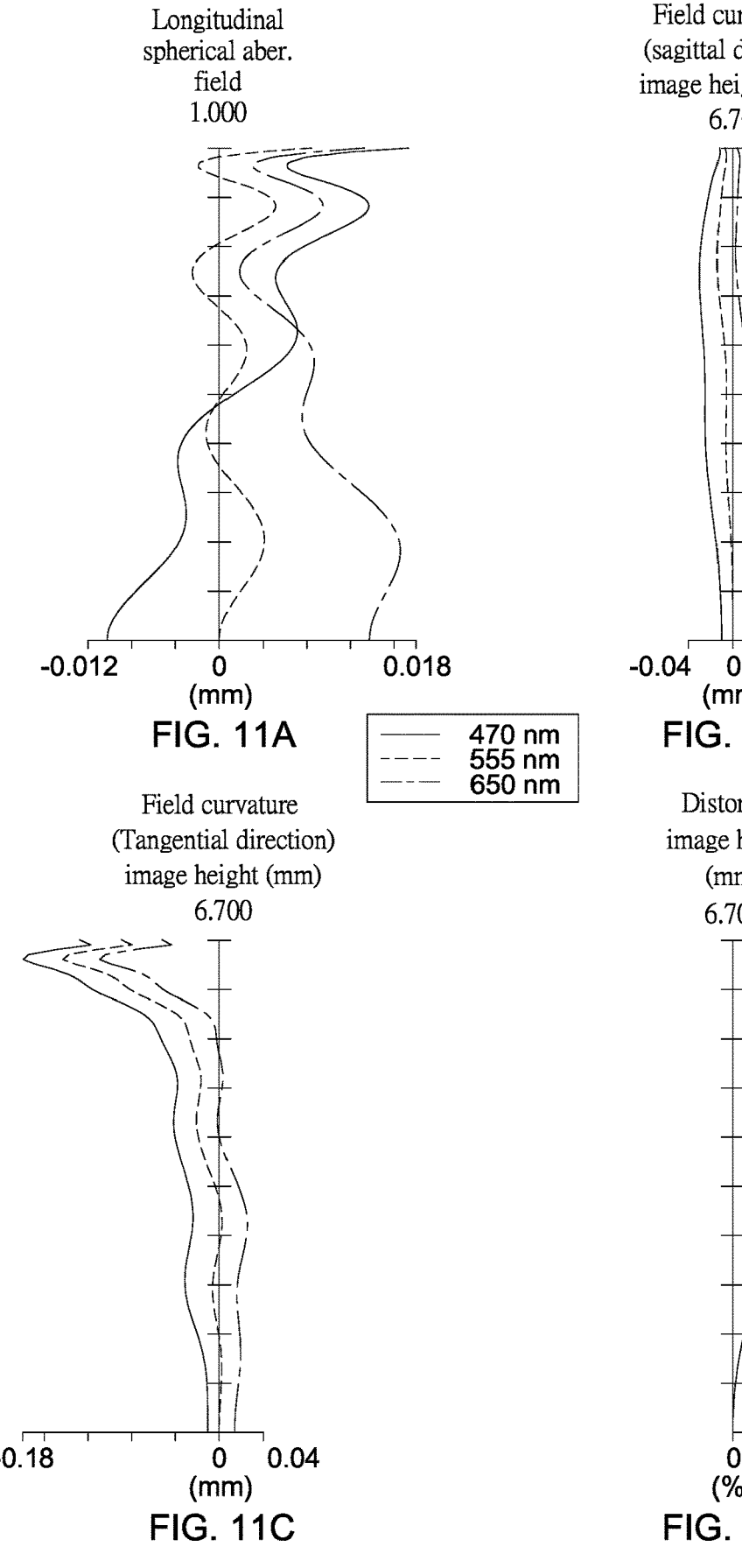
FIGS. 11A-11D depict charts of a longitudinal spherical aberration and other kinds of optical aberrations of a second embodiment of the optical imaging lens according to the present disclosure.

As the longitudinal spherical aberration shown in FIG. 11A, the offset of the off-axis light relative to the image point may be within −0.012~0.018 mm. As the curvature of field in the sagittal direction shown in FIG. 11B, the focus variation with regard to the three wavelengths in the whole field may fall within −0.04~0.02 mm. As the curvature of field in the tangential direction shown in FIG. 11C, the focus variation with regard to the three wavelengths in the whole field may fall within −0.18~0.04 mm. As shown in FIG. 11D, the variation of the distortion aberration may be within 0~7%. Compared with the first embodiment, the curvature of field in both the sagittal and tangential directions may be less in the present embodiment.

As shown in FIG. 12, in the optical imaging lens 2, the Fno is 1.800 and the image height is 6.700 mm. Referring to the aberration shown in FIGS. 11A-11D, it may be readily understood that the optical imaging lens 2 is capable to provide with enlarged aperture stop and image height, as well as good imaging quality.

Please refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 14-17. FIG. 14 illustrates an example cross-sectional view of an optical imaging lens 3 according to a third example embodiment. FIGS. 15A, 15B, 15C and 15D show example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces UAL L2A1, L3A1, L4A1, L5A2, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element, except for the fifth lens element L5, may be similar to those in the first embodiment; however, the radius of curvature and thickness of each lens element, aspherical data and related optical parameters, such as effective focal length, and positive refracting power of the fifth lens element L5 may be different from those in the first embodiment.

Here, for clearly showing the drawings of the present embodiment, only the surface shapes which are different from that in the first embodiment may be labeled. Please refer to FIG. 16 for the optical characteristics of each lens elements in the optical imaging lens 3 of the present embodiment.

Figures 15A, 15B, 15C, 15D:
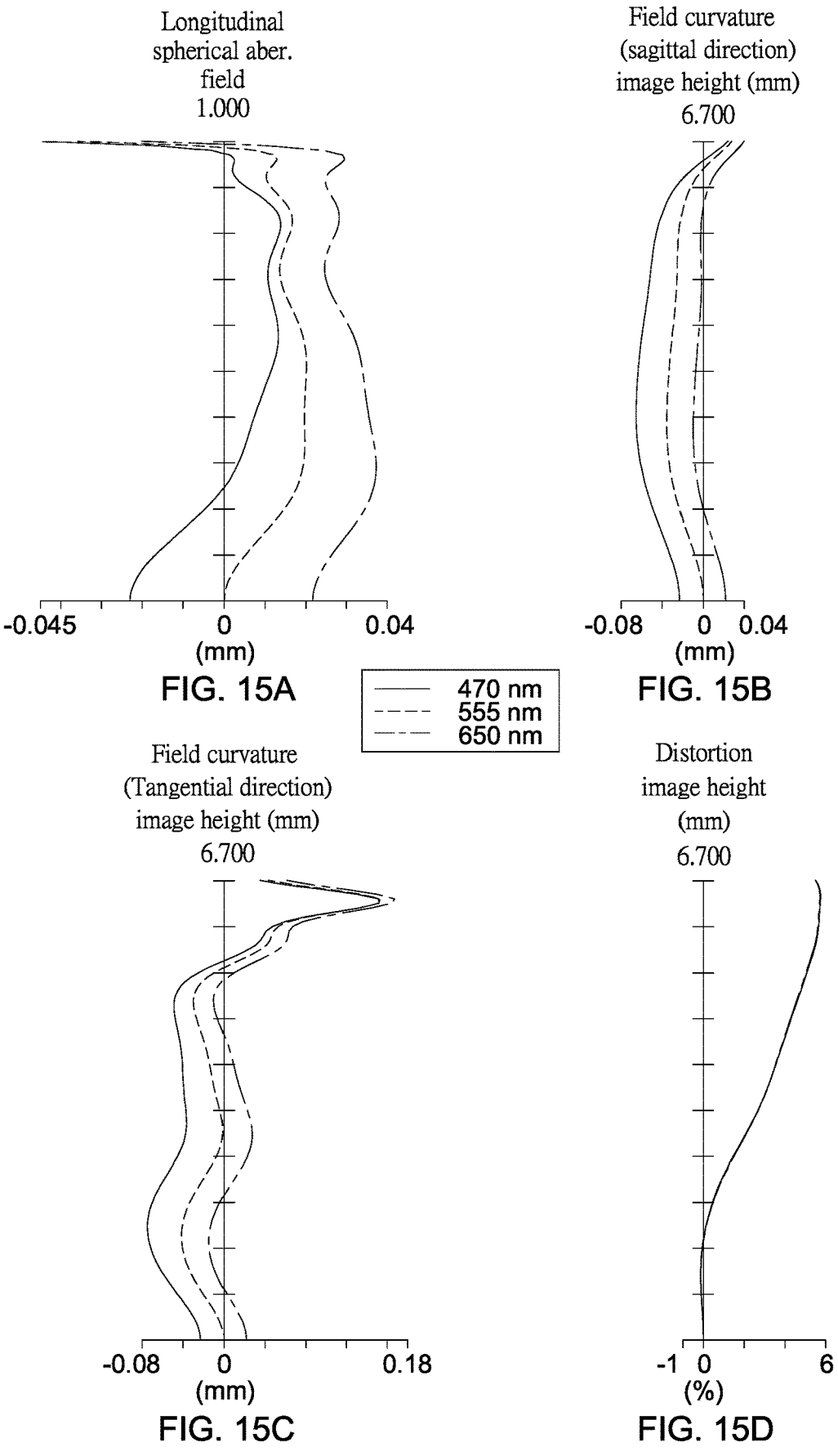
FIGS. 15A-15D depict charts of a longitudinal spherical aberration and other kinds of optical aberrations of a third embodiment of the optical imaging lens according to the present disclosure.

As the longitudinal spherical aberration shown in FIG. 15A, the offset of the off-axis light relative to the image point may be within −0.045~0.04 mm. As the curvature of field in the sagittal direction shown in FIG. 15B, the focus variation with regard to the three wavelengths in the whole field may fall within −0.08~0.04 mm. As the curvature of field in the tangential direction shown in FIG. 15C, the focus variation with regard to the three wavelengths in the whole field may fall within −0.08~0.018 mm. As shown in FIG. 15D, the variation of the distortion aberration may be within −1-6%. Compared with the first embodiment, the curvature of field in the tangential direction may be less in the present embodiment.

As shown in FIG. 16, in the optical imaging lens 3, the Fno is 1.800 and the image height is 6.700 mm. Referring to the aberration shown in FIGS. 15A-15D, it may be readily understood that the optical imaging lens 3 is capable to provide with enlarged aperture stop and image height, as well as good imaging quality.

Please refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 18-21. FIG. 18 illustrates an example cross-sectional view of an optical imaging lens 4 according to a fourth example embodiment. FIGS. 19A, 19B, 19C and 19D show example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element, except for the eighth lens element L8, may be similar to those in the first embodiment; however, the radius of curvature and thickness of each lens element, aspherical data and related optical parameters, such as effective focal length, and negative refracting power of the eighth lens element L8 may be different from those in the first embodiment.

Here, for clearly showing the drawings of the present embodiment, only the surface shapes which are different from that in the first embodiment may be labeled. Please refer to FIG. 20 for the optical characteristics of each lens elements in the optical imaging lens 4 of the present embodiment.

Figures 19A, 19B, 19C, 19D:
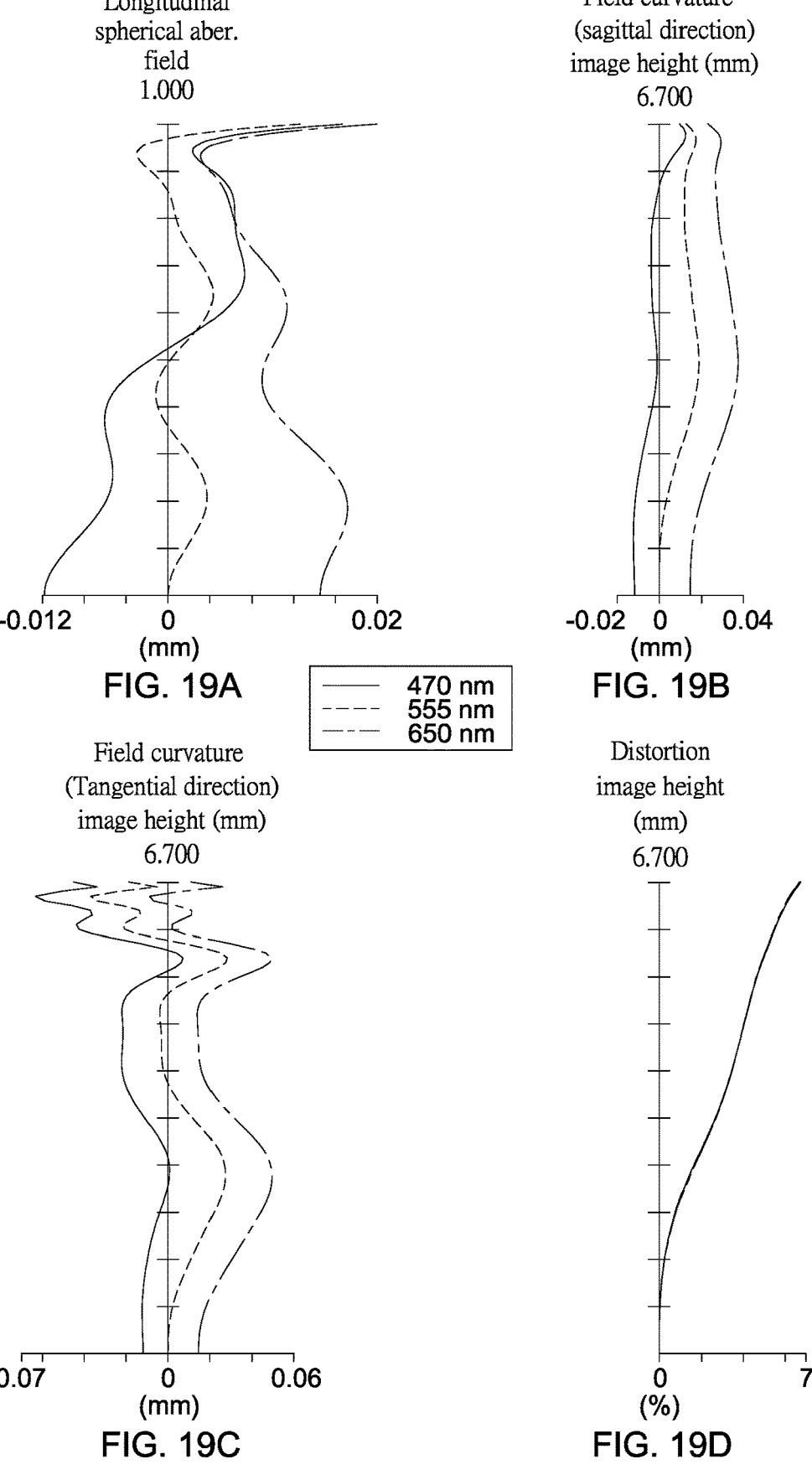
FIGS. 19A-19D depict charts of a longitudinal spherical aberration and other kinds of optical aberrations of a fourth embodiment of the optical imaging lens according to the present disclosure.

As the longitudinal spherical aberration shown in FIG. 19A, the offset of the off-axis light relative to the image point may be within −0.012~0.02 mm. As the curvature of field in the sagittal direction shown in FIG. 19B, the focus variation with regard to the three wavelengths in the whole field may fall within −0.02~0.04 mm. As the curvature of field in the tangential direction shown in FIG. 19C, the focus variation with regard to the three wavelengths in the whole field may fall within −0.07~0.06 mm. As shown in FIG. 19D, the variation of the distortion aberration may be within 0~7%. Compared with the first embodiment, the curvature of the field in both the sagittal and tangential directions may be less in the present embodiment.

As shown in FIG. 20, in the optical imaging lens 4, the Fno is 1.800 and the image height is 6.700 mm. Referring to the aberration shown in FIGS. 19A-19D, it may be readily understood that the optical imaging lens 4 is capable to provide with enlarged aperture stop and image height, as well as good imaging quality.

Please refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 22-25. FIG. 22 illustrates an example cross-sectional view of an optical imaging lens 5 according to a fifth example embodiment. FIGS. 23A, 23B, 23C and 23D show example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element, except for the ninth lens element L9, may be similar to those in the first embodiment; however, the radius of curvature and thickness of each lens element, aspherical data and related optical parameters, such as effective focal length, and positive refracting power of the ninth lens element L9 may be different from those in the first embodiment.

Here, for clearly showing the drawings of the present embodiment, only the surface shapes which are different from that in the first embodiment may be labeled. Please refer to FIG. 24 for the optical characteristics of each lens elements in the optical imaging lens 5 of the present embodiment.

As the longitudinal spherical aberration shown in FIG. 23A, the offset of the off-axis light relative to the image point may be within −0.09~0.03 mm. As the curvature of field in the sagittal direction shown in FIG. 23B, the focus variation with regard to the three wavelengths in the whole field may fall within −0.05~0.15 mm. As the curvature of field in the tangential direction shown in FIG. 23C, the focus variation with regard to the three wavelengths in the whole field may fall within −0.02~0.035 mm. As shown in FIG. 23D, the variation of the distortion aberration may be within 0~18%. Compared with the first embodiment, the curvature of field in the tangential direction may be smaller in the present embodiment.

As shown in FIG. 24, in the optical imaging lens 5, the Fno is 1.800 and the image height is 6.700 mm. Referring to the aberration shown in FIGS. 23A-23D, it may be readily understood that the optical imaging lens 5 is capable to provide with enlarged aperture stop and image height, as well as good imaging quality.

Please refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Figure 26:
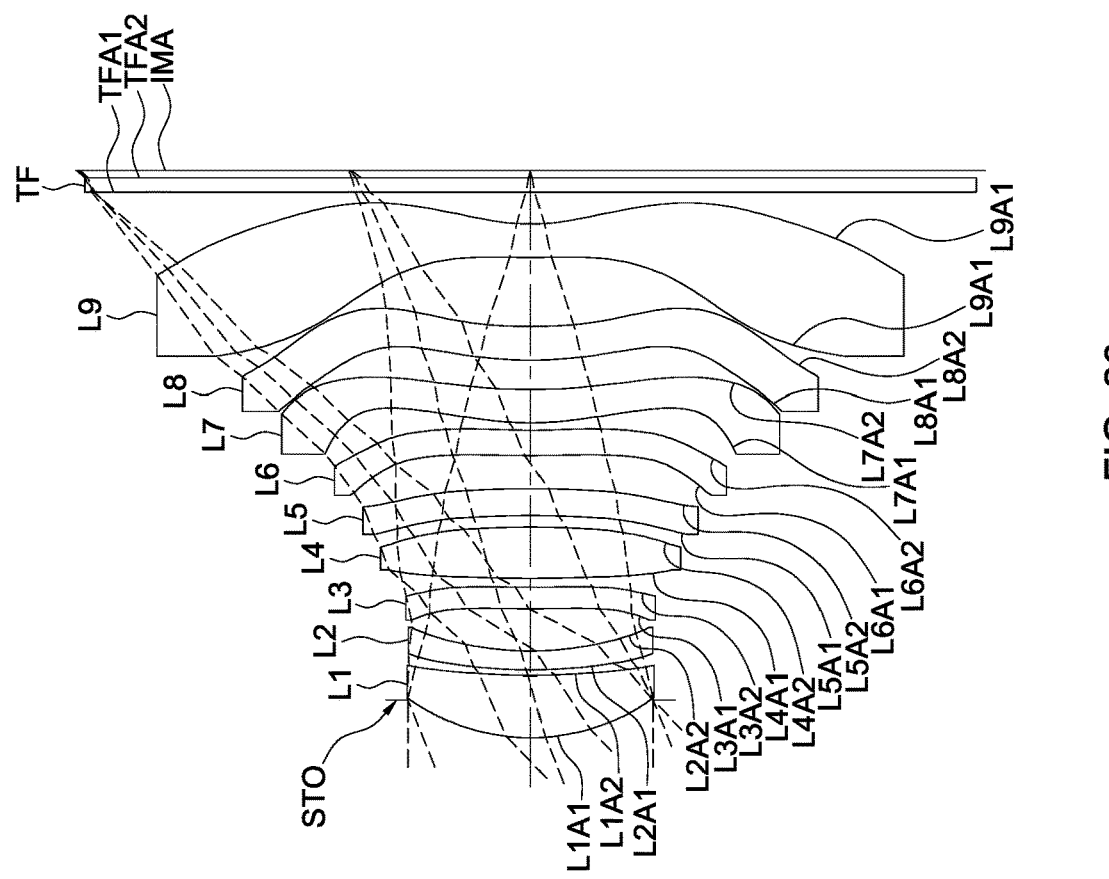
FIG. 26 depicts a cross-sectional view of a sixth embodiment of an optical imaging lens according to the present disclosure.

Reference is now made to FIGS. 26-29. FIG. 26 illustrates an example cross-sectional view of an optical imaging lens 6 according to a sixth example embodiment. FIGS. 27A, 27B, 27C and 27D show example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element, except for the third lens element L3, may be similar to those in the first embodiment; however, the radius of curvature and thickness of each lens element, aspherical data and related optical parameters, such as effective focal length, and positive refracting power of the third lens element L3 may be different from those in the first embodiment.

Here, for clearly showing the drawings of the present embodiment, only the surface shapes which are different from that in the first embodiment may be labeled. Please refer to FIG. 28 for the optical characteristics of each lens elements in the optical imaging lens 6 of the present embodiment.

Figures 27A, 27B, 27C, 27D:
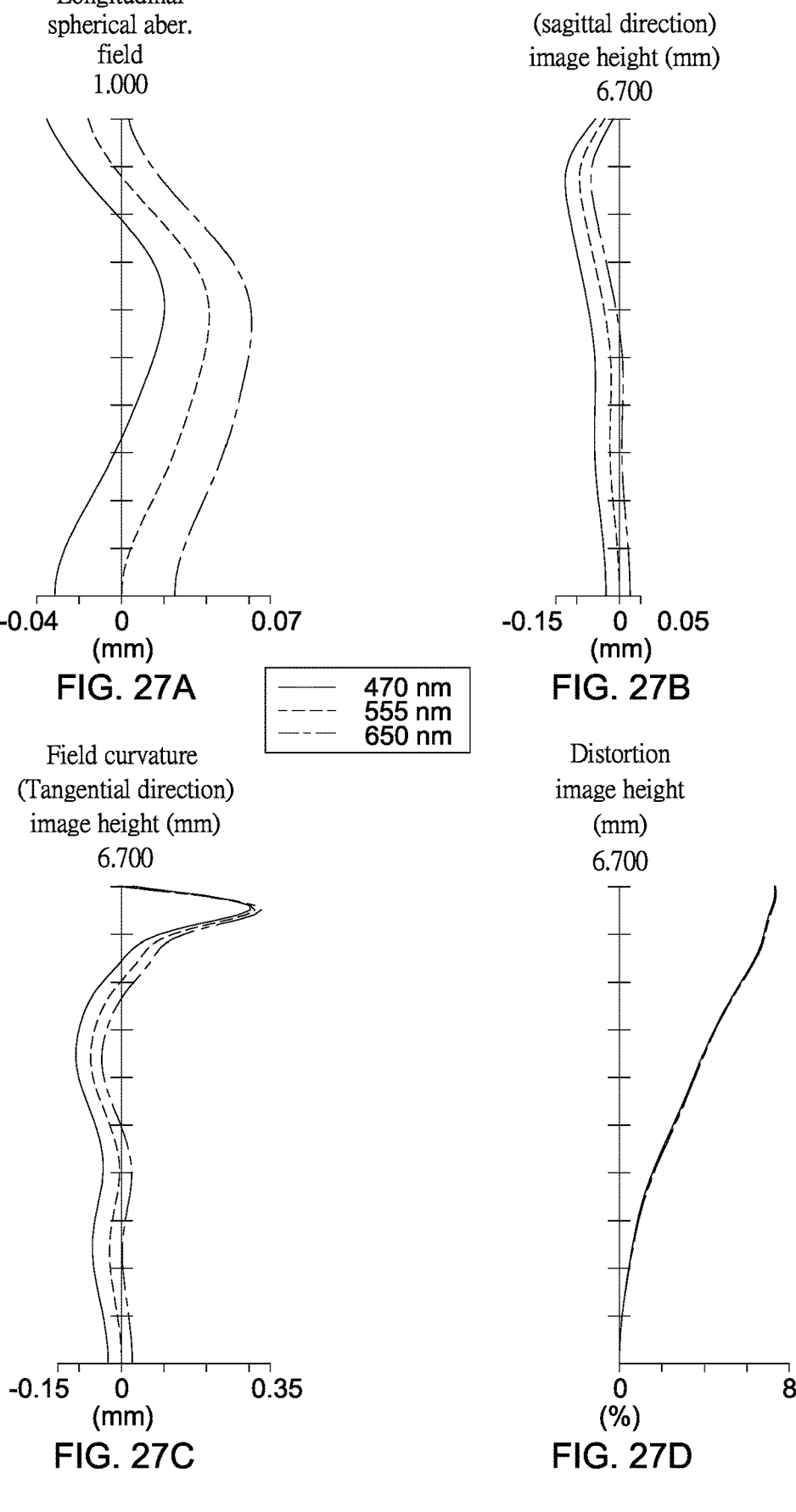
FIGS. 27A-27D depict charts of a longitudinal spherical aberration and other kinds of optical aberrations of a sixth embodiment of the optical imaging lens according the present disclosure.

As the longitudinal spherical aberration shown in FIG. 27A, the offset of the off-axis light relative to the image point may be within −0.04~0.07 mm. As the curvature of field in the sagittal direction shown in FIG. 27B, the focus variation with regard to the three wavelengths in the whole field may fall within −0.15~0.05 mm. As the curvature of field in the tangential direction shown in FIG. 27C, the focus variation with regard to the three wavelengths in the whole field may fall within −0.15~0.35 mm. As shown in FIG. 27D, the variation of the distortion aberration may be within 0~8%.

As shown in FIG. 28, in the optical imaging lens 6, the Fno is 1.800 and the image height is 6.700 mm. Referring to the aberration shown in FIGS. 27A-27D, it may be readily understood that the optical imaging lens 6 is capable to provide with enlarged aperture stop and image height, as well as good imaging quality.

Please refer to FIG. 50A for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Figure 30:
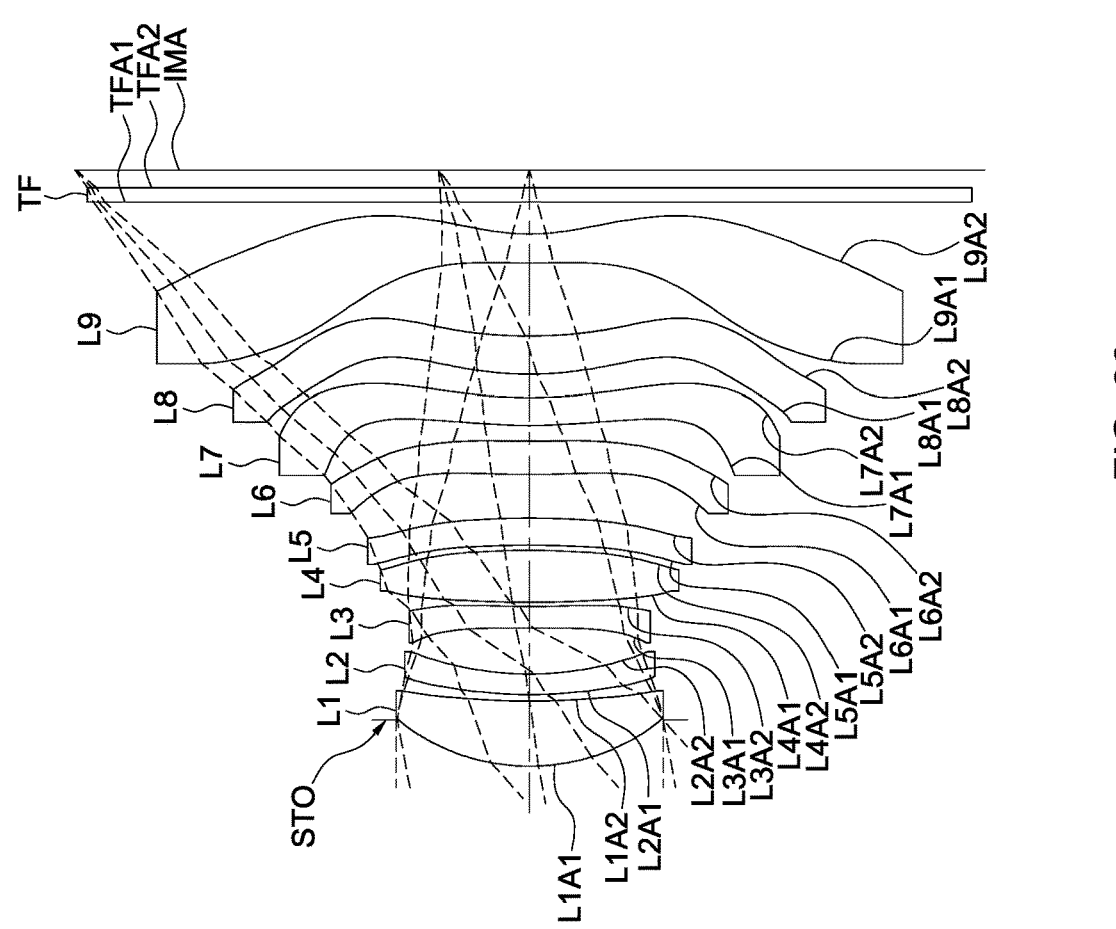
FIG. 30 depicts a cross-sectional view of a seventh embodiment of an optical imaging lens according to the present disclosure.

Reference is now made to FIGS. 30-33. FIG. 30 illustrates an example cross-sectional view of an optical imaging lens 7 according to a seventh example embodiment. FIGS. 31A, 31B, 31C and 31D show example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element, except for the sixth lens element L6 and the seventh lens element L7, may be similar to those in the first embodiment; however, the radius of curvature and thickness of each lens element, aspherical data and related optical parameters, such as effective focal length, positive refracting power of the sixth lens element L6 and negative refracting power of the seventh lens element L7 may be different from those in the first embodiment.

Here, for clearly showing the drawings of the present embodiment, only the surface shapes which are different from that in the first embodiment may be labeled. Please refer to FIG. 32 for the optical characteristics of each lens elements in the optical imaging lens 7 of the present embodiment.

Figures 31A, 31B, 31C, 31D:
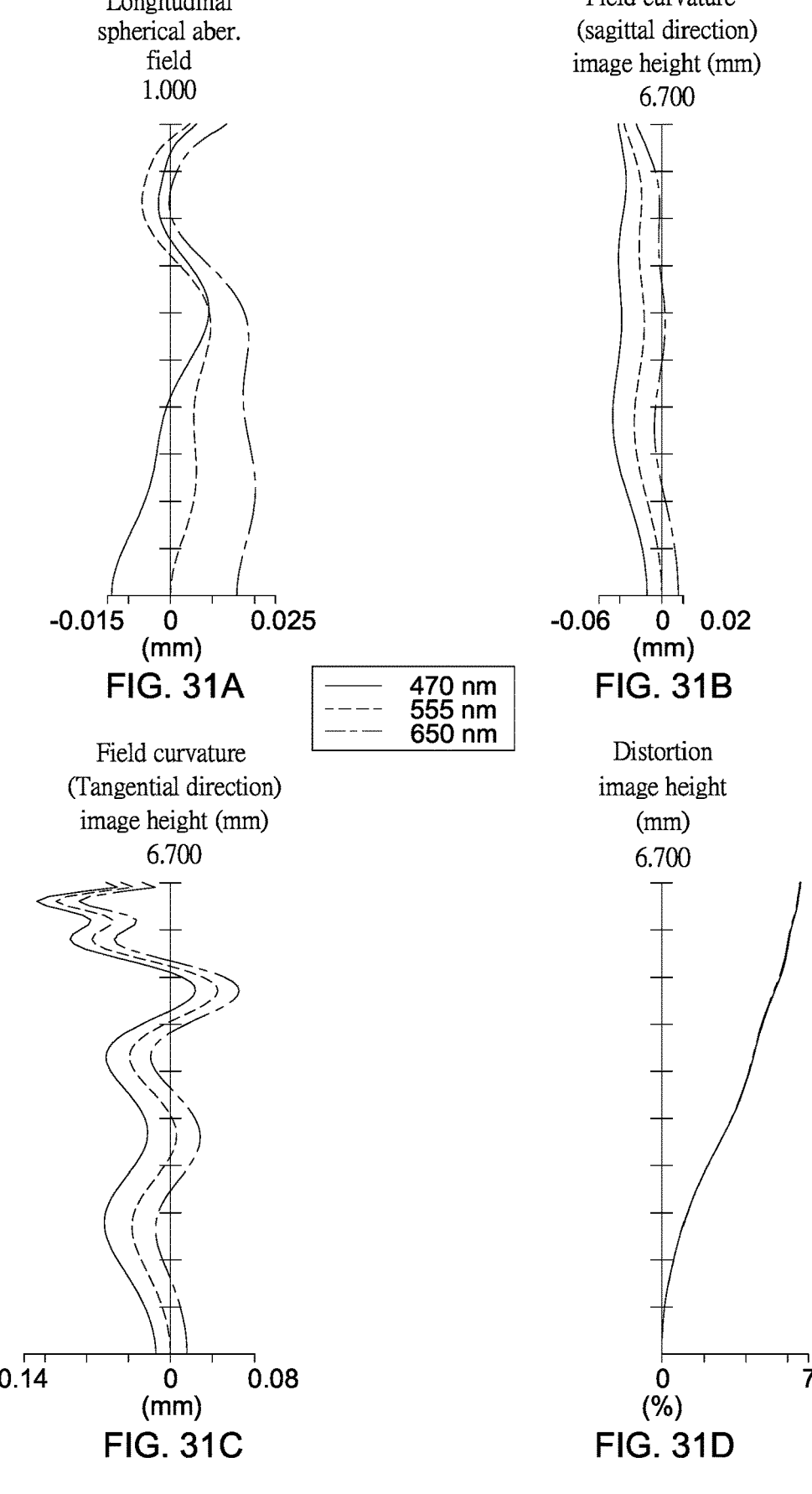
FIGS. 31A-31D depict charts of a longitudinal spherical aberration and other kinds of optical aberrations of a seventh embodiment of the optical imaging lens according to the present disclosure.

As the longitudinal spherical aberration shown in FIG. 31A, the offset of the off-axis light relative to the image point may be within −0.015~0.025 mm. As the curvature of field in the sagittal direction shown in FIG. 31B, the focus variation with regard to the three wavelengths in the whole field may fall within −0.06~0.02 mm. As the curvature of field in the tangential direction shown in FIG. 31C, the focus variation with regard to the three wavelengths in the whole field may fall within −0.14~0.08 mm. As shown in FIG. 31D, the variation of the distortion aberration may be within 0~7%.

As shown in FIG. 32, in the optical imaging lens 7, the Fno is 1.800 and the image height is 6.700 mm. Referring to the aberration shown in FIGS. 31A-31D, it may be readily understood that the optical imaging lens 7 is capable to provide with enlarged aperture stop and image height, as well as good imaging quality.

Please refer to FIG. 50B for the values of each parameter and T4/(Tmin+Tmin2), T4/T9, V2+V3+V4+V5, ALT/(T7+G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+G78), (T7+G78)/T8, V3+V5+V7, ALT/(G23+G89), AAG/(T6+G67), EFL/BFL, (T1+T4)/(T2+T5), Tmax/Tmin, (AAG+Tavg)/(Tmin+Tmin2) and TL/Tmax of the present embodiment.

Figure 34:
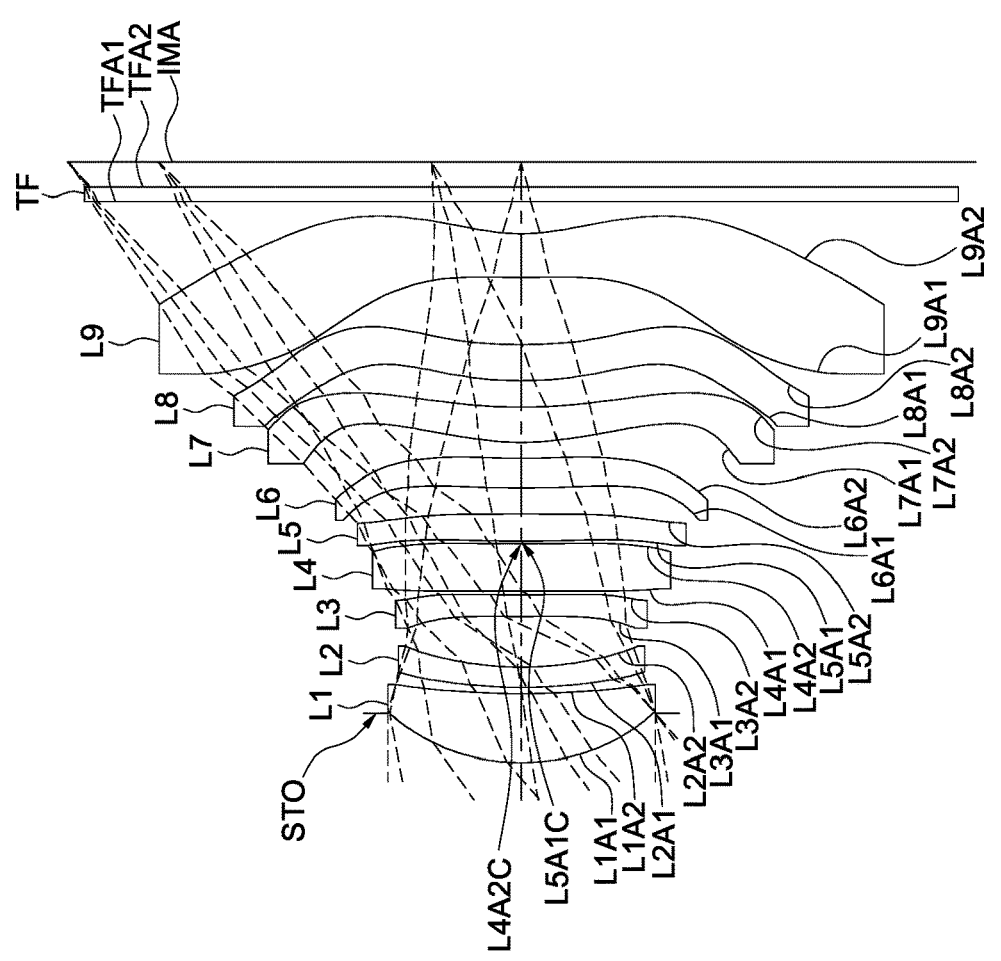
FIG. 34 depicts a cross-sectional view of an eighth embodiment of an optical imaging lens according to the present disclosure.

Reference is now made to FIGS. 34-37. FIG. 34 illustrates an example cross-sectional view of an optical imaging lens 8 according to an eighth example embodiment. FIGS. 35A, 35B, 35C and 35D show example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L6A1, L7A1, L8A1 and L9A1 and the image-side surfaces L1A2, L2A2, L3A2, L5A2, L6A2, L7A2, L8A2 and L9A2, and positive or negative configuration of the refracting power of each lens element, except for the fourth lens element L4 and the fifth lens element L5, may be similar to those in the first embodiment; however, the configuration of the concave/convex shape of the object-side surface L5A1 and the image-side surface L4A2 may be different. Further, the radius of curvature and thickness of each lens element, aspherical data and related optical parameters, such as effective focal length, negative refracting power of the fourth lens element L4 and positive refracting power of the fifth lens element L5 may be different from those in the first embodiment. Specifically, an optical axis region L4A2C on the image-side surface L4A2 of the fourth lens element L4 may be concave, and an optical axis region L5A1C on the object-side surface L5A1 of the fifth lens element L5 may be convex.

Here, for clearly showing the drawings of the present embodiment, only the surface shapes which are different from that in the first embodiment may be labeled. Please refer to FIG. 36 for the optical characteristics of each lens elements in the optical imaging lens 8 of the present embodiment.

Figures 35A, 35B, 35C, 35D:
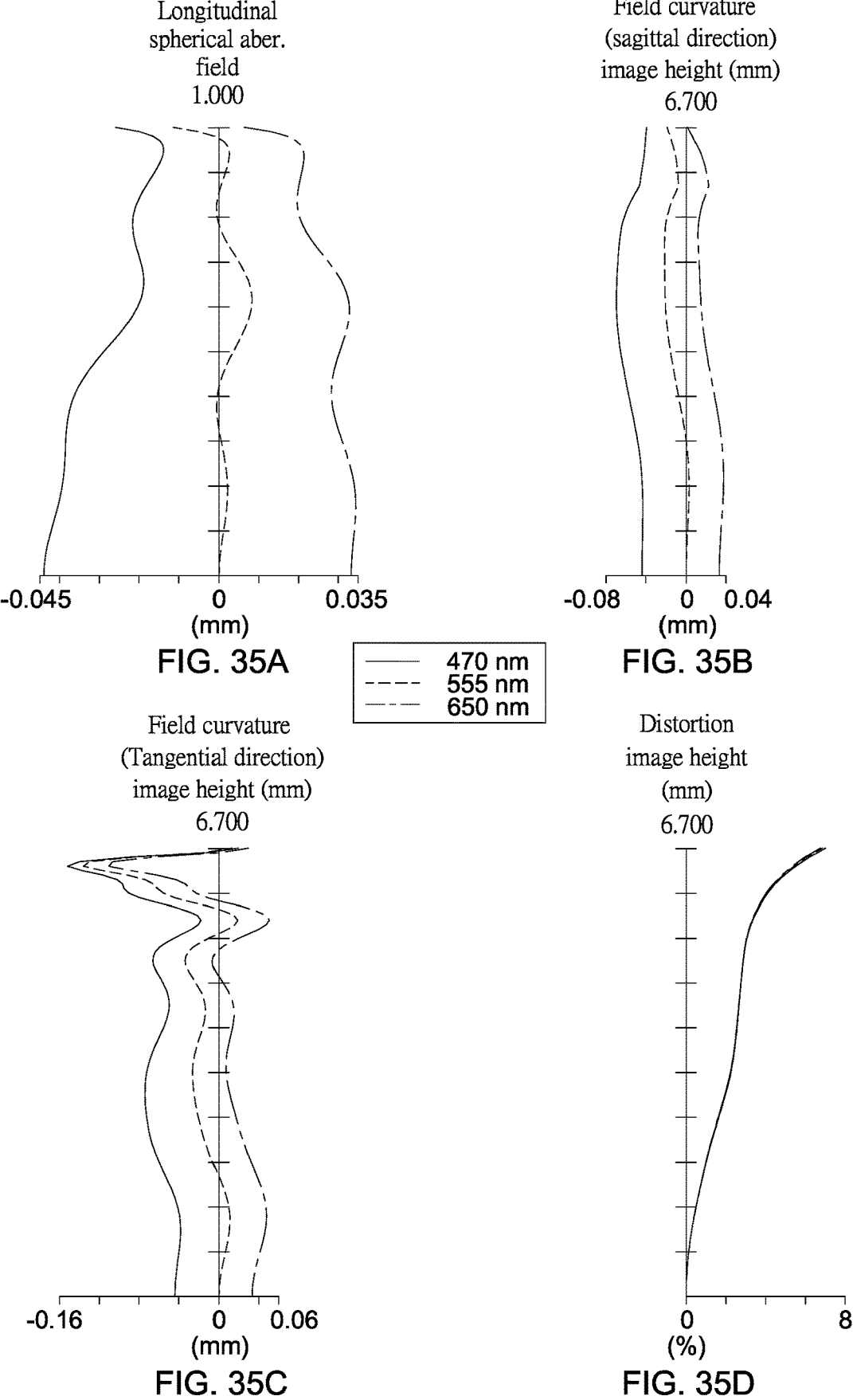
FIGS. 35A-35D depict charts of a longitudinal spherical aberration and other kinds of optical aberrations of an eighth embodiment of the optical imaging lens according to the present disclosure.

As the longitudinal spherical aberration shown in FIG. 35A, the offset of the off-axis light relative to the image point may be within −0.045~0.035 mm. As the curvature of field in the sagittal direction shown in FIG. 35B, the focus variation with regard to the three wavelengths in the whole field may fall within −0.08~0.04 mm. As the curvature of field in the tangential direction shown in FIG. 35C, the focus variation with regard to the three wavelengths in the whole field may fall within −0.16~0.06 mm. As shown in FIG. 35D, the variation of the distortion aberration may be within 0~8%.

As shown in FIG. 36, in the optical imaging lens 8, the Fno is 1.800 and the image height is 6.700 mm. Referring to the aberration shown in FIGS. 35A-35D, it may be readily understood that the optical imaging lens 8 is capable to provide with enlarged aperture stop and image height, as well as good imaging quality.

Please refer to FIG. 50B for the values of each parameter and T4/(Tmin+Tmin2), T4/T9, V2+V3+V4+V5, ALT/(T7+ G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+ G78), (T7+G78)/T8, V3+V5+V7, ALT/(G23+G89), AAG/ (T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 38-41. FIG. 38 illustrates an example cross-sectional view of an optical imaging lens 9 according to a ninth example embodiment. FIGS. 39A, 39B, 39C and 39D show example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element may be similar to those in the first embodiment; however, the radius of curvature and thickness of each lens element, aspherical data and related optical parameters, such as effective focal length, may be different from those in the first embodiment.

Here, for clearly showing the drawings of the present embodiment, only the surface shapes which are different from that in the first embodiment may be labeled. Please refer to FIG. 40 for the optical characteristics of each lens elements in the optical imaging lens 9 of the present embodiment.

Figures 39A, 39B, 39C, 39D:
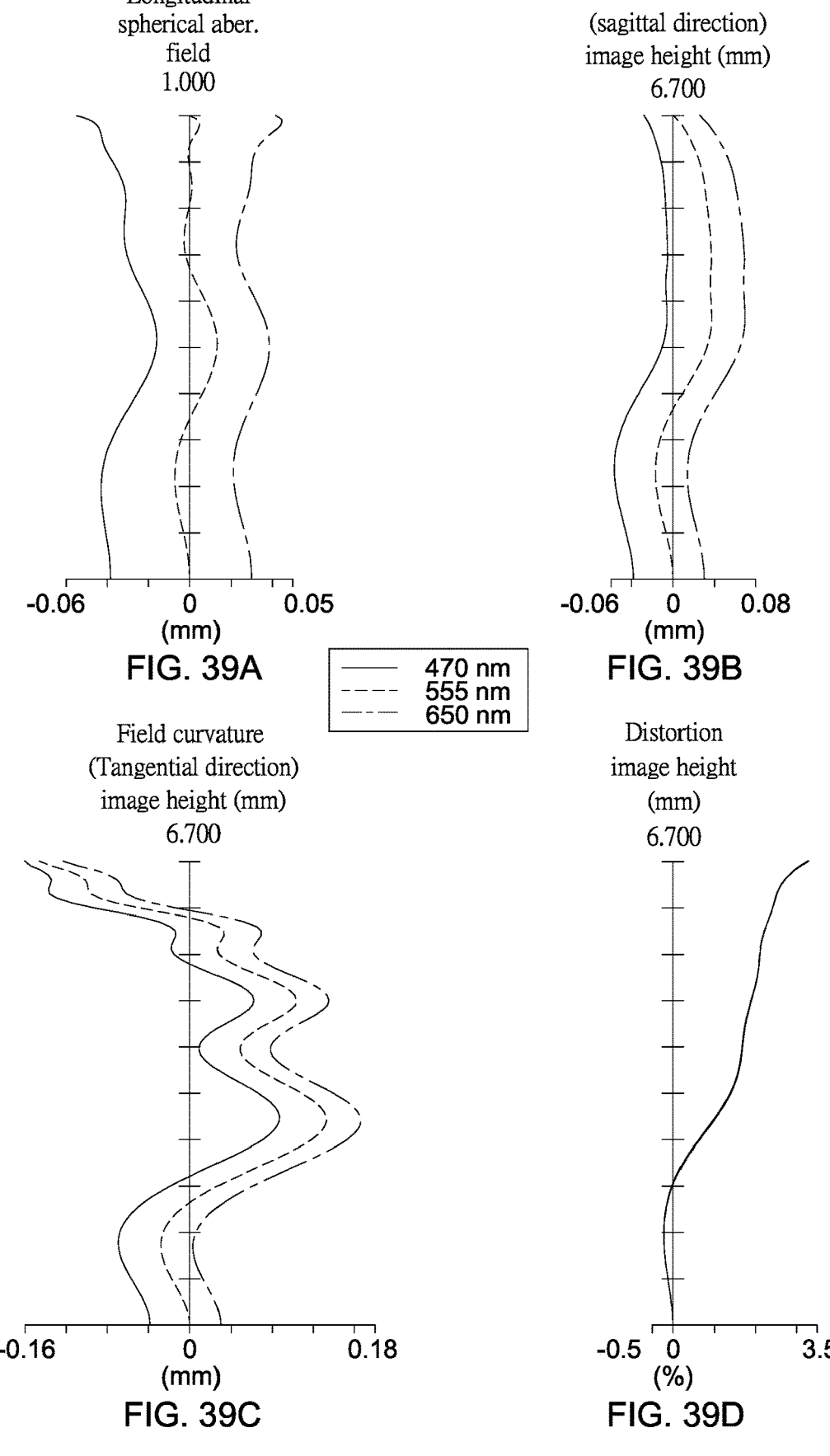
FIGS. 39A-39D depict charts of a longitudinal spherical aberration and other kinds of optical aberrations of a ninth embodiment of the optical imaging lens according to the present disclosure.

As the longitudinal spherical aberration shown in FIG. 39A, the offset of the off-axis light relative to the image point may be within −0.06~0.05 mm. As the curvature of field in the sagittal direction shown in FIG. 39B, the focus variation with regard to the three wavelengths in the whole field may fall within −0.06~0.08 mm. As the curvature of field in the tangential direction shown in FIG. 39C, the focus variation with regard to the three wavelengths in the whole field may fall within −0.16~0.18 mm. As shown in FIG. 39D, the variation of the distortion aberration may be within −0.5~3.5%. Compared with the first embodiment, the distortion aberration may be smaller in the present embodiment.

As shown in FIG. 40, in the optical imaging lens 9, the Fno is 1.800 and the image height is 6.700 mm. Referring to the aberration shown in FIGS. 39A-39D, it may be readily understood that the optical imaging lens 9 is capable to provide with enlarged aperture stop and image height, as well as good imaging quality.

Please refer to FIG. 50B for the values of each parameter and T4/(Tmin+Tmin2), T4/T9, V2+V3+V4+V5, ALT/(T7+ G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+ G78), (T7+G78)/T8, V3+V5+V7, ALT/(G23+G89), AAG/ (T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 42-45. FIG. 42 illustrates an example cross-sectional view of an optical imaging lens 10 having nine lens elements of the optical imaging lens according to a tenth example embodiment. FIGS. 43A, 43B, 43C and 43D show example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42, the optical imaging lens 10 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces L1A1, L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element may be similar to those in the first embodiment; however, the radius of curvature and thickness of each lens element, aspherical data and related optical parameters, such as effective focal length, may be different from those in the first embodiment.

Here, for clearly showing the drawings of the present embodiment, only the surface shapes which are different from that in the first embodiment may be labeled. Please refer to FIG. 44 for the optical characteristics of each lens elements in the optical imaging lens 10 of the present embodiment.

Figures 43A, 43B, 43C, 43D:
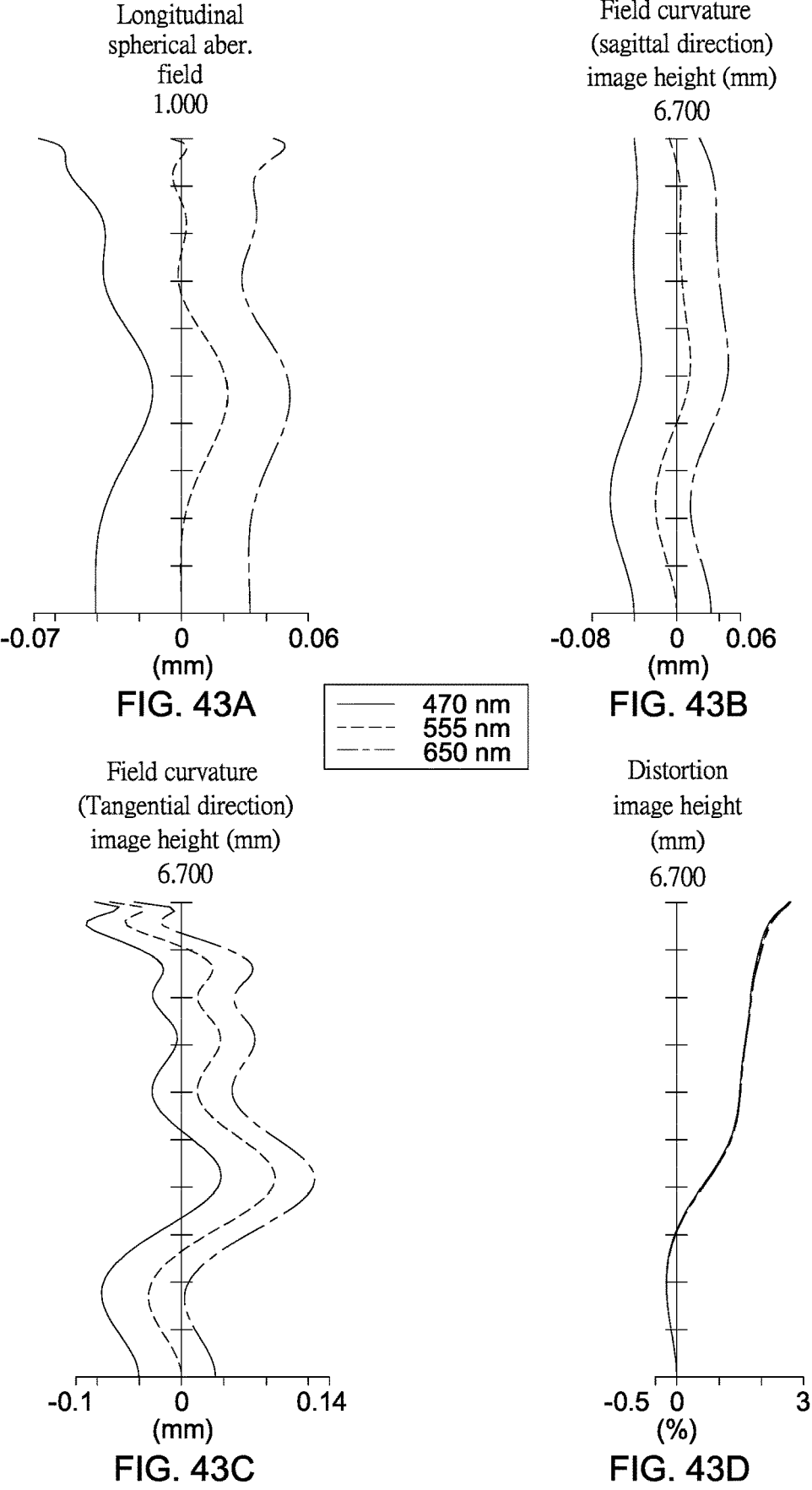
FIGS. 43A-43D depict charts of a longitudinal spherical aberration and other kinds of optical aberrations of a tenth embodiment of the optical imaging lens according to the present disclosure.

As the longitudinal spherical aberration shown in FIG. 43A, the offset of the off-axis light relative to the image point may be within −0.07~0.06 mm. As the curvature of field in the sagittal direction shown in FIG. 43B, the focus variation with regard to the three wavelengths in the whole field may fall within −0.08~0.06 mm. As the curvature of field in the tangential direction shown in FIG. 43C, the focus variation with regard to the three wavelengths in the whole field may fall within −0.1~0.14 mm. As shown in FIG. 43D, the variation of the distortion aberration may be within −0.5~3%. Compared with the first embodiment, the distortion aberration may be less in the present embodiment.

As shown in FIG. 44, in the optical imaging lens 10, the Fno is 1.800 and the image height is 6.700 mm. Referring to the aberration shown in FIGS. 43A-43D, it may be readily understood that the optical imaging lens 10 is capable to provide with enlarged aperture stop and image height, as well as good imaging quality.

Please refer to FIG. 50B for the values of each parameter and T4/(Tmin+Tmin2), T4/T9, V2+V3+V4+V5, ALT/(T7+ G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+ G78), (T7+G78)/T8, V3+V5+V7, ALT/(G23+G89), AAG/ (T6+G67), EFL/BFL, (T1+T4)/(T2+T5), Tmax/Tmin, (AAG+Tavg)/(Tmin+Tmin2) and TL/Tmax of the present embodiment.

Reference is now made to FIGS. 46-49. FIG. 46 illustrates an example cross-sectional view of an optical imaging lens 11 according to a eleventh example embodiment. FIGS. 47A, 47B, 47C and 47D show example charts of a longitudinal spherical aberration and other kinds of optical aberrations of the optical imaging lens 11 according to the eleventh example embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment.

As shown in FIG. 46, the optical imaging lens 11 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7, an eighth lens element L8 and a ninth lens element L9.

The configuration of the concave/convex shape of surfaces, comprising the object-side surfaces UAL L2A1, L3A1, L4A1, L5A1, L6A1, L7A1, L8A1 and L9A1 and the image-side surfaces L1A2, L2A2, L3A2, L4A2, L5A2, L6A2, L7A2, L8A2 and L9A2, and positive or negative configuration of the refracting power of each lens element may be similar to those in the first embodiment; however, the radius of curvature and thickness of each lens element, aspherical data and related optical parameters, such as effective focal length, may be different from those in the first embodiment.

Here, for clearly showing the drawings of the present embodiment, only the surface shapes which are different from that in the first embodiment may be labeled. Please refer to FIG. 48 for the optical characteristics of each lens elements in the optical imaging lens 11 of the present embodiment.

Figures 47A, 47B, 47C, 47D:
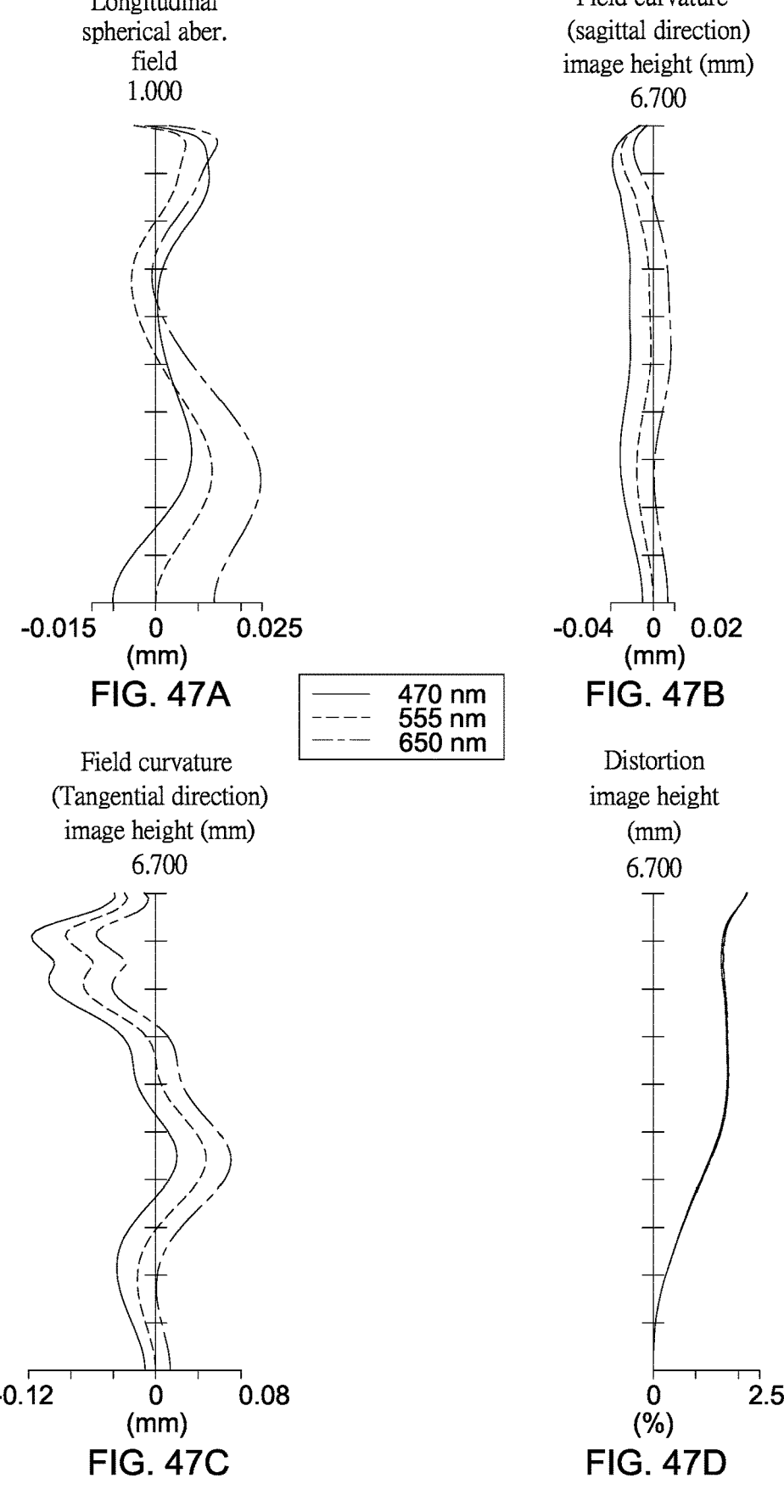
FIGS. 47A-47D depict charts of a longitudinal spherical aberration and other kinds of optical aberrations of an eleventh embodiment of the optical imaging lens according to the present disclosure.

As the longitudinal spherical aberration shown in FIG. 47A, the offset of the off-axis light relative to the image point may be within −0.015~0.025 mm. As the curvature of field in the sagittal direction shown in FIG. 47B, the focus variation with regard to the three wavelengths in the whole field may fall within −0.04~0.02 mm. As the curvature of field in the tangential direction shown in FIG. 47C, the focus variation with regard to the three wavelengths in the whole field may fall within −0.12~0.08 mm. As shown in FIG. 47D, the variation of the distortion aberration may be within 0~2.5%. Compared with the first embodiment, the distortion aberration may be less in the present embodiment.

As shown in FIG. 48, in the optical imaging lens 11, the Fno is 1.800 and the image height is 6.700 mm. Referring to the aberration shown in FIGS. 47A-47D, it may be readily understood that the optical imaging lens 11 is capable to provide with enlarged aperture stop and image height, as well as good imaging quality.

Please refer to FIG. 50B for the values of each parameter and T4/(Tmin+Tmin2), T4/T9, V2+V3+V4+V5, ALT/(T7+ G78), (T8+G89+T9)/(G23+G56), TL/BFL, TTL/AAG, (T1+T3)/D32t51, (V4+V5+V6)/(V2+V3), ALT/(G56+T6), AAG/(G23+G56+G78), BFL/(G12+G23), EFL/(G56+ G78), (T7+G78)/T8, V3+V5+V7, ALT/(G23+G89), AAG/ (T6+G67), EFL/BFL, (T1+T4)/(T2+T5), Tmax/Tmin, (AAG+Tavg)/(Tmin+Tmin2) and TL/Tmax of the present embodiment.

According to above illustration, the longitudinal spherical aberration, field curvature in both the sagittal direction and tangential direction and distortion aberration in all embodiments may meet the user requirement of a related product in the market. The off-axis light with regard to three different wavelengths may be focused around an image point and the offset of the off-axis light relative to the image point may be well controlled with suppression for the longitudinal spherical aberration, field curvature both in the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $a_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A–B or A/B or A*B or $(A*B)^{1/2}$, and E satisfies a conditional expression $E \le \gamma_1$ or $E \ge \gamma_2$ or $\gamma_2 \le E \le \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A nine-lens optical imaging lens system, comprising a first lens element, a second lens element, a third lens element, a fourth lens element, a fifth lens element, a sixth lens element, a seventh lens element, an eighth lens element and a ninth lens element sequentially from an object side to an image side along an optical axis, each of the first, second, third, fourth, fifth, sixth, seventh, eighth and ninth lens elements having an object-side surface facing toward the object side and allowing imaging rays to pass through and an image-side surface facing toward the image side and allowing the imaging rays to pass through, wherein:

an optical axis region of the image-side surface of the first lens element is concave;

the second lens element has negative refracting power;

a periphery region of the object-side surface of the third lens element is concave;

a periphery region of the object-side surface of the fourth lens element is convex, an optical axis region of the object-side surface of the fourth lens element is convex, and a periphery region of the image-side surface of the fourth lens element is convex;

a periphery region of the image-side surface of the sixth lens element is convex;

a periphery region of the object-side surface of the eighth lens element is concave;

an optical axis region of the object-side surface of the ninth lens element is convex, and an optical axis region of the image-side surface of the ninth lens element is concave; and lens elements of the nine-lens optical imaging lens system are only the nine lens elements described above.

2. The nine-lens optical imaging lens system according to claim 1, wherein a thickness of the fourth lens element along the optical axis is greater than or equal to a thickness of the ninth lens element along the optical axis.

3. The nine-lens optical imaging lens system according to claim 1, wherein an Abbe number of the second lens element is represented by V2, an Abbe number of the third lens element is represented by V3, an Abbe number of the fourth lens element is represented by V4, an Abbe number of the fifth lens element is represented by V5, and V2, V3, V4 and V5 satisfy the inequality:

$$V2+V3+V4+V5 \le 135.000.$$

4. The nine-lens optical imaging lens system according to claim 1, wherein a sum of the thicknesses of all nine lens elements along the optical axis is represented by ALT, a thickness of the seventh lens element along the optical axis is represented by T7, a distance from the image-side surface of the seventh lens element to the object-side surface of the eighth lens element along the optical axis is represented by G78, and ALT, T7 and G78 satisfy the inequality:

$$ALT/(T7+G78) \le 6.600.$$

5. The nine-lens optical imaging lens system according to claim 1, wherein a thickness of the eighth lens element along the optical axis is represented by T8, a distance from the image-side surface of the eighth lens element to the object-side surface of the ninth lens element along the optical axis is represented by G89, a thickness of the ninth lens element along the optical axis is represented by T9, a distance from the image-side surface of the second lens element to the object-side surface of the third lens element along the optical axis is represented by G23, a distance from the image-side surface of the fifth lens element to the object-side surface of the sixth lens element along the optical axis is represented by G56, and T8, G89, T9, G23 and G56 satisfy the inequality:

$$(T8+G89+T9)/(G23+G56) \le 2.500.$$

6. The nine-lens optical imaging lens system according to claim 1, wherein a distance from the object-side surface of the first lens element to the image-side surface of the ninth lens element along the optical axis is represented by TL, a distance from the image-side surface of the ninth lens element to an image plane along the optical axis is represented by BFL, and TL and BFL satisfy the inequality:

$$TL/BFL \ge 6.000.$$

7. The nine-lens optical imaging lens system according to claim 1, wherein a distance from the object-side surface of the first lens element to an image plane along the optical axis is represented by TTL, a sum of a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, a distance from the image-side surface of the fourth lens element to the object-side surface of the fifth lens element along the optical axis, a distance from the image-side surface of the fifth lens element to the object-side surface of the sixth lens element along the optical axis, a distance from the image-side surface of the sixth lens element to the object-side surface of the seventh lens element along the optical axis, a distance from the image-side surface of the seventh lens element to the object-side surface of the eighth lens element along the optical axis and a distance from the image-side surface of the eighth lens element to the object-side surface of the ninth lens element along the optical axis is represented by AAG, and TTL and AAG satisfy the inequality:

$$TTL/AAG \leq 3.500.$$

* * * * *